(12) United States Patent
Gierens et al.

(10) Patent No.: US 9,841,551 B2
(45) Date of Patent: Dec. 12, 2017

(54) LUMINOUS GLAZING ASSEMBLY

(71) Applicant: SAINT-GOBAIN GLASS FRANCE, Courbevoie (FR)

(72) Inventors: Anne Gierens, Dusseldorf (DE); Richard Wolff, Pronleroy (FR); Kamel Chahboune, Soissons (FR); Jingwei Zhang, Massy (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/117,844

(22) PCT Filed: Feb. 9, 2015

(86) PCT No.: PCT/FR2015/050306
§ 371 (c)(1),
(2) Date: Aug. 10, 2016

(87) PCT Pub. No.: WO2015/118280
PCT Pub. Date: Aug. 13, 2015

(65) Prior Publication Data
US 2017/0205552 A1    Jul. 20, 2017

(30) Foreign Application Priority Data

Feb. 10, 2014 (FR) .................................. 14 51016
Jul. 3, 2014 (MY) ............................. PI2014001989

(51) Int. Cl.
*F21V 8/00* (2006.01)
*B32B 17/10* (2006.01)
(Continued)

(52) U.S. Cl.
CPC ................ *G02B 6/006* (2013.01); *B32B 7/12* (2013.01); *B32B 17/10541* (2013.01);
(Continued)

(58) Field of Classification Search
CPC .............. G02B 6/006; B32B 17/10541; B32B 2307/412; B32B 2307/416;
(Continued)

(56) References Cited

U.S. PATENT DOCUMENTS 5,786,665 A * 7/1998 Ohtsuki ............... G02B 6/0021
313/113
2015/0160400 A1* 6/2015 Massault ........... B32B 17/10036
362/612

FOREIGN PATENT DOCUMENTS

EP    1 329 433 A1    7/2003
EP    2 423 173 A1    2/2012
(Continued)

OTHER PUBLICATIONS

International Search Report as issued in International Patent Application No. PCT/FR2015/050306, dated May 4, 2015.
(Continued)

*Primary Examiner* — Ali Alavi
(74) *Attorney, Agent, or Firm* — Pillsbury Winthrop Shaw Pittman LLP

(57) ABSTRACT

A luminous glazing assembly includes a first glazing pane with a first light source coupled to the first pane to emit at instant t0 at λ1 and to emit at t'≠t0 at λ2, λ2 distinct from λ1; a first light-extracting system and first masking arrangement to mask the extracted light from the internal-face side; making optical contact with the first glazing pane, a second glazing pane with a second light source that is optically coupled to the second pane, to emit at t0 at a λ3 distinct from λ1; a second light-extracting system and second masking arrangement to mask the light from the bonding-face side; between the first masking arrangement and the second extracting system, a first optical isolator; and between the first masking arrangement and the second extracting system,
(Continued)

Figure 1:
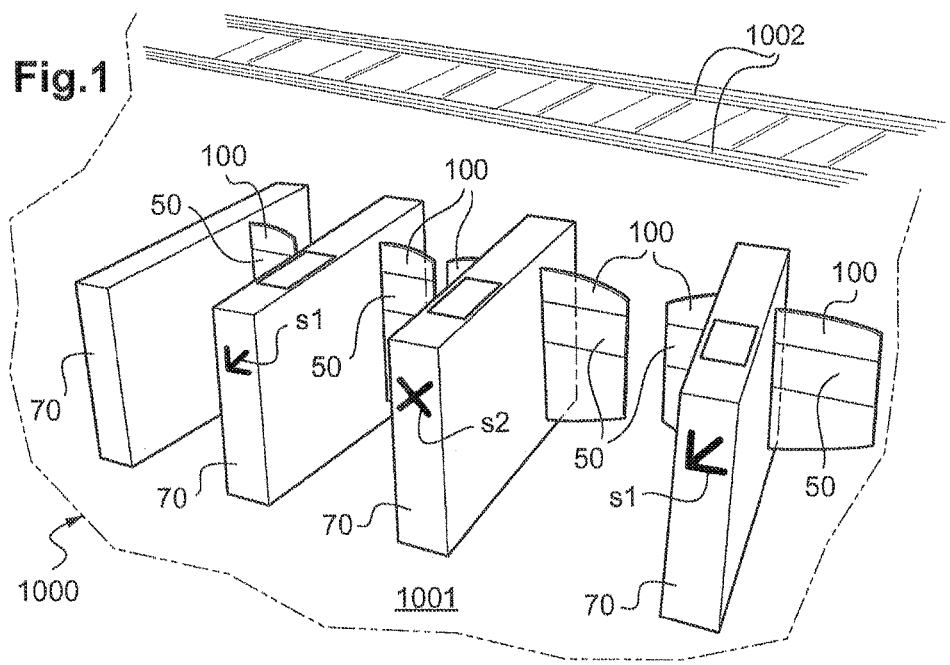
Figure 1B:
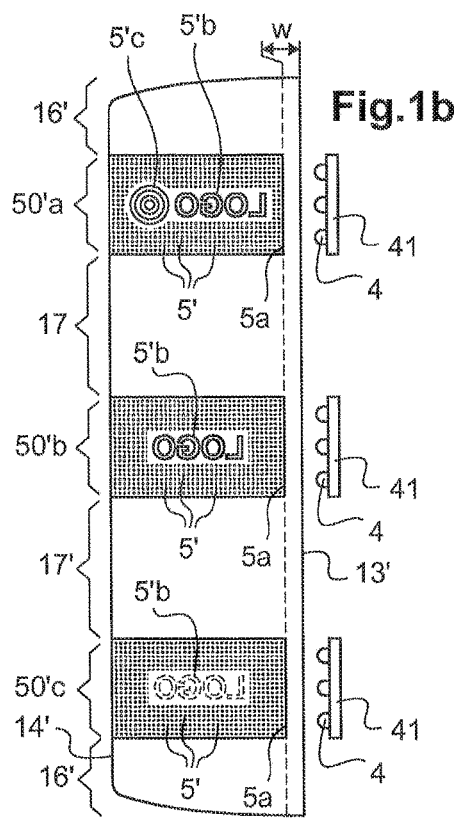

a second optical isolator, merged with the first optical isolator or separate and closer to the second extracting system.

35 Claims, 10 Drawing Sheets

(51) Int. Cl.
*B32B 7/12* (2006.01)
*G07C 9/00* (2006.01)

(52) U.S. Cl.
CPC .. *B32B 17/10779* (2013.01); *B32B 17/10788* (2013.01); *G02B 6/0035* (2013.01); *G02B 6/0043* (2013.01); *G02B 6/0068* (2013.01); *G02B 6/0076* (2013.01); *G02B 6/0095* (2013.01); *G07C 9/00007* (2013.01); *B32B 2307/41* (2013.01); *B32B 2307/412* (2013.01); *B32B 2307/416* (2013.01); *B32B 2307/418* (2013.01); *B32B 2519/00* (2013.01); *B32B 2590/00* (2013.01)

(58) Field of Classification Search
CPC .......... B32B 2037/418; B32B 2307/41; B32B 259/00; B32B 25/19
See application file for complete search history.

(56) References Cited

FOREIGN PATENT DOCUMENTS

| | | |
|---|---|---|
| FR | 2 694 069 A1 | 1/1994 |
| FR | 2 976 342 A1 | 12/2012 |
| FR | 2 989 176 A1 | 10/2013 |
| JP | H10-124710 A | 5/1998 |
| JP | 2007-328810 A | 12/2007 |
| WO | WO 01/90787 A1 | 11/2001 |
| WO | WO 2004/030935 A2 | 4/2004 |
| WO | WO 2005/018283 A1 | 2/2005 |
| WO | WO 2008/059170 A2 | 5/2008 |
| WO | WO 2012/172269 A1 | 12/2012 |

OTHER PUBLICATIONS

International Preliminary Report on Patentability and the Written Opinion of the International Searching Authority as issued in International Patent Application No. PCT/FR2015/050306, dated Aug. 16, 2016.

\* cited by examiner

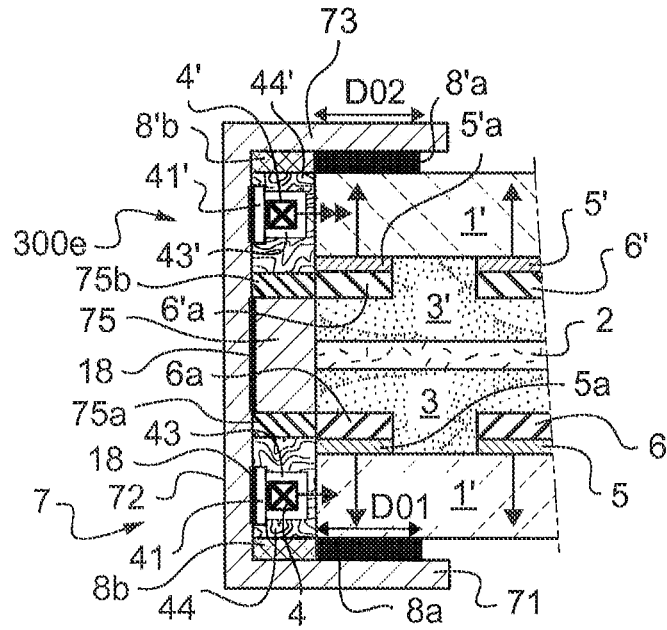
Fig.3e
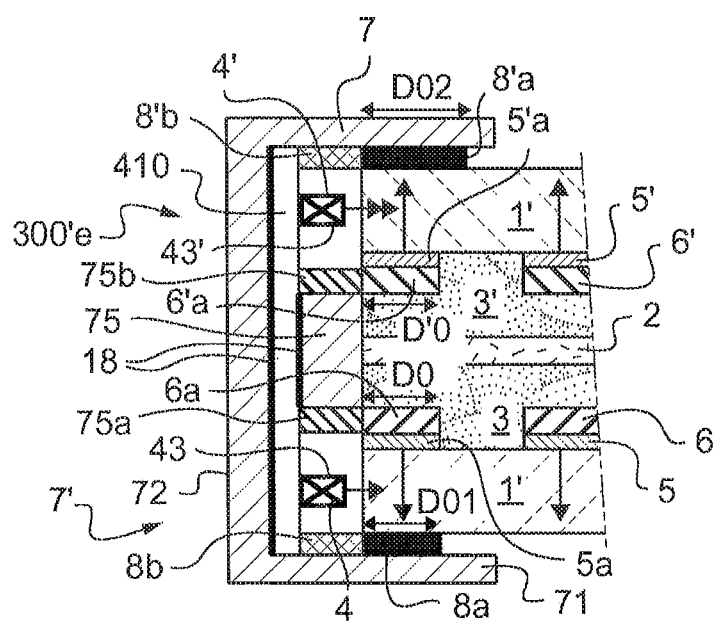
Fig.3'e

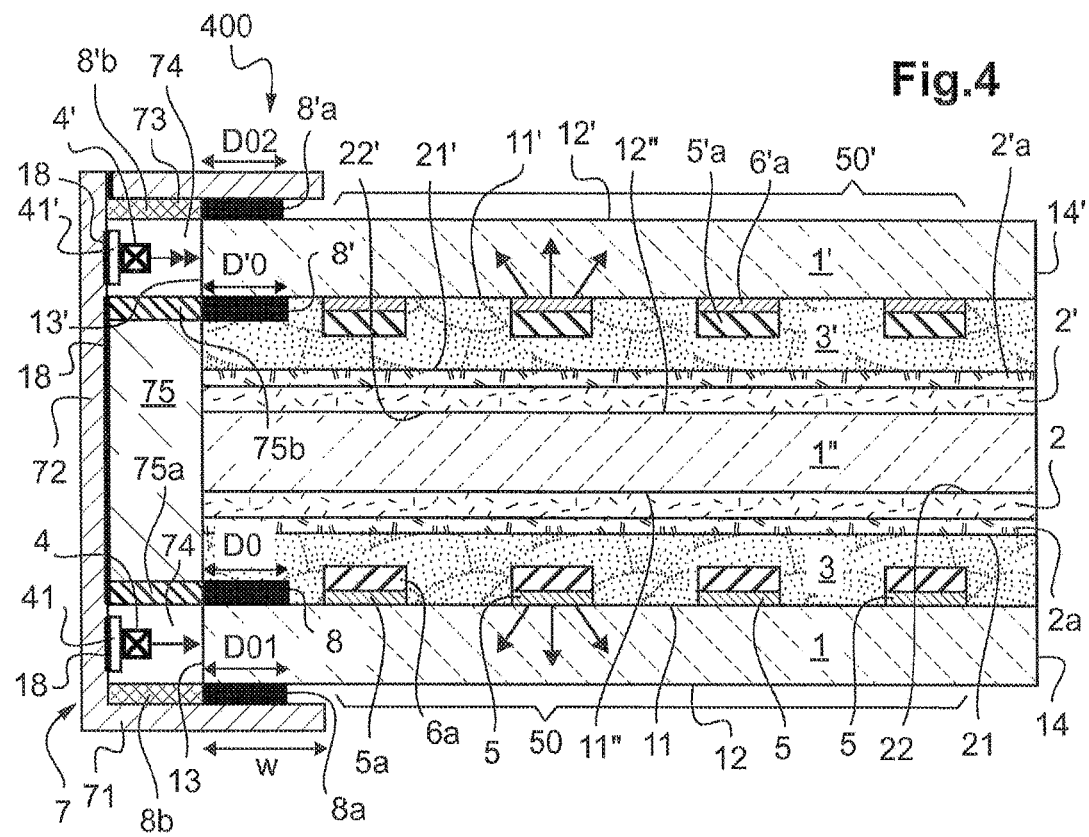

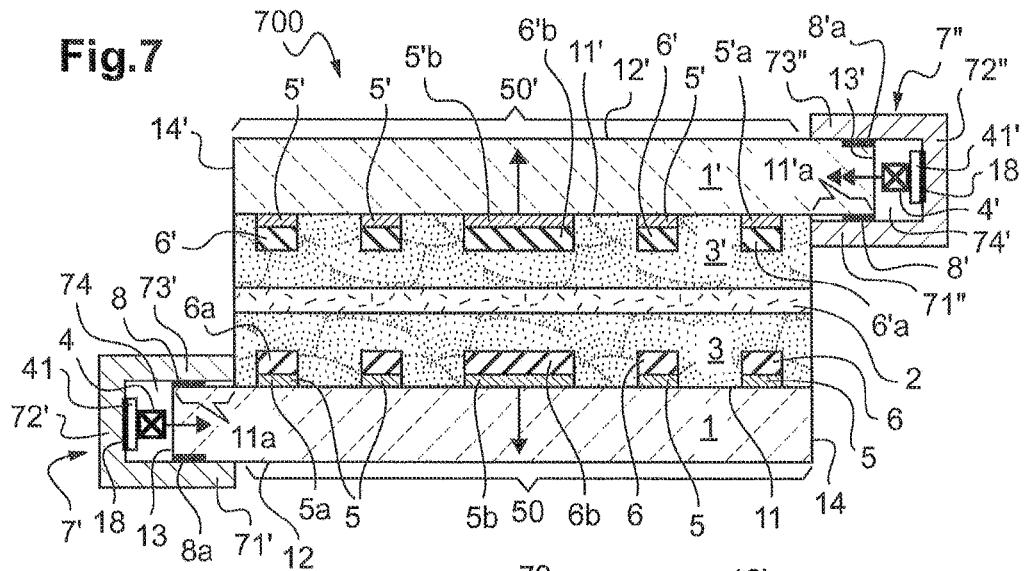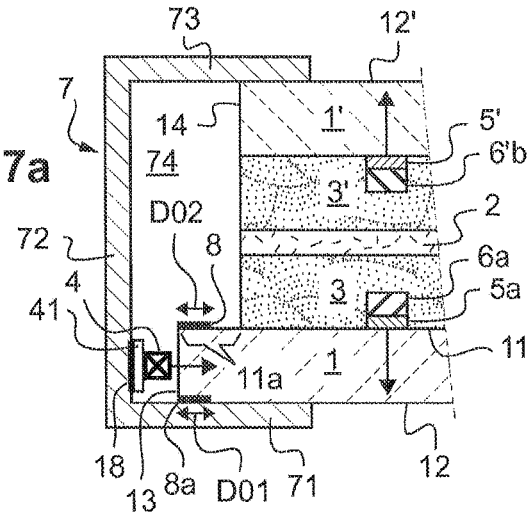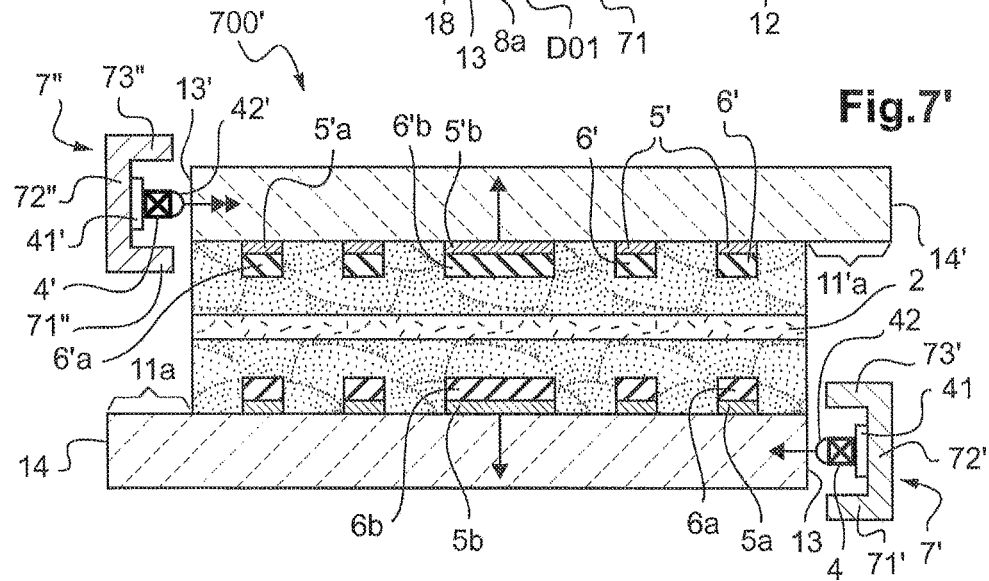

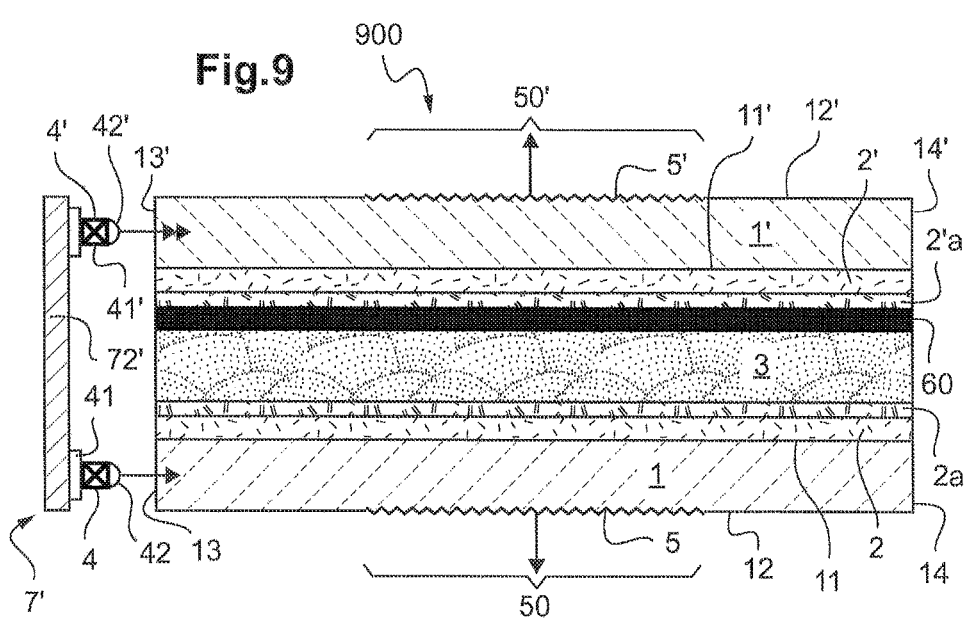

LUMINOUS GLAZING ASSEMBLY

CROSS-REFERENCE TO RELATED APPLICATIONS

This application is the U.S. National Stage of PCT/FR2015/050306, filed Feb. 9, 2015, which in turn claims priority to French Application No. 1451016, filed Feb. 10, 2014 and Malaysian Application No. PI2014001989, filed Jul. 3, 2014. The contents of all of these applications are incorporated herein by reference in their entirety.

The present invention relates to the field of light and more particularly relates to a glazing assembly made luminous by extracting light guided in a glass sheet.

It is known to form a luminous glazing unit by illuminating a glass sheet via the edge face with a light source such as an assembly of light-emitting diodes. The light thus injected is guided by total internal reflection inside this glass sheet by virtue of the contrast in refractive index with the surrounding materials. This light is then extracted using means forming a signal that are conventionally a scattering layer.

Naturally, the diodes may be controlled to produce, via the scattering feature, a continuous or flashing luminous region that may even change colour.

The Applicant proposes to widen the range of available luminous glazing units based on a light-guiding glass sheet illuminated via the edge face, while making it possible to see simultaneously a first luminous region of a first colour, visible only from a first side of the glazing unit, and a second luminous region of a second different colour, visible only from the other side of the glazing unit.

For this purpose, a first object of the invention is a luminous glazing assembly, preferably for an access door between first and second spaces, comprising:

- a first (transparent, preferably clear, and even extra clear) glazing pane, preferably made of (bare or previously coated) mineral and even tempered or even (preferably rigid) organic glass of refractive index n1 preferably lower than 1.6 at 550 nm (more preferably in all the visible spectrum), and even lower than 1.55 or better still lower than or equal to 1.53 at 550 nm (more preferably in all the visible spectrum), preferably from 1.5 to 1.53, having main faces referred to as the internal face and the external face, and a first edge face;
- a first source of (visible) light, preferably an assembly of light-emitting diodes (aligned on a first PCB carrier, in (a) strip(s)) or an extracting optical fibre with a primary light source (diode(s)), optically coupled to the first glazing pane via the first edge face or even via one of the faces on the periphery of the first edge face (especially if a lodging is provided for the diodes),
- the first glazing pane guiding the light emitted by the first light source, the first light source being controlled statically or (preferably) dynamically in order to emit (preferably in the green) at the instant t0 a first main emission at a first wavelength called $\lambda 1$ (preferably green) and preferably switchable in order to emit (preferably in the red) at the instant t'≠t0 a second main emission at a second wavelength called $\lambda 2$ distinct from $\lambda 1$ (preferably distinct from $\lambda 1$ by at least 20 nm, 40 nm and even at least 80 nm, $\lambda 2$ preferably being red), and optionally in order to emit (in the white, the red, or the green, the blue) at t3≠t0 and t3≠t' a main (decorative or functional) emission that is better still distinct from the first and/or second main emission;
- first light-extracting means (for extracting the light delivered by the guide) associated with the first glazing pane, comprising one or more first (preferably scattering) extracting features bounding a first extracting area (occupying all or some of the internal face, preferably outside of a first marginal zone located on the side on which the optical coupling with the first source takes place, especially occupying a zone, such as a band, extending from the first edge face to the opposite edge face but preferably excluding said first marginal zone), the light extracted being visible on the external-face side, the first extracting means (especially a white scattering layer, preferably defined by a lightness L* of at least 50) being such that the light extracted at said t0 is of a first colour called C1 (C1 preferably being in the green and corresponding to an open state of an access door, C1 of main emission $\lambda'1$ substantially equal to $\lambda 1$) and preferably at said t' is of a second colour called C2 distinct from the first colour C1 (C2 preferably being in the red and corresponding to a closed state of an access door, and/or C2 of main emission $\lambda'2$ substantially equal to $\lambda 2$),
- these first light-extracting means in particular preferably being scattering means located on the internal-face side (preferably on the internal face, even in or on a first lamination interlayer), and/or on the external-face side (even preferably on the external face) and/or in the bulk of the first glazing pane, the extracting means optionally concentrating the light;
- first means for masking the light extracted (by the first extracting means) from the internal-face side, these means being arranged on the internal-face side and partially covering the internal face and being chosen from at least one of the following means (and their combinations):
    - (preferably) opaque (in the sense that they are mainly absorbent) means in congruence (same shape, same size and in coincidence) with the first extracting means—in particular at least absorbent at the main wavelengths of C1 and/or C2 (and/or of C3 and/or C4 defined below)—further away than the first extracting means from the internal face and preferably on the first extracting means, and
    - (preferably specular) reflective means facing the first extracting means, and which are preferably (directly) on the first extracting means and further away from the first glazing pane than the first extracting means, preferably in congruence with the first extracting means (with the first extracting features) or optionally projecting laterally beyond the first extracting means (of the first extracting feature(s)) especially by at most 2 mm and even by less than 1 mm, especially covering the first extracting area and around the first extracting area by at most 2 mm and preferably by less than 1 mm);
- making optical contact with the first glazing pane, especially (preferably) separated by one or more layers—or as a variant spaced apart from the first glazing pane—a second glazing pane (preferably made of mineral or even (rigid) organic glass that is transparent, preferably clear or even extra clear, and even tempered glass) of refractive index n'1 preferably lower than 1.6 at 550 nm (more preferably in all the visible spectrum), and even lower than 1.55 at 550 nm (more preferably in all the visible spectrum) or better still lower than or equal to 1.53 at 550 nm (more preferably in all the visible spectrum), preferably from 1.5 to 1.53, having main faces referred to as the bonding face and exterior face, the bonding face facing the internal face, and an edge face called the second edge face (the latter being aligned with the first edge face or offset therefrom towards the exterior of the glazing assembly, leaving a peripheral band of the bonding face projecting beyond the first edge face or the edge face opposite the first edge face);

a second source of (visible) light, preferably an assembly of light-emitting diodes (aligned on a second PCB carrier, in (a) strip(s), and preferably identical to the first light source) or even an extracting optical fibre with a primary light source (diode(s)), optically coupled to the second glazing pane via the second edge face or even via one of the faces on the periphery of the second edge face (especially if a lodging is provided for the diodes), the second glazing pane guiding the light emitted by the second light source (the second edge face either being on the same side as the first edge face and aligned or offset towards the interior of the glazing assembly or being on the side opposite the first edge face), the second light source being controlled, statically or (preferably) dynamically in order to emit at said $t0$ (preferably in the red) a third main emission at a wavelength called $\lambda 3$ distinct from $\lambda 1$ (preferably distinct from $\lambda 1$ by at least 20 nm, 40 nm and even at least 80 nm, $\lambda 3$ preferably being red) and preferably substantially equal to $\lambda 2$ and preferably in order to emit (preferably in the green) at said instant $t'$ a fourth main emission at a wavelength called $\lambda 4$ distinct from $\lambda 3$ (preferably distinct from $\lambda 3$ by at least 20 nm, 40 nm and even at least 80 nm, $\lambda 4$ preferably being green) and even distinct from $\lambda 2$, and preferably substantially equal to $\lambda 1$, and especially in order to emit (in the white, the red, or the green, the blue) at $t3 \neq t0$ and $t3 \neq t'$ a main (decorative or functional) emission that is better still distinct from the third and/or fourth (even from the first and/or second) main emission;

second light-extracting means (for extracting the light delivered by the guide) associated with the second glazing pane, comprising one or more second (preferably scattering) extracting features bounding a second extracting area (occupying all or some of the bonding face, preferably outside of a second marginal zone located on the side on which the optical coupling with the second source takes place, especially occupying a zone, such as a band, extending from the second edge face to the opposite edge face but preferably excluding said second marginal zone), the light thus extracted being visible on the exterior-face side, the second light-extracting means (especially a white scattering layer, preferably defined by a lightness $L^*$ of at least 50) being such that the light extracted at $t0$ is of a colour called C3 distinct from C1 (C3 preferably being in the red and corresponding to a closed state of an access door, of main emission $\lambda'3$ substantially equal to $\lambda 3$ and distinct from $\lambda'1$ by at least 20 nm, 40 nm and even 80 nm, $\lambda'3$ preferably being red) and preferably substantially equal to C2 ($\lambda'3$ substantially equal to $\lambda'2$) and preferably at said $t'$ of a colour called C4 distinct from C3 (C4 preferably being in the green and corresponding to an open state of an access door, C4 of main emission $\lambda'4$ substantially equal to $\lambda 4$ and distinct from $\lambda'3$ by at least 20 nm, 40 nm and even 80 nm) even distinct from C2 and preferably substantially equal to C1 ($\lambda'4$ substantially equal to $\lambda'1$); and second means for masking the light extracted (by the second extracting means) from the bonding-face side, these means being arranged on the bonding-face side and partially covering the bonding face and being chosen from at least one of the following means (and their combinations):

(preferably) opaque (in the sense that they are mainly absorbent) means in congruence with the second extracting means, in particular at least absorbent at the main wavelengths of C3 and/or C4 (and/or C1 and/or C2 depending on the opaque first masking means)—preferably the pair made up of the opaque first masking means/opaque second masking means is absorbent at least at the main wavelengths of C1 and C3 and of other possible colours C2, C4, etc.— these means being further away than the second extracting means from the bonding face and preferably (directly) on the second extracting means, and (preferably specular) reflective (in the sense that they are mainly reflective) means facing the second extracting means, and which are preferably (directly) on the second extracting means and further away from the second glazing pane than the second extracting means, which reflective means are preferably in congruence with the second extracting means or optionally project laterally beyond the second extracting means especially by at most 2 mm and preferably by less than 1 mm, especially substantially covering the second extracting area and around the second extracting area by at most 2 mm and preferably by less than 1 mm.

The glazing assembly furthermore comprises, between the first masking means and the second extracting means—if required between the first masking means and the second masking means distinct from the first masking means—a (preferably continuous, flat or curved) transparent optical isolator (of integral construction), called the first optical isolator, of refractive index $n2$ such that, at the wavelengths of the first light source (and preferably of the second source if there is only one isolator) (more preferably of all the visible spectrum) $n1-n2$ is at least 0.08, even at least 0.2 and more preferably at least 0.3 (and preferably if there is only one isolator $n'1-n2$ is at least 0.08 and even at least 0.2 and more preferably at least 0.3), which is located:

facing the internal face at least between the first extracting features (if there are more than one, or even in the aperture of a closed but apertured feature), preferably covering the first extracting area, and/or (preferably and) facing the internal face between the coupling first edge face and (the adjacent edge of) the first extracting area, and preferably facing the internal face between the first extracting area and the edge face opposite the first edge face, said first optical isolator preferably substantially covering the internal face (except possibly in a first so-called marginal zone located on the side on which the optical coupling with the first source takes place and even in other peripheral zones);

and if the first isolator is the only isolator, preferably facing the bonding face at least: between the second extracting features (if there are more than one, or even in the aperture of a closed but apertured feature), preferably covering the second extracting area, and/or (preferably and) between the second edge face and (the adjacent edge of) the second extracting area, and preferably between the second extracting area and the edge face opposite the second edge face, said first optical isolator then preferably substantially covering the bonding face (except possibly in a second so-called marginal zone located on the side on which the optical coupling with the second source takes place and even in other peripheral zones).

The first optical isolator—having first and second main surfaces—is laminated—via the first main surface—to the first glazing pane (with on the internal-face side the first masking means and even preferably the first extracting means underneath) by means of a first lamination interlayer, made of a first transparent, preferably thermoplastic or even thermosetting polymer that has a refractive index n3 such that, in absolute value, n3−n1 is lower than 0.05 and even lower than 0.03 at the wavelengths of the first light source and preferably in all of the visible spectrum. As a variant, the first optical isolator is air.

The glazing assembly furthermore comprises, between the first masking means and the second extracting means—if required between the first masking means and the second masking means spaced apart from the first masking means—a (preferably continuous and flat) transparent optical isolator (of integral construction), called the second optical isolator, that is merged with the first optical isolator or separate and closer to the second extracting means, of refractive index n'2 such that, at the wavelengths of the second light source (preferably of all the visible spectrum) n'1−n'2 is at least 0.08, and even at least 0.2 and more preferably at least 0.3, which is located:

facing the bonding face at least between the second extracting features (if there are more than one, or even in the aperture of a closed but apertured feature), preferably covering the second extracting area, and/or (preferably and) between the second edge face and (the adjacent edge of) the second extracting area, and preferably between the second extracting area and the edge face opposite the second edge face, said second optical isolator then preferably substantially covering the bonding face (except possibly in a second so-called marginal zone located on the side on which the optical coupling with the second source takes place and even in other peripheral zones).

The second optical isolator is laminated (via the second surface of the first optical isolator if they are merged) to the second glazing pane (and therefore on the bonding-face side and to the second masking means and even preferably the second extracting means) by means of a second lamination interlayer, made of a second transparent (preferably thermoplastic or even thermosetting) polymer (which second polymer is preferably made of a polymer identical or similar to the first polymer) that has a refractive index n'3 such that, in absolute value, n'3−n'1 is lower than 0.05 and even lower than 0.03 at the wavelengths of the second light source (and preferably in all of the visible spectrum).

The one or more optical isolators combined with the masking means guarantee the independence of the two lights, which in particular are switchable to form the signal of an access door:

at the instant t0: access colour, such as green, on a first side and waiting colour, such as red, on the second side;
at the instant t': inversion of the signal, stop colour on the first side and go colour on the second side.

In a signage application, for a train compartment, "free" may be written in green on one side and "reserved" in red on the other side, or, to separate a family space or a conventional space, the light may even, on the family side, form (geometric, coloured, etc.) patterns for children and be, on the conventional side, softer (and/or form one or more darker patterns) a warm white for example. It may be desirable to use a second optical isolator if the first optical isolator is located further away from the second glazing pane than from the first glazing pane and/or does not (sufficiently) isolate rays coming from the second light source because of its position or extent.

In a decorative application, for example for a divider between two offices, each person may choose the colour of their decor.

In a partition application between two spaces (in a building, outside, in a vehicle especially a means of public transport, etc.) a suitable decorative or (more) functional (illumination) function and/or one or more coloured luminous patterns that are suitably switched on and off (and of a suitable shape) may be provided to each space.

For example, it may be a question of a partition between two offices, two bedrooms or in a showroom or other space in a shop; it may be a question of a partition used to separate spaces, especially aisles, a totem for example, or even in a fitting room.

The opaque first masking means according to the invention may be (dark) black or grey or even white (typically achieved by increasing the thickness of the first extracting means). The opaque first masking means may also be coloured and sufficiently thick to be opaque at all the main wavelengths or have an opacity at only certain of the main wavelengths.

The (preferably opaque, or reflective) first masking means may be:

on the first optical isolator, especially a low-index film, on the face on the face on the internal-face side;
on the first interlayer, preferably on the face on the face on the internal-face side;
on the internal face or on the first extracting means on the face on the internal-face side.

They are preferably placed as close as possible to the first extracting means.

The (preferably opaque, or reflective) second masking means may cumulatively be:

on the second optical isolator, especially a low-index film, on the face on the bonding-face side;
on the second interlayer, preferably on the face on the bonding-face side;
on the bonding face or on the second extracting means on the face on the bonding-face side.

They are preferably placed as close as possible to the second extracting means.

Preferably, the first extracting means (especially a scattering layer, preferably of enamel or even ink or paint) are on the internal face, the first masking means comprising an opaque or even reflective layer (preferably of enamel or even ink or else paint), in congruence with and (directly) on the first extracting means, the first glazing pane with the assembly having on the internal-face side facing the first masking means:

an absorption (at the main wavelengths of C1 and/or C2 and/or C3 and/or C4 and even in all the visible) of at least 80% and even at least 90%;
a transmission factor (at the main wavelengths of C1 and/or C2 and/or C3 and/or C4 and even in all the visible) of at most 2% and even 1% or 0.5% (especially a TL of at most 2% and even 1% or 0.5%);
and/or an optical density of at least 2 and preferably at least 2.5 and even 3, more preferably from 2.8 to 4.5 and in particular from 3 to 4 .

Preferably, the second extracting means (especially a scattering layer, preferably of enamel or even ink or paint) are on the bonding face, the second masking means comprising an opaque or even reflective layer (preferably of enamel or ink), in congruence with and (directly) on the second extracting means, the assembly on the second glazing pane having, on the bonding-face side:

- an absorption (at the main wavelengths of C3 and/or C4 and/or even C1 and/or C2 depending on the first masking means) of at least 80% and even at least 90%;
- a transmission factor (at the main wavelengths of C3 and/or C4 and/or even C1 and/or C2 depending on the first masking means) of at most 2% and even 1% or 0.5% (especially a TL of at most 2% and even 1% or 0.5%);
- and/or an optical density of at least 2 and preferably at least 2.5 and even 3, more preferably from 2.8 to 4.5 and in particular from 3 to 4.

The first and/or opaque second masking means may be lined with a reflective layer, for example with a thin metal layer, on its face turned towards the extracting means—it is enough for the assembly to have the above optical density, transmission and absorption.

Alternatively, the first masking means are (mainly) reflective and may be located on the internal-face side and the first extracting means on the external-face side. Preferably, the first masking means are (directly) on the first extracting means, which are on the internal face.

The first glazing pane with the reflective first masking means may have a transmission factor (at the main wavelengths of C1 and/or C2 and/or C3 and/or C4 and even in all the visible) of at most 2% and even of at most 1% or of at most 0.5% (especially a TL of at most 2% and even of at most 1%) and an RL of at least 90%. TL and RL are measured on the internal-face side facing the reflective first means.

Likewise, the second masking means are (mainly) reflective (like the first masking means) and may be located on the bonding-face side and the second extracting means on the exterior-face side. Preferably, the second masking means are (directly) on the second extracting means, which are on the bonding face.

The second glazing pane with the reflective second masking means may have a transmission factor (at the main wavelengths of C3 and/or C4 and/or even C1 and/or C2 depending on the first masking means) of at most 2% and even of at most 1% or of at most 0.5% (especially a TL of at most 2% and even of at most 1%) and an RL of at least 90%. TL and RL are measured on the bonding-face side facing the reflective second means.

The reflective first masking means may be (directly) on and between the first features, therefore in an unapertured zone substantially encompassing the first extracting area. The reflection is specular if these means are present between the first extracting features (forming an unapertured layer in the first extracting area) and/or in the optical coupling zone.

Preferably, the reflective first masking means are congruent and even (directly) on the first extracting means or do not project sideways therefrom by more than 2 mm and even less than 1 mm so as:

- to preserve the overall transparency of the first extracting area and of the coupling zone (before the extracting feature closest to the first edge face);
- and/or to preserve the guidance by total internal reflection—especially using the first optical isolator—thereby allowing a better extraction efficiency to be obtained than with specular reflection.

The same goes for the second masking means. Preferably, the reflective second masking means are congruent and even (directly) on the second extracting means or do not project sideways therefrom by more than 2 mm and even less than 1 mm.

Preferably the first (second, respectively) reflective or opaque masking means do not make direct contact with the first (second, respectively) optical isolator, especially a porous layer.

The reflective first masking means may be a coating (a silvered coating, or a thin-film mono- or multilayer containing at least one functional metal layer such as a silver and/or aluminium and/or copper and/or gold layer) (directly) on the first extracting means or on the internal face (first extracting means on the exterior face) or even on the first lamination interlayer oriented internal-face side or even bonding-face side, or even on an additional (transparent) carrier (for example a plastic or glass film).

The (preferably opaque, or reflective) second masking means are preferably made of the same material as the first means described above and are even in congruence.

The assembly consisting of the first glazing pane/first extracting means/first masking means may be preferably identical to the assembly consisting of the second glazing pane/second extracting means/second masking means.

Preferably, between the first optical isolator that is a low-index film (described in detail below) and the internal face no elements other than the aforementioned are added. Preferably, between the second optical isolator that is a low-index film (described in detail below) and the bonding face no elements other than the aforementioned are added.

The (especially opaque) first and second masking means may be merged when the second scattering features are in congruence with the first scattering features, and:

- preferably, the opaque first masking means absorb the principal wavelengths of C1 and C3 (and if required of C2 or even C4) and are especially black or over-thick (white, etc.);
- or the first masking means reflect the main wavelengths of C1 and C3 (and if required of C2 or even C4).

In other words, the first masking means, distant from the second extracting means and preferably (directly) on the first extracting means, then serve to produce the one-way vision both on the first-glazing side and on the second-glazing side. However, to be sure, even in this congruent configuration (same shape, same size, coincident), separate (opaque) second masking means are preferably added:

- to reinforce opacity (in the case where the opaque first means have a TL that is still too high);
- or to reinforce the reflection of light (in the case where the reflective first means have a TL that is still too high).

An opaque coating, especially congruent with the extracting means, such as an enamel, an ink or a paint are preferred.

The second masking means are identical to the first means from the point of view of opacity or complementary to the first means in order to obtain an opacity at all the main wavelengths C1, C3 (C2, C4 and possibly others), preferably at all the wavelengths emitted by the first and second sources. On the internal-face side or bonding-face side, facing the first or second masking means, the transmission factor at each main wavelength is preferably at most 1% or even at most 0.5%.

Advantageously, the first extracting means are on the internal face, the first masking means comprising (consisting of) an opaque or even reflective layer in congruence with and (directly) on the first extracting means, the transmission factor at the main wavelengths of C1 and/or C2 and/or C3 and/or C4 (preferably red and/or green) and preferably in all the visible on the internal-face side facing the first masking means preferably being at most 1% or even at most 0.5%, and preferably the second extracting means are on the bonding face, the second masking means comprising (consisting of) an opaque or even reflective layer in congruence with and (directly) on the second extracting means, the transmission factor at the main wavelengths of C1 and/or C2 and/or C3 and/or C4 (preferably red and/or green, preferably complementary to or reinforcing the first masking means) and preferably in all the visible on the bonding-face side facing the second masking means preferably being at most 1% or even at most 0.5%.

Furthermore, the first extracting area may be congruent with the second extracting area and even arranged therein, the first masking and extracting means possibly being congruent with the second masking and extracting means.

In one preferred embodiment, to produce the one-way vision of each of the first and second extracting features, the first extracting means comprise (consist of) a scattering enamel layer—especially containing a preferably white mineral pigment—on the internal face, the first masking means comprise (consist of) an opaque enamel layer—especially containing a (black or coloured or even white) mineral pigment—in congruence with and (directly) on the scattering enamel layer, the transmission factor at the main wavelengths of C1 and/or C2 and/or C3 and/or C4 (preferably green and/or red) and preferably in the visible on the internal-face side facing the first masking means preferably being at most 1% (and even at most 0.5%).

Furthermore, the second extracting means comprise (consist of) a scattering enamel layer—especially containing a mineral pigment—on the bonding face, the (optional) second masking means comprise (consist of) an opaque enamel layer—containing a (black or coloured or even white) mineral pigment—in congruence with and (directly) on the scattering enamel layer, the transmission factor at the main wavelengths of C1 and/or C2 and/or C3 and/or C4 (preferably complementary to or reinforcing the first masking means, preferably green and/or red) and preferably in the visible on the bonding-face side facing the second masking means preferably being at most 1% (and even at most 0.5%).

Furthermore, the first extracting area may be congruent with the second extracting area and even, preferably, the first masking and extracting means may be congruent with the second masking and extracting means.

The scattering layer is preferably white, defined by a lightness L* of at least 50. Preferably, the mineral pigment is chosen such that it is white in colour. This pigment is especially titanium oxide $TiO_2$. Advantageously, this white mineral pigment has a lightness L* such as defined in the CIE Lab (1931) colour space that ranges from 65 to 85, measured on the first glazing pane.

The lightness L* may be measured under the conditions described in the CIE (1931) protocol using a $D_{65}$ illuminant, an observer at 10°, in SCE mode (specular component excluded) diffuse 8° (CM 600 Minolta).

The (wet or final) thickness of the scattering enamel layer is preferably larger than the thickness of the opaque enamel layer (directly) above.

For the first (and even the second) masking means, the mineral pigment is preferably chosen from pigments that allow a black colour to be obtained. By way of example, mention may be made of pigments based on chromium, iron, manganese, copper and/or cobalt, especially in the form of oxides or sulphides. Although pigments based on chromium allow an intense black colour to be obtained, they are not preferred because of problems related to their potential toxicity and their recycling. Thus, preferably, the mineral pigment is free from chromium.

Advantageously, the black mineral pigment has a lightness L* such as defined in the CIE Lab (1931) colour space that is lower than or equal to 15 and preferably lower than or equal to 10 measured on the mask side.

The mineral pigment used for the mask may be a colour other than black, and is for example based on $Cr_2O_3$ (green in colour), $Co_3O_4$ (blue in colour), cobalt blue or based on iron oxide, on $Fe_2O_3$ (brown).

The glass frit of the scattering layer is free from lead oxide PbO for reasons related to the protection of the environment.

Preferably, the glass frit is a borosilicate based on bismuth oxide $Bi_2O_3$ and/or zinc oxide ZnO. For example, the $Bi_2O_3$-based glass frit contains 35 to 75% by weight $SiO_2$ and 20 to 40% by weight $Bi_2O_3$, advantageously 25 to 30%. For example, the ZnO-based glass frit contains 35 to 75% by weight $SiO_2$ and 4 to 10% by weight ZnO.

The glass frit for example has the following composition (in weight percent): 54% $SiO_2$, 28.5% $Bi_2O_3$, 8% $Na_2O$, 3.5% $Al_2O_3$ and 3% $TiO_2$, the rest consisting of BaO; CaO, $K_2O$, $P_2O_5$, SrO and ZnO.

The manufacture of an assembly of discrete black/white features (having a form inverted relative to the scattering/opaque features according to the invention) is described in patent WO2012/172269 or even in EP 1 549 498.

The external (exterior, respectively) face is preferably free (of coatings, coverings) except optionally the first extracting means (second extracting means, respectively).

Most of the rays are guided by total internal reflection at the air/external face interface and at the interface between the first interlayer and the first optical isolator. The first (second) optical isolator and the first (second) lamination interlayer are transparent and have refractive indices suitable for the propagation of the guided rays. Most of the rays that are refracted and reach the first optical isolator are reflected; however, large-angle rays emitted into a zone, called the first marginal zone, near the optical-coupling region are not reflected, as will be described in more detail below. Preferably, hotspots are concealed, over a width W of at least 1 cm and preferably of at most 5 cm and more preferably 3 cm, by a profile.

The first and second light sources are preferably arranged on the same side of the glazing assembly (the first and second edge faces are on the same side) if the edge faces opposite the first and second edge faces are visible. The luminous glazing assembly may comprise on the periphery of the first edge face and of the second edge face, a profile, especially one at least partially made of metal, extending over the external face preferably by a distance W of between 1 cm and 3 cm, enclosing or bearing the first light source and the second light source. The profile may thus serve to mask hotspots from sight.

The profile does not necessarily make optical contact with the external face.

The profile may be:
  adhesively bonded by an opaque adhesive or double-sided tape that will absorb the large-angle rays;
  or be adhesively bonded by a transparent adhesive or double-sided tape, the large-angle rays are reflected by the reflective profile and exit further on or are absorbed by the opaque (area of the profile made opaque) profile.

A second object of the invention is a luminous glazing assembly, especially for an access door between first and second spaces, comprising:
  a first (transparent, clear, extra clear and preferably tempered) glazing pane, preferably made of mineral, and even tempered, or even organic, glass of refractive index n1 preferably lower than 1.6 at 550 nm (more preferably in all the visible spectrum), and even lower than 1.55 at 550 nm (more preferably in all the visible spectrum) or better still lower than or equal to 1.53 at 550 nm (more preferably in all the visible spectrum), preferably from 1.5 to 1.53, having main faces referred to as the internal face and the external face, and a first edge face;

a first source of (visible) light, preferably an assembly of light-emitting diodes (aligned on a first PCB carrier, in (a) strip(s)) or even an extracting optical fibre with a primary light source (diode(s)), optically coupled to the first glazing pane via the first edge face or even via one of the faces on the periphery of the first edge face (especially if a lodging is provided for the diodes), the first glazing pane guiding the light emitted by the first light source, the first light source being controlled statically or (preferably) dynamically in order to emit (preferably in the green) at the instant t0 a first main emission at a first wavelength called λ1 (λ1 preferably being green) and preferably switchable in order to emit (preferably in the red) at the instant t'≠t0 a second main emission at a second wavelength called λ2 distinct from λ1 (preferably distinct from λ1 by at least 20 nm, 40 nm and even at least 80 nm, λ2 preferably being red), and especially in order to emit (in the white, the red, or the green, the blue) at t3≠t0 and t3≠t' a main (decorative or functional) emission that is better still distinct from the first and/or second main emission;

first light-extracting means (for extracting the light delivered by the guide) associated with the first glazing pane, comprising one or more first (preferably scattering) extracting features and bounding a first extracting area (occupying all or some of the internal face, preferably outside of a first marginal zone located on the side on which the optical coupling with the first source takes place, especially occupying a zone, such as a band, extending from the first edge face to the opposite edge face but preferably excluding said first marginal zone), the light extracted being visible on the external-face side, the first extracting means (especially a white scattering layer, preferably defined by a lightness L* of at least 50) being such that the light extracted at said t0 is of a first colour called C1 (C1 preferably being in the green and corresponding to an open state of an access door, C1 of main emission λ'1 substantially equal to λ1) and preferably at said t' is of a second colour called C2 distinct from the first colour C1 (C2 preferably being in the red and corresponding to a closed state of an access door, and C2 of main emission λ'2 substantially equal to λ2), the first light-extracting means in particular preferably comprising scattering means located on the internal-face side (preferably on the internal face, even in/on a first lamination interlayer, etc.), and/or on the external-face side (even preferably on the external face) and/or in the bulk of the first glazing pane, these means optionally concentrating the light;

first means for masking the extracted light (of the first extracting means) from the internal-face side, these opaque (mainly absorbent)—especially at least absorbent at the main wavelengths of C1 and/or C2 (and/or of C3 and/or C4 defined below)—or reflective (mainly reflective) means being arranged on the internal-face side at least facing the first extracting means and preferably covering the first extracting area and even the internal face;

between the first extracting means and the first masking means, a first transparent optical isolator, of refractive index n2 such that, at the wavelengths of the first light source (and preferably in all of the visible spectrum) n1−n2 is at least 0.08, even at least 0.2 or preferably 0.3, said optical isolator facing the internal face at least: between the first extracting features (if there are more than one, or in the hollow of a closed but apertured feature), preferably covering the first extracting area, and/or (preferably and) facing the internal face between the coupling first edge face and (the adjacent edge of) the first extracting area, and preferably facing the internal face between the first extracting area and the edge face opposite the first edge face, said first optical isolator possibly substantially covering the internal face (except possibly in a first so-called marginal zone located on the side on which the optical coupling with the first source takes place);

making optical contact with the first glazing pane, especially separated by one or more layers, a second glazing pane (preferably made of transparent, clear, extra clear and preferably tempered mineral and even tempered or even organic (especially rigid) glass) of refractive index n'1 especially lower than 1.6 at 550 nm, and even lower than 1.55 at 550 nm (more preferably in all the visible spectrum) or better still lower than or equal to 1.53 at 550 nm (more preferably in all the visible spectrum), preferably from 1.5 to 1.53, having main faces referred to as the bonding face and the exterior face, the bonding face facing the internal face, and an edge face called the second edge face (the latter being aligned with the first edge face or offset therefrom towards the exterior of the glazing assembly, leaving a peripheral band of the bonding face projecting beyond the first edge face or the edge face opposite the first edge face);

a second light source, preferably an assembly of light-emitting diodes (aligned on a second PCB carrier, in (a) strip(s), and preferably identical to the first light source) or even an extracting optical fibre with a primary light source (diode(s)), optically coupled to the second glazing pane via the second edge face or even via one of the faces on the periphery of the second edge face (especially if a lodging is provided for the diodes), the second glazing pane guiding the light emitted by the second light source (the second edge face either being on the same side as the first edge face and aligned or offset towards the interior of the glazing assembly or being on the side opposite the first edge face), the second light source being controlled, statically or (preferably) dynamically in order to emit at said instant t0 (preferably in the red) a third main emission at a wavelength called λ3 distinct from λ1 (preferably distinct from λ1 by at least 20 nm, 40 nm and even at least 80 nm, λ3 preferably being red) and even preferably substantially equal to λ2 and preferably in order to emit dynamically (preferably in the green) at said instant t' a fourth main emission at a wavelength called λ4 distinct from λ3 (preferably distinct from λ3 by at least 20 nm, 40 nm and even at least 80 nm, λ4 preferably being green) and even distinct from λ2, and preferably substantially equal to λ1, and especially in order to emit (in the white, the red, or the green, the blue) at t3≠t0 and t3≠t' a main (decorative or functional) emission that is better still distinct from the third and/or fourth (and even from the first and/or second) main emission;

second light-extracting means associated with the second glazing pane, comprising one or more second (preferably scattering) extracting features and bounding a second extracting area (occupying all or some of the bonding face, preferably outside of a second marginal zone located on the side on which the optical coupling with the second source takes place, especially occupying a zone, such as a band, extending from the second edge face to the opposite edge face but preferably excluding said second marginal zone), the light extracted from the second glazing pane being visible on the exterior-face side, the second extracting area preferably facing and even being congruent with the first extracting area, these second light-extracting means (especially a white scattering layer, preferably defined by an L* of at least 50) are such that the light extracted at t0 is of a colour called C3 distinct from C1 (C3 preferably being in the red and corresponding to a closed state of an access door, C3 of main emission λ'3 substantially equal to λ3 and distinct from λ'1 by at least 20 nm, 40 nm and even 80 nm, λ'3 preferably being red) and preferably substantially equal to C2 (λ'3 substantially equal to λ'2) and preferably at said t' the extracted light is of a colour called C4 distinct from C3 ( C4 preferably being in the green and corresponding to an open state of an access door, C4 of main emission λ'4 substantially equal to λ4 and distinct from λ'3 by at least 20 nm and even 40 nm or 80 nm, λ'4 being green) or even distinct from C2 and preferably substantially equal to C1 (λ'4 substantially equal to λ'1);

second means for masking the extracted light from the bonding-face side, these opaque (mainly absorbent) or reflective (mainly reflective) means being arranged on the bonding-face side at least facing the second extracting means and preferably covering the second extracting area and even the bonding face; and between the second extracting means and the second masking means, a second transparent optical isolator, of refractive index n'2 such that, at the wavelengths of the second light source (and preferably in all of the visible spectrum) n'1−n'2 is at least 0.08, even at least 0.2 or 0.3, said optical isolator facing the bonding face at least: between the second extracting features (if there are more than one, or even in the aperture of a closed but apertured feature), preferably covering the second extracting area, and/or preferably facing the bonding face between the coupling second edge face and (the adjacent edge of) the second extracting area, and preferably facing the bonding face between the second extracting area and the edge face opposite the second edge face, said second optical isolator possibly substantially covering the bonding face (except possibly in a second so-called marginal zone located on the side on which the optical coupling with the second source takes place).

The first isolator has a first main surface on the internal-face side (and a second main surface on the bonding-face side):

the first main surface is (directly) on the internal face (optionally—locally
on the first extracting means on the internal-face side);

or the first isolator is laminated, via the first main surface, to the first glazing pane by means of a first lamination interlayer made of a first (preferably thermoplastic or even thermosetting) transparent polymer that has a refractive index n3 such that, in absolute value, n3−n1 is lower than 0.05 and even lower than 0.03 at the wavelengths of the first light source.

The second optical isolator, having a third main surface on the bonding-face side (and a fourth main surface on the internal-face side):

the third main surface is (directly) on the bonding face (optionally—locally—on the second extracting means on the bonding-face side);

or the second optical isolator is laminated via said third main surface to the second glazing pane by means of a second lamination interlayer made of a second (preferably thermoplastic or even thermosetting) transparent polymer (preferably identical or similar to the first polymer) that has a refractive index n'3 such that, in absolute value, n'3−n'1 is lower than 0.05 and even lower than 0.03 at the wavelengths of the second light source.

Furthermore, the glazing assembly comprises, between the first optical isolator and the second optical isolator, what is called a central lamination interlayer made of a polymer that is called a third polymer, especially in order to join first and/or second masking means, said interlayer especially being transparent (preferably thermoplastic or even thermosetting and preferably identical or similar to the first polymer).

Here, two optical isolators are used, flanking the first and second laminated masking means (means that may be merged as described below), for one-way vision for each of the glazing panes:

the first isolator preventing the first and (optional) second main emissions from being absorbed by the first masking means as otherwise extraction from certain of the first scattering features, especially those furthest from the first source, would be greatly limited;

the second isolator preventing the third and (optional) fourth main emissions from being absorbed by the second masking means as otherwise extraction from certain of the second scattering features, especially those furthest from the second source, would be greatly limited;

The second extracting area preferably faces the first extracting area, and is even:

(entirely) congruent with the first extracting area;

or at least has one zone congruent with and another zone (horizontally and/or vertically) offset from the first extracting area, allowing the second masking means to be seen;

or else is smaller in size than the first extracting area and is inscribed within the first extracting area and in congruence with a zone of the first extracting area (some of the first masking means remaining visible).

The first extracting area may be congruent with the second extracting area and/or the first masking and extracting means may be congruent with the second masking and extracting means.

According to the invention (both for the first and second object), the expression "second extracting area congruent with a first extracting area" is understood to mean an area of the same shape (same general outline), the same size and exactly coincident or coincident with a submillimeter even at most 500 µm and even 100 µm lateral resolution. The first and second areas are generally areas with discontinuities. Within the extracting areas the second extracting features are preferably congruent with the first extracting features.

According to the invention, the expression "first opaque feature(s) congruent with first extracting feature(s)" is understood to mean, in an unapertured area, that each opaque feature has the same shape and the same size and is coincident with a submillimeter even at most 500 μm and even 100 μm lateral resolution.

According to the invention, the expression "second extracting feature(s) congruent with second extracting feature(s)" is understood to mean, in an unapertured area, that each second feature has the same shape and the same size and is coincident with a submillimeter even at most 500 μm and even 100 μm lateral resolution.

For example, disc-shaped first features and square second features are considered to be congruent if they satisfy the aforementioned lateral resolution. Disc-shaped first features and smaller disc-shaped second features are considered to be congruent with the aforementioned lateral resolution.

The second area may be larger than the first extracting area and comprise a congruent zone (and preferably with second extracting features congruent with the first extracting features) and a zone offset from the first extracting area.

The second area may be smaller than the first extracting area and inscribed therein, therefore with a congruent zone (and preferably with second extracting features congruent with the first extracting features). The first area may therefore have a masked extracting zone that is not facing a second extracting area.

For increased safety, in particular for an access door, it is preferably chosen to laminate the first and second glazing panes and to use a first (and second) optical isolator making optical contact with these glazing panes. As a variant, in particular for the first object, the first and second optical isolators and the first and second lamination interlayers are removed and the first and second glazing panes are spaced apart by air (ideal optical isolator) and joined (sealed) on the periphery, preferably with spacers, for example as double glazing units (insulating or vacuum glazing units). The first masking means are preferably in congruence with and spaced apart from the second masking means.

On the edge face of the glazing assembly, on the side opposite the first (and even the second) edge face, a polymer seal may be added, this seal for example being made of a black elastomer. The seal does not hinder the light guidance, and preferably does not make optical contact with the external (even exterior) face and is smaller than 3 cm in width and may even house other optically coupled light sources. This seal may be added to a profile, for example a U-shaped metal profile, for mounting the glazing assembly (or for holding light sources).

In the second object, the first and second masking means may be merged when the second extracting means (feature(s)) are in congruence with the first extracting means and/or when the first masking means (substantially) cover the internal face and the bonding face (especially in all but one or more marginal zones closely associated with the optical couplings), in particular comprising or consisting of an opaque (black, coloured, even white) coating or even an opaque film.

In the second object, the first masking means comprise (preferably consist of) a preferably opaque coating, such as an ink, a paint or an enamel, especially an ink (printed) or paint on the central lamination interlayer (on the internal-face or bonding-face side) or an opaque coating on a (flexible) additional, especially plastic or mineral glass carrier (such as a polyethylene terephthalate (PET) or even (ultra) thin glass sheet) optionally adhesively bonded or laminated to the first glazing pane. For example it is a question of a lacquered glass sheet of at least 3 mm, such as the product Planilaque Evolution or Décolaque from the Applicant, laminated via the central lamination interlayer.

Naturally, the first emission has a first given spectral range. Naturally, the second emission has a second given spectral range.

The expression "first (second, respectively) main emission" is, according to the invention, understood to mean the most intense emission in the spectral range emitted at the instant t0 (t', respectively) by the first light source. Furthermore, the expression "third (fourth, respectively) main emission" is, according to the invention, understood to mean the most intense emission in the spectral range emitted at the instant t0 (t', respectively) by the second light source.

Preferably, the spectral range of the first emission is narrow, at most 50 nm, and does not overlap with the spectral range of the second emission, which is also narrow, or overlaps by less than 50 nm for normalised intensities lower than 0.15, for example overlap between the red and the amber or between the green and the blue.

Preferably, signalling colours that are currently commonly employed are used. Therefore:
at t0: the first source emits in the green with $\lambda 1$ in a range extending from 515 nm to 535 nm and preferably of spectral width at half-maximum of less than 50 nm (and the light extracted C1 is green defined by a first main emission extracted at $\lambda 1'$ substantially equal to $\lambda 1$, for example distinct by at most 10 nm or 5 nm and preferably with a spectral width at half-maximum of less than 30 nm); and
the second source emits in the red with $\lambda 3$ in a range extending from 615 nm to 635 nm and preferably of spectral width at half-maximum of less than 30 nm (and the light extracted C3 is red defined by a third main emission extracted at $\lambda 3'$ substantially equal to $\lambda 3$, for example distinct by at most 10 nm or 5 nm and preferably with a spectral width at half-maximum of less than 30 nm), or even being white; and
at t': the first source emits in the red with $\lambda 2$ in a range extending from 615 nm to 635 nm and preferably of spectral width at half-maximum of less than 30 nm (and the light extracted C2 is red defined by a second main emission extracted at $\lambda 1'$ substantially equal to $\lambda 1$, for example distinct by at most 10 nm or 5 nm and preferably with a spectral width at half-maximum of less than 30 nm); and
preferably, the second source emits in the green with $\lambda 4$ in a range extending from 515 nm to 535 nm and preferably of spectral width at half-maximum of less than 50 nm (and the light extracted C4 is green defined by a fourth main emission extracted at $\lambda 4'$ substantially equal to $\lambda 4$, for example distinct by at most 10 nm or 5 nm and preferably with a spectral width at half-maximum of less than 30 nm), or alternatively the first source continues to emit in the red with $\lambda 4$ in a range extending from 615 nm to 635 nm and preferably of spectral width at half-maximum of less than 30 nm (and the light extracted C4 is red defined by a fourth main emission extracted at $\lambda 4'$ substantially equal to $\lambda 1$, for example distinct by at most 10 nm or 5 nm and preferably with a spectral width at half-maximum of less than 30 nm).

Furthermore, preferably:
the first extracting means are scattering means obtained by delustering the external face and the second extracting means are scattering means obtained by delustering the exterior face;

or, more preferably, the first extracting means comprise a (white, enamel) scattering layer, preferably on the internal-face side, and the second extracting means comprise a (white, enamel) scattering layer, preferably on the bonding-face side.

In another configuration, for example, at t3 each source emits in the green or in the white. It is also possible for one of the sources to be turned off (therefore the following configurations: red and off-state; green and off-state; white and off-state). Provision may be made for a number of decorative zones of distinct colours.

Advantageously, the first light source is an assembly of light-emitting diodes that are located—preferably aligned—on a printed circuit board referred to as the first PCB carrier (preferably a strip) and coupled to the first edge face, and the second light source is an assembly of light-emitting diodes that are located—preferably aligned—on a printed circuit board referred to as the second PCB carrier and coupled to the second edge face, which edge face is preferably aligned (even offset from) the first edge face or aligned or even offset from the edge face opposite the first edge face.

The first and second PCB carriers are spaced apart, contiguous or a common PCB carrier (first and second edge face on the same side) for example bonded with a thermal adhesive to a metal profile.

The first (second) PCB carrier or the common carrier may be made of a metal (aluminium, copper, etc.) or an (epoxy) resin composite reinforced with glass fibres (often referred to as an FR-4 board). It preferably has a millimeter-sized thickness (preferably less than 10 mm) or even a thickness of at most 1 mm.

Naturally, the glazing assembly may also operate in a static mode, i.e. provide only the combination C1 and C3 (or C1 and off-state of C2, or C3 and off-state of optional C4). In this case, the first light source may even contain only first diodes at $\lambda 1$ and the second light source only third diodes at $\lambda 3$.

At t0 the first source comprises a first diode that emits in the green with $\lambda 1$ in a range extending from 515 nm to 535 nm, and at t' the first source comprises a second diode that emits in the red with $\lambda 2$ in a range extending from 615 nm and 635 nm.

The response of the eye is better in the green than in the red and furthermore (mineral or organic) glass absorbs red more than green. The red colour seen may therefore be too pale.

Thus, preferably, the electrical circuit of the first diode is adjusted (suitable resistor(s), etc.) so that the flux F1 (or the power) emitted by the first diode is lower than 0.8 times, even lower than or equal to 0.7 or 0.6 times the flux F2 (or the power) emitted by the second diode. Preferably, the same goes for the second light source emitting in the red at t0 then in the green at t'.

To obtain a flux F1 lower than F2 the light intensity of the red diode may be adjusted so that it is higher than that of the green diode and/or the number of red diodes per unit length of PCB carrier on the first PCB carrier may be higher than the number of green diodes per unit length of PCB carrier.

Preferably, the same goes for the second light source emitting in the red at t0 then in the green at t'.

For example, on the first (second, respectively) PCB carrier n times the following sequence may be used, n being an integer higher than or equal to 1: two red diodes/one green diode, etc.

In the case of a common PCB carrier:
for the first assembly of diodes, n times the following sequence may be used, n being an integer higher than or equal to 1: two red diodes/one green diode, etc.; and
for the second assembly of diodes, n' times the following sequence may be used, n' being an integer higher than or equal to 1 and preferably equal to n: two red diodes/one green diode, etc.

The luminance normal to the external-face side (exterior-face side, respectively) when C1 is green (or C2 is red) is preferably at least 80 cd/m$^2$ in particular for access doors. The luminance normal to the external-face side (exterior-face side, respectively) is preferably uniform to +/−10 cd/m$^2$.

At t0, the luminance normal to the external-face side when C1 is green may be lower than the luminance normal to the external-face side when C2 is red on the external-face side in order to take into account the response of the eye, in particular for access doors.

The first and second light sources are preferably arranged on the same side of the glazing assembly (especially if the opposite edge faces are left free) and especially masked by a mounting profile of the glazing assembly that may even also bear the first and second light sources.

The first light source is preferably a first assembly of light-emitting diodes that are located—preferably aligned—on a printed circuit board referred to as the first PCB carrier (preferably a strip) and coupled to the first edge face by adhesive bonding to the first edge face with an optical adhesive or a transparent double-sided adhesive or spaced apart from the first edge face by at most 5 mm and even at most 2 mm—by air (or vacuum). Furthermore, the second light source is preferably a second assembly of light-emitting diodes that are located—preferably aligned—on a printed circuit board referred to as the second PCB carrier and coupled to the second edge face:
by adhesive bonding to the second edge face with an optical adhesive or a transparent double-sided adhesive (smaller than 50 µm in thickness) when the diodes have a primary encapsulation;
or spaced apart from the second edge face by at most 5 mm and even at most 2 mm—by a space, by air (or vacuum)—especially when the diodes do not have a primary encapsulation.

The first and second PCB carriers may be located on a common PCB carrier if the first and second edge faces are on the same side and preferably substantially aligned (for a distance of at most 5 mm and even at most 2 mm between diodes and first or second edge faces).

For top-emitting diodes (conventional diodes), the common PCB carrier may therefore be sufficiently wide to bear first and second assemblies of diodes. The common PCB carrier (and the diodes) may even be bonded to the first and second edge faces of the glazing assembly by an optical adhesive or a transparent double-sided adhesive above all when the diodes have a primary encapsulation.

For side-emitting diodes, the common carrier bears the first assembly on a first main face and the second assembly on the opposite face. A metal PCB is then preferred for reasons of heat dissipation. Alternatively, the PCBs are for example adhesively bonded or spaced apart by a metal part.

The first and second glazing pane form a laminated glazing unit (including the interlayers and the film optical isolator(s) or the optical isolator(s) deposited on the glass) comprising what is called a central edge face between the first and second edge faces and between the internal and bonding faces).

Above all if their emission patterns are wide (emission half angle at half-maximum of at least 50° even at least 60°, for example), and even when the emitting faces are a distance away from the edge faces of at most 5 mm and even of at most 2 mm, provision may be made for what is called a common partition that is reflective, such as a metal (such as aluminium, etc.) part or a part comprising two reflective (metal, etc.) coatings on either side, or even opaque, or a part comprising two opaque coatings on either side, said common partition being located between the first and second light sources (preferably diodes) if they are arranged on the same side of the glazing assembly, especially of the laminated glazing unit (especially when there is no notable offset, more than 1 mm, between the first edge face and the second edge face), this common partition completely or partially preventing refraction of the light emitted by the first light source (diodes) at the central edge face and completely or partially preventing refraction of the light emitted by the second light source (diodes) at the central edge face.

The first and/or second PCB carrier, or even what is called a common PCB carrier forming the first and second PCB carriers, for example has a main face facing the first and second edge faces, and the first and/or second PCB carrier, or even the common PCB carrier, bears the common partition.

Especially if the light source (diodes) are arranged on separate (opposite even adjacent) sides, especially opposite sides of the laminated glazing unit (and therefore on first and second edge faces of two separate, especially opposite, sides of the laminated glazing unit, provision is made for what is called a first partitioning means, which is reflective (for instance a metal, especially aluminium etc., part) or a part comprising a reflective (metal etc.) coating, or even opaque or a part comprising an opaque coating, completely or partially preventing refraction of the light emitted by the first light source (diodes) at the central edge face, and for what is called a second partitioning means, which is reflective (for instance a metal, especially aluminium etc., part) or a part comprising a reflective (metal etc.) coating, or even opaque (especially a part comprising an opaque coating), completely or partially preventing refraction of the light emitted by the second light source (diodes) at the central edge face.

The first (second, respectively) partition preferably reflects and/or absorbs (all or some, at least most) of the most lateral rays—for example emitted in the green—of the first (second, respectively) source, which rays are not guided into the first (second, respectively) edge face and could be guided into the central edge face and extracted via the second (first, respectively) extracting means—for example intended to extract red light.

The common partition preferably reflects and/or absorbs (all or some, at least most of)
the most lateral rays—for example emitted in the green—of the first source, which rays are not guided into the first edge face and could be guided into the central edge face and extracted via the second extracting means—for example intended to extract red light; and
the most lateral rays—for example emitted in the red—of the second source (diodes), which rays are not guided into the second edge face and could be guided into the central edge face and be extracted via the first extracting means—for example intended to extract green light.

According to the invention, the common partition may be an opaque (and/) or metal part, especially a part made of aluminium, parallel to the plane of the laminated glazing unit and against the central edge face.

According to the invention, the common partition may be a part comprising an opaque coating on the first-source (diodes) side, (substantially) parallel to the plane of the first glazing pane, and an opaque coating on the second-source (diodes) side, (substantially) parallel to the plane of the second glazing pane.

The first opaque partition has:
an absorption (at the main wavelengths $\lambda 1$, even $\lambda 2$, even in all the visible) of at least 80% and even of at least 90% or of at least 95%, and a transmission factor (at the main wavelengths $\lambda 1$, even $\lambda 2$ and even in all the visible) of at most 2% and even of at most 1% or of at most 0.5% (especially a TL of at most 2% and even 1% or 0.5%);
and/or an optical density of at least 2 and preferably at least 2.5 and even 3, more preferably from 2.8 to 4.5 and in particular from 3 to 4.

The second opaque partition has:
an absorption (at the main wavelengths $\lambda 3$, even $\lambda 4$, even in all the visible) of at least 80% and even of at least 90% or of at least 95%, and a transmission factor (at the main wavelengths $\lambda 3$, even $\lambda 4$ and even in all the visible) of at most 2% and even of at most 1% or of at most 0.5% (especially a TL of at most 2% and even 1% or 0.5%);
and/or an optical density of at least 2 and preferably at least 2.5 and even 3, more preferably from 2.8 to 4.5 and in particular from 3 to 4.

The opaque common partition has:
an absorption (at the main wavelength $\lambda 1$, even at $\lambda 2$, even in all the visible) of at least 80% and even of at least 90% or of at least 95%, and a transmission factor (at the main wavelengths $\lambda 1$, even $\lambda 2$ and even in all the visible) of at most 2% and even of at most 1% or of at most 0.5% (especially a TL of at most 2% and even 1% or 0.5%);
and/or an optical density of at least 2 and preferably at least 2.5 and even 3, more preferably from 2.8 to 4.5 and in particular from 3 to 4.

And:
an absorption (at the main wavelengths $\lambda 3$, even $\lambda 4$, even in all the visible) of at least 80% and even of at least 90% or of at least 95%, and a transmission factor (at the main wavelengths $\lambda 3$, even $\lambda 4$ and even in all the visible) of at most 2% and even of at most 1% or of at most 0.5% (especially a TL of at most 2% and even 1% or 0.5%);
and/or an optical density of at least 2 and preferably at least 2.5 and even 3, more preferably from 2.8 to 4.5 and in particular from 3 to 4.

At a pinch, a scattering partition having a low $T_L$ (transmission factor in the visible of less than 2%) could be chosen, but some of the rays may still end up in the wrong place (be guided into the glass and not absorbed by an anti-mixing band).

By way of an example (opaque) partition, mention may be made of a part comprising a deposit (enamel, paint, etc.) or an opaque single-sided or multi-sided adhesive tape on two lateral faces of the part (if the partition is a common partition).

The common partition (first or second partition, respectively) may be a diffuse or specular reflector.

Preferably the common (first, respectively) partition, such as a part comprising an opaque coating or a (metal) reflective part, does not project beyond the first (second, respectively) edge face or does so by less than 1 mm.

The common especially reflective (first and/or second, respectively) partition preferably has a thickness smaller than or equal to the thickness between the internal face and the bonding face or the thickness of the so-called central edge face.

The common especially reflective, or even metal, (first and/or second partition, respectively) partition comprises a part preferably arranged against or spaced apart from the so-called central edge face by at most 1 mm and even at most 0.5 mm.

Preferably, there is no adhesive or any other fastening means between the common especially reflective (metal) partition and the central edge face.

The common partition, such as a part (strip) made of metal or comprising one or more reflective or opaque coatings, may be fastened (adhesively bonded) to or in a notch of a common PCB carrier or of another part (a profile for example).

The common partition may comprise a part (a reflective metal part or even a part coated with opaque or reflective coatings), preferably projecting relative to the first light source (diodes) and second light source (diodes) in the direction of the first and second edge faces.

Preferably, the first assembly of light-emitting diodes and the second assembly of light-emitting diodes are for example arranged on the same side of the laminated glazing unit, the diodes being top-emitting diodes, the first and second edge faces being on the same side, and a PCB carrier, called a common PCB carrier, forms the first and second PCB carriers, this common PCB carrier having a main face that faces the first and second edge faces and bearing the preferably reflective (metal, for instance aluminium) or opaque partition that is especially a part comprising two reflective or opaque coatings, the partition preferably protruding relative to the first and second assemblies of light-emitting diodes in the direction of the first and second edge faces.

The first and second PCB carriers may therefore be located on a common PCB carrier if the first and second edge faces are on the same side and preferably substantially aligned (and preferably with a distance of at most 5 mm and even of at most 2 mm between diodes and first or second edge faces).

The common PCB carrier (and the diodes) may even be bonded to the first and second edge faces of the glazing assembly by an optical adhesive or a transparent double-sided adhesive above all when the diodes have a primary encapsulation.

Provision may therefore be made for a common partition between the first and second assemblies of diodes arranged on the same side of the laminated glazing unit (especially when there is no notable offset, of more than 1 mm, between the first edge face and the second edge face), which is:
- an (intrinsically) reflective (metal) or opaque part or a part comprising one or more reflective or opaque coatings added (fastened by any means) to a profile (optionally a profile for mounting the glazing assembly or for fastening the first light source to the first edge face, this fastening profile being located in the internal volume defined by the mounting profile) or added to the common PCB carrier or to one of the first or second separate PCB carriers;
- or even a part, which part is reflective (made of metal) or opaque or comprises one or more reflective (metal) or opaque coatings, of a profile (for mounting the glazing assembly or fastening the first light source to the first edge face, this fastening profile being located in the internal volume defined by the mounting profile) for example a profile having an E-shaped or double-C-shaped or an F-shaped or even a 90°-rotated-T-shaped cross section;
- or, if the diodes are side-emitting diodes, the reflective or opaque or reflective-(metal) or opaque-coating—comprising PCB carrier(s), which PCB carrier(s) is (are) especially located in a groove between the first and second glazing panes (especially formed by setting back the elements between the first and second glazing panes—such as the first interlayer, the first isolator and the second interlayer).

A profile for mounting the glazing assembly (on a bearing unit, system, etc.) may be U-shaped (web facing the edge face of the glazing assembly and, on either side, two lateral flanges on the external and exterior faces) or E-shaped with the central arm of the E distant (spaced apart from) the glazing assembly (or the laminated glazing unit) by less than 1 mm or even extending into a groove between the first and second glazing panes. It may be made of metal and/or (rigid) plastic (PVC) and/or of wood. It may be made of metal (preferred for reasons of heat dissipation if it bears the especially PCB light sources via a thermal adhesive, etc.).

The web may be spaced apart, preferably by at most 3 cm and even at most 1 cm, from the first edge face (and the second edge face).

The first flange may be made of metal and optionally comprise an opaque coating (black single-sided adhesive tape, black deposit, etc.), which coating is internal, i.e. on the same side as the first light source. Furthermore, the second flange may be made of metal and optionally comprise an opaque coating (black single-sided adhesive tape, black deposit, etc.), which coating is internal, i.e. on the same side as the second light source.

A profile for fastening the first (and/or second) light source to the first (and/or second) edge face may be a rectangular web (strip) or a profile with a T-shaped or U-shaped cross section (web facing the edge face of the glazing assembly and, on either side, two lateral flanges for example on the external and exterior faces) or an E-shaped cross section with the central arm of the E distant (spaced apart from) the glazing assembly (or the laminated glazing unit) by less than 1 mm or even extending into a groove between the first and second glazing panes. It may be made of metal (preferred for reasons of heat dissipation if it bears the especially PCB light sources via a thermal adhesive, etc.) and/or plastic. The fastening profile is preferably:
- located in the mounting profile of the glazing assembly, either spaced apart therefrom or fastened thereto;
- or else is merged with the mounting profile.

Otherwise, the (preferably metal) first (second) PCB carrier with the first (second) assembly of diodes may be fastened to the first (second) edge face by an optical adhesive or a transparent double-sided adhesive tape, an additional fastening profile not being used.

In particular, in a configuration where the first and second light sources are on opposite sides, the second glazing pane (being preferably of identical or similar size to the first glazing pane) projects beyond the first edge face forming a first projecting zone and preferably the first glazing pane projects beyond the second edge face forming a second projecting zone, and the first light source (diodes on PCB carrier) is on a (metal) first carrier (strip or U-shaped or L-shaped profile, etc.) that is attached to the first projecting zone and/or located in the first projecting zone and not projecting beyond the second edge face, and preferably the second light source (diodes on PCB carrier) is on a (metal)

second carrier (strip or U-shaped or L-shaped profile, etc.), which is attached to the second projecting zone and/or is located in the second projecting zone and not projecting beyond the first edge face.

Likewise, the preferably opaque first masking band, especially an opaque adhesive, is located in the first projecting region on the internal face, and another first masking band, especially an opaque adhesive, is even located in the first projecting region on the first face, and the preferably opaque second masking band, especially an opaque adhesive, is located in the second projecting region, and another preferably opaque second masking band, especially an opaque adhesive, is even located in the second projecting region on the second face.

The first glazing pane may comprise:
a peripheral recess (locally over a fraction of the lateral or longitudinal length of the first edge face);
or preferably the second glazing pane projects beyond the first edge face, forming a first projecting zone;
and the first light source (preferably an assembly of diodes) is carried by a first carrier, such as a printed circuit board called the first PCB (diode) carrier, that is (with the first source) located in the peripheral recess or preferably in the first projecting zone and does not project beyond the second and even beyond the plane of the exterior face.

Furthermore, the (PCB) first source carrier is preferably:
fastened ((directly) or via a base) to the bonding face in the first projecting zone or located in the peripheral recess;
and/or located in a groove between the internal face and the bonding face, especially if the first light source (diodes) is a side-emitting source;
and/or even fastened to the first edge face by an optical adhesive or a transparent double-sided adhesive.

The second glazing pane may be offset from the first glazing pane in order to project beyond the first edge face, while preferably being of identical or similar size so that, on the opposite side, the first glazing pane is offset from the second glazing pane in order to project beyond the second edge face, forming a second projecting zone. The second light source (preferably an assembly of diodes) carried by a second carrier, such as a printed circuit board called the second PCB (diode) carrier, is located in the second projecting zone and does not project beyond the first edge face of the glazing pane and even beyond the plane of the external face.

Furthermore, the (PCB) second source carrier is preferably:
fastened ((directly) or via a base) to the internal face in the second projecting zone (or is located in the peripheral recess);
and/or located in a groove between the internal face and the bonding face, especially if the second light source (diodes) is a side-emitting source;
and/or even fastened to the second edge face by an optical adhesive or a transparent double-sided adhesive.

A metal first PCB carrier (second PCB carrier, respectively) may be preferred for reasons of heat dissipation, to the back of which a metal base that preferably does not project beyond the second edge face (first edge face, respectively) and even the plane of the exterior face (the external face, respectively) is fastened. This base may be a strip of L-shaped or even U-shaped cross section.

The opaque first and (optional) second masking means prevent the light extracted from one glazing pane from crossing into the other glazing pane.

Preferably, the first glazing pane with the opaque first masking means has, facing the mask and on the side of the mask furthest from the first glazing pane:
an absorption (at the main wavelengths of C1 and/or C2 and/or C3 and/or C4, even in all the visible) of at least 80% and even at least 90%;
a transmission factor (at the main wavelengths of C1 and/or C2 and/or C3 and/or C4, even in all the visible) of at most 2% and even of at most 1% or of at most 0.5% (especially a TL of at most 2% and even of at most 1% or of at most 0.5%);
and/or an optical density of at least 2 and preferably at least 2.5 and even 3, more preferably from 2.8 to 4.5 and in particular from 3 to 4.

When the opaque masking means (opaque coating) are lined with a reflective layer, for example with a thin metal layer, on its face turned towards the extracting means, it is enough for the assembly to have the above optical density, transmission and absorption.

For the first or second object, the opaque first means according to the invention, such as for example means based on at least one mineral pigment (such as those mentioned above) or preferably an opaque enamel layer, may be (dark) black or grey but also coloured if they are separate from and in congruence with the opaque second means. Thus, provision may be made:
for the first masking means and the second masking means each to be black (black pigment) or grey;
for the first masking means to be coloured and to absorb green light, these means especially being red-based: browny red, purple, orange, pink;
and for the second masking means to be coloured and to absorb red light, these means especially being green or another colour that is not red-based, for example blue, yellow, green;
for the first masking means to be white (or any other colour) but thick enough to be absorbent, for example by making the white (or any other colour) scattering enamel forming the first extracting means overly thick, and for the second masking means to be white (or any other colour) but thick enough to be absorbent, for example by making the white scattering enamel forming the second extracting means overly thick.

It may be desirable to prevent the first (and even the second) masking means from being seen and thus the second extracting area is preferably congruent with the first extracting area, in particular for the first object, or in the second object if the masking means are not completely covering (in the area seen through). The first masking means are then hidden from sight by virtue of the second extracting means or even by virtue of the second masking means if they are separate (spaced apart from) the first masking means.

Large-angle rays emitted by the first source could exit into a first peripheral zone (no extracting means) and cross into the second glazing pane and thus exit (directly) via the external face in particular for the first object, or in the second object if the masking means are not completely covering (in the area seen through). These hotspots may be concealed for example by a preferably metal, even plastic or wood, opaque and/or reflective first (mounting or fastening) profile (such as described above) that preferably does not make optical contact with the exterior face of the second glazing pane (via its surface irregularities) or if it does is adhesively bonded and absorbs the rays.

Likewise, large-angle rays emitted by the second source could exit into a second peripheral zone (without extracting means) and cross into the first glazing pane and thus also exit (directly) via the exterior face. These hotspots may be concealed for example by a preferably metal, even plastic or wood, opaque and/or reflective second (mounting or fastening) profile (such as described above) that preferably does not make optical contact with the external face of the first glazing pane (via its surface irregularities) or if it does is adhesively bonded and absorbs the rays.

Naturally, the first and second (mounting or fastening) profiles (such as described above) may be merged if the first and second edge face on the same side of the glazing assembly.

Typically, hotspots are concealed over a width W of at least 1 cm and preferably of at most 5 cm and more preferably 3.5 cm.

Furthermore, to save money and to increase extraction efficiency, if the border of the glazing assembly is intended to be concealed (mounting profile, fastening profile, etc.) over a width W of between 1 cm and 3 cm, on the periphery of the first edge face, with a preferably metal profile that extends over the exterior and external faces, the (scattering, white or delustered) first extracting features may be spaced apart from the first edge face by at least the distance W (width of the zone containing the hotspots) and therefore start where the glazing area starts.

In the absence of masking with a (mounting or fastening) profile inter alia (seal etc.) it may be desirable in contrast to start the extraction (with its masking) as close as possible to the edge.

However, with or without a profile an anti-mixing band is preferably formed by virtue of the masking means on the extracting means, as described in detail below.

Moreover, in a peripheral band of width D0—smaller than W—starting from the first edge face, rays from the first source could be refracted into the first lamination interlayer on the internal-face side, into the first optical isolator (the refractive index of which is still too high) and into the second lamination interlayer, and then at the bonding face:

be directly extracted via the second extracting means located on the exterior face;

or be directly extracted via the second extracting means on the bonding face (especially by the features closest to the second edge face);

or be guided in the second glazing pane by total internal reflection at the exterior face/air interface then extracted by the second extracting means on the bonding face (especially by the features closest to the second edge face).

These rays on reaching the second extracting means pollute the colour C3, for the first object, or in the second object if the masking means are not in this peripheral band. The colour C1 may be symmetrically polluted. This zone is referred to as the first marginal zone for the first glazing pane or as the second marginal zone for the second glazing pane.

Thus, in what is referred to as a first "anti-mixing" configuration, preferably for the first object, the first light source—comprising an assembly of diodes (aligned, on a first PCB carrier) comprises a first light-emitting diode with said first main emission at $\lambda 1$, preferably green, and a second light-emitting diode with said second main emission at $\lambda 2$, preferably red; each of the first and second diodes is spaced apart from the first edge face—by a space, air—(preferably by less than 5 mm and even at most 2 mm) and at least 80% (preferably at least 90% and even at least 95%) of the light flux emitted by each of the first and second diodes is contained in an emission cone between $-\alpha 1$ and $\alpha 1$ where $\alpha 1 = \text{Arsin}(n1 * \sin(\alpha 2))$, and where $\alpha 2 = (\pi/2) - \text{Arsin}(n2/n1)$ corresponds to the angle of refraction in the first glazing pane, especially by first collimating means (on the emitting chips).

Furthermore, the second light source—comprising an assembly of diodes (aligned, on a second PCB carrier) comprises a third light-emitting diode with said third main emission at $\lambda 3$, preferably red, and optionally a fourth light-emitting diode with said fourth main emission at $\lambda 4$, preferably green; the third and even the optional fourth diode is spaced apart from the second edge face—by a space, by air—(preferably by less than 5 mm and even at most 2 mm) and at least 80% (preferably at least 90% and even at least 95%) of the light flux emitted by each of the third and fourth diodes is contained in an emission cone between $-\alpha'1$ and $\alpha'1$ where $\alpha'1 = \text{Arsin}(n'1 * \sin(\alpha'2))$ and where $\alpha'2 = (\pi/2) - \text{Arsin}(n'2/n'1)$ corresponds to the angle of refraction in the second glazing pane, especially by second collimating means.

It is desired for total internal reflection to take place at the interface with the first optical isolator for all angles, including large angles.

$\text{Arsin}(n2/n1)$ substantially corresponds to the angle of total reflection at the interface with the first optical isolator ($\alpha'2$ is the complementary angle of this total reflection). More precisely, the quantity used should be $\text{Arsin}(n2/n3)$ but since n3 is very similar to n1 the impact is negligible.

Table I below gives examples of $\alpha 1$, $\alpha r$ as a function of n2 for n1 equal to 1.5, where $\alpha r$ is the angle of refraction.

TABLE I

| $\alpha 1$ (°) | $\alpha r$ (°) |
|---|---|
| 30 | 20 |
| 35 | 22 |
| 40 | 25 |
| 45 | 28 |
| 50 | 31 |
| 60 | 35 |

Table I' below indicates examples of $\alpha 1$ (emission angle for total reflection), $\alpha 2$ (angle of refraction for total reflection at the interface of the first optical isolator) as a function of n2 for n1 equal to 1.5 or 1.52. It may be used as a lookup table

TABLE I'

|  |  | n2 = 1.4 | n2 = 1.35 | n2 = 1.3 | n2 = 1.25 | n2 = 1.2 | n2 = 1.15 | n2 = 1.1 |
|---|---|---|---|---|---|---|---|---|
| $\alpha 2$ | n1 = 1.5 | 21 | 26 | 30 | 34 | 37 | 40 | 43 |
| $\alpha 2$ | n1 = 1.52 | 23 | 27 | 31 | 35 | 38 | 41 | 44 |
| $\alpha 1$ | n1 = 1.5 | 33 | 41 | 48 | 56 | 64 | 74 |  |
| $\alpha 1$ | n1 = 1.52 | 36 | 44 | 51 | 59 | 67 | 79 |  |

Below n2=1.15 and even below n2=1.2 conventional diodes without collimating means may be chosen.

Preferably, most and more preferably all the diodes of the first and second light sources have such a narrow emission pattern, especially because collimating means are used.

The collimation is individual or even common to a plurality of diodes of each source (green diodes, red diodes, even red and green diodes) etc.

Naturally, as many diodes emitting at λ1 and diodes emitting at λ2 as required are used and their distribution (number, spacing) is adjusted so as to extend along the edge face in the first extracting area. It may be chosen to alternate λ1 and λ2 or not.

Other diodes may be added (emitting in the blue or the white) to provide other colour lights or functionalities and preferably their emission pattern is also chosen to be narrow.

For the second object, these narrow emission patterns are above all useful if the masking means are not present in these marginal zones.

When an extracting optical fibre is chosen for each primary source, narrow emission patterns may also be chosen.

Thus, in a second "anti-mixing" configuration provision is made for an (unapertured) first so-called anti-mixing band that makes, on the periphery of the internal face, extending from the first edge face (edge face to which the first source is optically coupled)—and along the first edge face—optical contact with the internal face this band having a width D0 at least equal to 0.8 Dmin and preferably equal to Dmin where Dmin=d1/tan ((π/2)−arsin(n2/n1)), and is preferably smaller than 2 cm and even 1 cm in width (and preferably smaller than W in width) where d1 is the distance between the first light source and the internal face.

The first band made of opaque material is (entirely or partially) offset from the first masking means and the first extracting area, which are further away from the first edge face, or the first band is formed by a feature of the opaque first masking means located (directly) on an extracting feature on the internal face. Therefore, (all or some of) the first extracting area starts from the first edge face.

Preferably the first source (each diode) is of extent (width of the emitting face) W0 smaller than the thickness of the first glazing pane, W0 typically being at most 5 mm, and the first source (each diode) is substantially centred relative to the first edge face, d1 being from 1 to 5 mm and preferably from 1 to 3 mm.

For d1 the edge of the first source furthest from the internal face is preferably chosen.

As a precautionary measure, another first anti-mixing band may also preferably be added congruent with (and for example made of an identical material to) the first anti-mixing band, on the external-face side (even on the external face). It is for example a question of a (black etc.) opaque enamel or an opaque single-sided or double-sided adhesive.

Furthermore, an (unapertured) second so-called anti-mixing band preferably makes, on the periphery of the bonding face, extending from the second edge face (edge face to which the second source is optically coupled) optical contact with the bonding face, this band having a width D'0 at least equal to 0.8 D'min and preferably equal to D'min where D'min=d'1/tan((π/2)−arsin(n2/n'1)), and preferably smaller than 2 cm and even 1 cm in width (and preferably smaller than W in width) made of an opaque material, where d'1 is the distance between the second light source and the bonding face. The second band made of opaque material is (entirely or partially) offset from the second masking means and the second extracting area, which are further away from the second edge face, or the second band is formed by a so-called masking feature (preferably located (directly) on an extracting feature on the bonding face) of the opaque second masking means. Therefore, (all or some of) the second extracting area starts from the second edge face.

Preferably the second source (each diode) is of extent (width of the emitting face) W'0 smaller than the thickness of the second glazing pane, W'0 typically being at most 5 mm, and the second source (each diode) is substantially centred relative to the second edge face, d'1 being from 1 to 5 mm and preferably from 1 to 3 mm.

For d'1 the edge of the second source furthest from the bonding face is preferably chosen.

As a precautionary measure, the width of the (first and second) anti-mixing band is limited in order not to eliminate too many rays (including guidable rays).

As a precautionary measure, another second anti-mixing band may also preferably be added congruent with (and preferably made of an identical material to) the second anti-mixing band, on the exterior-face side (even on the exterior face). It is for example a question of a (black etc.) opaque enamel or an opaque single-sided or double-sided adhesive tape.

Table II below gives examples of Dmin as a function of n2 and n1 and of d1. It may be used as a lookup table.

TABLE II

| n1 | n2 | d1 (mm) | Dmin (mm) |
|---|---|---|---|
| 1.5 | 1.15 | 1 | 1.2 |
| 1.52 | 1.15 | 1 | 1.2 |
| 1.5 | 1.2 | 1 | 1.3 |
| 1.52 | 1.2 | 1 | 1.3 |
| 1.5 | 1.25 | 1 | 1.5 |
| 1.52 | 1.25 | 1 | 1.4 |
| 1.5 | 1.3 | 1 | 1.7 |
| 1.52 | 1.3 | 1 | 1.7 |
| 1.5 | 1.35 | 1 | 2.1 |
| 1.52 | 1.35 | 1 | 1.9 |
| 1.5 | 1.4 | 1 | 2.6 |
| 1.52 | 1.4 | 1 | 2.4 |
| 1.5 | 1.15 | 3 | 3.6 |
| 1.52 | 1.15 | 3 | 3.5 |
| 1.5 | 1.2 | 3 | 4.0 |
| 1.52 | 1.2 | 3 | 3.9 |
| 1.5 | 1.25 | 3 | 4.5 |
| 1.52 | 1.25 | 3 | 4.3 |
| 1.5 | 1.3 | 3 | 5.2 |
| 1.52 | 1.3 | 3 | 5.0 |
| 1.5 | 1.35 | 3 | 6.2 |
| 1.52 | 1.35 | 3 | 5.8 |
| 1.5 | 1.4 | 3 | 7.8 |
| 1.52 | 1.4 | 3 | 7.1 |
| 1.5 | 1.4 | 5 | 13.0 |
| 1.52 | 1.4 | 5 | 11.8 |

The first band (like the second band and preferably of identical or similar nature and arranged identically or similarly relative to the glazing pane) may be:
- preferably an opaque coating making optical contact with the internal face and more preferably located (directly) on the internal face;
- an ink (for example on the internal face or printed on the first lamination interlayer on the internal-face side or even on the opposite face);
- an enamel (on the internal face of the first preferably mineral glazing pane);
- a paint, for example on the internal face;
- an opaque adhesive, an opaque adhesive band;

an opaque coating on an carrier adhesively bonded to the internal face, this carrier especially being a (flexible) transparent (transparent or tinted) plastic (such as PET etc.), a thin glass sheet or a part made of metal, plastic or wood, or the PCB carrier of the side-emitting diodes of the first source (part of the especially metal or plastic or wooden mounting or fastening profile);

even an opaque part adhesively bonded to the internal face (part of the metal or plastic or even wooden mounting or fastening profile, as described above) and located in a groove between the first and second glazing panes.

The second band is preferably made of an identical material and as above.

The anti-mixing bands on the external and exterior faces are each for example an opaque single-sided (under a profile) or double-sided adhesive in order to adhesively bond a (metal, especially reflective) profile.

Dmin and D'min are equal if the same glazing panes and the same optical isolator(s) are chosen. D0 and D'0 are equal for the sake of simplicity.

The first and second anti-mixing bands may be facing if the first and second edge faces are aligned. The second band could be merged with the first band if the first band is opaque to all the emissions of the first and second light sources and if it is also of sufficient width for the rays emitted by the second source. As a precautionary measure, it is preferred to line the means. If it is chosen to use a single band, the largest of Dmin and D'min is preferably chosen. The first and second bands may be facing, even congruent or otherwise be on opposite sides of the glazing assembly.

In the zone of the first anti-mixing band, the so-called first marginal zone, the first interlayer and/or the first optical isolator may be absent and therefore set back relative to the first edge face by at least D0.

In the zone of the second anti-mixing band, the so-called second marginal zone, the second interlayer and/or the second optical isolator may be absent and therefore set back relative to the second edge face by at least D'0.

The first glazing pane may project beyond the second glazing pane (on the first-edge-face side, the second edge face preferably being on the opposite side of the glazing assembly) so that the first anti-mixing band is in this projecting zone, the area of this band possibly being free or located under a profile. The first anti-mixing band and the anti-mixing band on the internal-face side are for example an opaque single-sided (under a profile) or double-sided adhesive for bonding a profile.

In the zone of the first anti-mixing band (even in that of the facing second band), there may be a groove between the first and second glazing pane without the first and (second) interlayers or the first (and second) optical isolator and optionally with a part having an opaque coating in order to form the first anti-mixing band. An opaque part may be inserted more easily if its thickness (smaller than the distance between the first and second glazing panes) is at most 0.8 mm and even at most 0.5 mm.

In the zone of the second anti-mixing band (for example on the side of the glazing assembly which is opposite that of the first band), there may be a groove between the first and second glazing pane without the first (and second) interlayer or the first (and second) optical isolator and optionally with a part having an opaque coating in order to form the first anti-mixing band. An opaque part may be inserted more easily if its thickness (dimension between the glazing panes) is at most 0.8 mm and even at most 0.5 mm.

According to the invention, the first glazing pane with the first anti-mixing band has, on the side furthest from the first glazing pane facing said first band:
an absorption (at the main wavelengths of C1 and/or C2 and/or C3 and/or C4, even in all the visible) of at least 80% and even at least 90%;
a transmission factor (at the main wavelengths of C1 and/or C2 and/or C3 and/or C4 and even in all the visible) of at most 2% and even of at most 1% or of at most 0.5% (especially a TL of at most 2% and even 1% or 0.5%);
and/or an optical density of at least 2 and preferably at least 2.5 and even 3, more preferably from 2.8 to 4.5 and in particular from 3 to 4.

According to the invention, the second glazing pane with the second anti-mixing band has, on the side furthest from the second glazing pane facing said second band:
an absorption (at the main wavelengths of C3 and/or C4 and/or even C1 and/or C2 depending on the first masking means) of at least 80% and even at least 90%;
a transmission factor (at the main wavelengths of C3 and/or C4 and/or C1 and/or C2 depending on the first masking means) of at most 2% and even of at most 1% or of at most 0.5% (especially a TL of at most 2% and even 1% or 0.5%);
and/or an optical density of at least 2 and preferably at least 2.5 and even 3, more preferably from 2.8 to 4.5 and in particular from 3 to 4.

Furthermore, the opaque anti-mixing bands preferably have a limited light reflectivity of at most 5% at the main wavelengths.

As for the masking means, the first and second anti-mixing bands according to the invention may be (dark) black or grey but also coloured if they are in congruence:
each may be black (in particular black pigment) or grey;
the first band may be a colour that absorbs green, especially red-based: browny red, purple, orange, pink;
the second band may be a colour that absorbs red, especially green or another colour that is not red-based, for example blue, yellow, green;
or else the first band may be white or another colour but thick enough to be absorbent, and the second band may be white or another colour but thick enough to be absorbent.

It is for example possible to screen print a band of black or coloured enamel.

For the second object, these narrow emission patterns are above all useful if the masking means are not present in these marginal zones.

The first extracting area (luminous zone) may cover some of the area and thus leave at least one first dark, i.e. non-luminous, zone which may cover some of the area, leaving thus at least one first zone, which dark zone is chosen from a transparent zone (glazing area, etc.) even a decorative zone (opaque and/or coloured coating) or even a reflective zone, especially a mirror, for example formed by silvering, covered with a protective paint.

The first extracting area (luminous zone) may extend from the first edge face, for example forming at least one band or feature.

In one embodiment, the glazing assembly comprises a transparent zone—therefore a zone devoid of first and second extracting and masking means—(the first extracting area and the second extracting area partially covering the first and second glazing panes) and the edge faces facing the transparent zone are preferably devoid of light sources and/or the first extracting area (optionally with the facing second extracting area, which may even have a congruent zone) has an overall transparency (it is possible to see through the glazing assembly) for example obtained by features having a spacing of between 2 mm and 4 mm and a width of at most 5 cm, or 3 cm and even 5 mm (discrete features for uniform light for example).

The first light source, especially an assembly of diodes, is then preferably arranged only on one portion of the first edge face, this portion facing the first extracting area. The second light source, especially an assembly of diodes, is then preferably arranged only on one portion of the second edge face, this portion facing the second extracting area.

The transparent zone and all of the transparent zones may occupy at least 20% or even at least 50% of the area of the first glazing pane.

Preferably the TL in the transparent zone is at least 85% and even at least 88%. The haze is preferably at most 2.5%.

It may (even in the absence of a transparent zone from which extracting features are therefore absent) be desirable for the size and spacing of certain or all of the first extracting features to be adjusted to obtain an overall transparency in all or some of the first extracting area. The size and spacing are adjusted depending on the extent of the first extracting area containing these first features.

It may in addition be desirable for the size and spacing of certain or all of the second extracting features to be adjusted to obtain an overall transparency in all or some of the second extracting area.

The second extracting area may be at least partially offset from the first extracting area, the non-overlapping zone of the second extracting area comprising a portion of the second masking means.

The edge face opposite the first edge face may be polished (and straight) or scattering. The edge face opposite the second edge face may be polished or scattering. Preferably, for an application in which the opposite edge faces are visible (no mounting or fastening profile or even polymer seal masking them), the first and second edge faces are on the same side of the glazing assembly and are even aligned and the opposite edge faces are even not optically coupled.

However, the glazing assembly in particular may comprise:
  a third light source identical to the first light source and facing the latter, said third light source being synchronised with the first source and (preferably) being controlled dynamically, on the edge face opposite the first edge face, especially if the first extracting area has a characteristic dimension along the propagation axis of the light of at least 450 mm (extending away from the first source);
  and preferably comprises a fourth light source identical to the second light source and facing the latter, said fourth light source being synchronised with the second source and preferably being controlled dynamically, on the edge face opposite the second edge face, especially if the second extracting area has a characteristic dimension along the propagation axis of the light of at least 450 mm (extending away from the second source);

In the latter case, like the first source, the third source is preferably concealed by a mounting profile that is preferably made of metal (or rigid plastic, wood) and/or that has a U-shaped cross section, and, if required, like the second source, the fourth source is concealed by a mounting profile that is for example made of metal (or plastic or wood and/or that has a U-shaped cross section).

In particular, the glazing assembly comprises a mounting frame, for example a profile that is made of metal or (rigid) plastic (made of polyvinyl chloride (PVC) or wood) and/or that has a U-shaped cross section and the light sources are located in the internal volume between the mounting frame and the edge faces on two vertical struts fastened to the frame or fastened to the glazing pane via the edge face (by a fastening profile for example).

In the latter case, the third source may be concealed by a (dark, black, etc.) polymer seal, for example made of an elastomer (ethylene-propylene-diene monomer (EPDM), etc.), especially if in the mounted configuration two glazing assemblies (leaves) are arranged spaced apart and open (slide, etc.) sideways. This seal does not hinder the light guidance, it does not generally make any optical contact and is preferably smaller than 3 cm in width and is located on the first glazing pane for example to increase comfort if the leaves close too quickly (on the pedestrian).

The extracting areas may be various shapes and sizes. The first extracting area may comprise a single, preferably scattering, feature that is for example unapertured, closed and even apertured or like a ring. In the hollow (aperture) the first optical isolator preferably faces the internal face.

The scattering extracting features are for example geometric shapes: rectilinear or curved band, concentric circles, L's, etc. The features are identical or different, parallel to each other or not and may be separated by an identical distance or not.

To extract the light, scattering means are preferably used, these means being formed either by a treatment, such as sandblasting or acid etching, of the surface of the glass, by deposition of an enamel or scattering paste or by a treatment, such as laser etching, of the bulk of the glass.

The extracting means may concentrate the light (directed light emission) for example:
  reflecting means facing each of the (scattering) extracting means and able to reflect the extracted rays in a given direction, as described in document FR 2 989 176;
  lens as described in document WO 2005/018283.

To extract the light, scattering means are used, these means being formed either by a treatment, such as sandblasting or acid etching, of the surface of the glass, by deposition of an enamel or scattering paste or paint, or by a treatment, such as laser etching, of the bulk of the glass.

According to one feature, the first (and/or second) extracting means are a white scattering layer, especially an enamel or a paint, having a lightness $L^*$ of at least 50. The colour is defined in a known way by its $L^*$, $a^*$ and $b^*$ parameters and is measured by a spectrocolorimeter.

The optical density of a scattering layer (enamel, paint, ink, etc.), especially of a white scattering layer, for the first and/or second extracting means, may be lower than 2.5 to 2, even lower than 1.5 or even lower than 1.

The, especially enamel, scattering layer may be a continuous surface layer of width smaller than 200 mm, even than 100 mm and even more preferably smaller than or equal to 50 mm, or be discontinuous and form an assembly of thin features.

In one preferred embodiment, the scattering layer (all or some of the extracting means) consists of agglomerated particles in a binder, said particles having an average diameter comprised between 0.3 and 2 microns, said binder being in a proportion comprised between 10 and 40% by volume and the particles forming aggregates the size of which is comprised between 0.5 and 5 microns. This preferred scattering layer is particularly described in patent application WO 01/90787.

The particles may be chosen from semi-transparent particles and preferably from mineral particles such as oxides, nitrides, and carbides. The particles will preferably be chosen from the oxides of silica, of alumina, of zirconia, of titanium, of cerium, or from a mixture of at least two of these oxides.

According to one feature, the extracting enamel has the following composition:
  between 20 and 60% by weight $SiO_2$;
  10 to 45% by weight of especially micron-sized refractory pigments, especially of $TiO_2$; and
  preferably no more than 20% by weight alumina and/or zinc oxide.

The $TiO_2$ pigments make the enamel sufficiently opaque (that the enamel can be seen in the off-state) and lower the TL. Examples of extracting enamel compositions include the enamel called Ferro 194011 sold by FERRO, the enamel of reference AF5000 sold by JM and the enamel of reference VV30-244-1 sold by Pemco, which are very white, with a brightness higher than 20, and have a low light transmission—lower than 40%.

Preferably it is a question of a plurality of preferably scattering features (preferably formed by a discontinuous scattering layer).

The first extracting means may, as seen above, be an assembly of scattering features referred to as a scattering array, especially for a luminous zone of large size that it is desired to make as uniform as possible.

Preferably, the first (second) glazing pane coated with the first (second) especially enamel, scattering extracting means has a light transmission lower than 45%, even than 40% or even than 35% on the (exterior-) external-face side.

The, especially enamel, first extracting means for example extend over the entirety of one face of the glass sheet discontinuously or so as to form sparse geometric shapes arranged along curved and/or straight lines. The extracting means for example have a fractal geometry.

According to another feature, the first extracting means extend discontinuously and bound dark zones, especially sparse features of geometric shape arranged along curved and/or straight lines, especially of at least centimeter-sized length (largest dimension).

The first features, which are either identical or different, are for example hollow, graphics, letters (with diacritical marks), numbers, alphanumeric symbols, punctuation marks and/or symbols arranged to form a frame and/or band).

The first extracting area may have a straight or curved outline, be a geometric shape (rectangle), be smaller in width than the first glazing pane and have a height or length (along the first edge face) smaller than the height or length of the first glazing pane.

Preferably, the first glazing pane (like the second glazing pane) is rectangular and its width lies perpendicular to the ground once mounted.

The first extracting area may comprise:
  a first array of discrete scattering features, especially geometric features (square, circles, etc.) especially of the same shape, of width $I_1$ (width along the propagation axis of the light) that is optionally variable (getting larger with distance from the first source if there is no light source opposite) and at most 1 cm, preferably at most 5 mm and even at most 2.5 mm, said features being spaced apart by a pitch $p_1$ that is optionally variable (getting smaller with distance from the first source if there is no light source opposite) and at most 1 cm and preferably at most 5 mm, the pitch and width of said features especially being tailored to obtain an overall transparency (in the sense that it is possible to see through the first glazing pane in this first extracting area);
  and/or a first scattering decorative feature of centimeter-sized width $I_2$ (width along the propagation axis of the light) of at most 5 cm preferably at most preferably encircled by (even interlaced with) the first array;
  and/or a first scattering assembly such as a logo and/or such as letters and/or numbers, each of centimeter-sized width $I_3$ (width along the propagation axis X of the light) of at most 5 cm preferably at most spaced apart by a pitch $p_3$ of at most 1 cm, preferably of at most 5 mm and preferably encircled by the first array of discrete scattering features.

Furthermore, the first extracting means are preferably on the internal face and the first masking means are (directly) on the first extracting means.

Furthermore, the second extracting area preferably faces and is even congruent with the first extracting area and comprises:
  a second array of discrete scattering features, especially geometric features (square, circles, etc.) especially of the same shape, of width $I'_1$ (width along the propagation axis of the light) that is optionally variable (getting smaller with distance from the second source if there is no source opposite) and at most 1 cm, preferably at most 5 mm and even at most 2.5 mm, said features being spaced apart by a pitch $p'_1$ that is optionally variable (getting larger with distance from the second source if there is no source opposite) and at most 1 cm, preferably at most 5 mm, the pitch and width of said features being tailored to obtain an overall transparency (in the sense that it is possible is to see through the second glazing pane in this second extracting area, which is preferably congruent with the first area);
  and/or a second scattering decorative feature of centimeter-sized width $I'_2$ (width along the propagation axis of the light) of at most 5 cm preferably encircled by (even interlaced with) the second array and congruent with the first scattering decorative feature or facing the first array of discrete scattering features (even covering the second scattering decorative feature);
  and/or a second scattering assembly of characters such as a logo and/or such as letters and/or numbers, each of centimeter-sized width $I'_3$ (width along the propagation axis X of the light) of at most 5 cm, spaced apart by a pitch $p'_3$ of at most 1 cm and even of at most 5 mm and preferably encircled by the second array of discrete scattering features and congruent with the first scattering assembly or facing the first array of discrete scattering features (even covering the second scattering assembly).

Furthermore, the second extracting means are on the bonding face and the second masking means are (directly) on the second extracting means.

By way of a light source an extracting optical fibre having a emitting side face (coupled to a primary light source that is typically a diode) may be chosen. The optical fibre called 3M™ Precision Lighting Elements from 3M is for example used.

For the first light source, light-emitting diodes aligned on a first printed circuit board PCB, preferably in strips that are possibly less wide than the glazing assembly and even the first glazing pane, are preferred.

The diodes may be (pre)encapsulated, i.e. comprise a semiconductor chip and a package (for example made of an epoxy resin or of PMMA) encapsulating the chip.

The diodes may comprise even preferably be single semiconductor chips, for example of width W0 of about 100 μm or 1 to 5 mm. The width of each diode of the first source is preferably smaller than the thickness of the first glazing pane. The width of each diode of the second source is preferably smaller than the thickness of the second glazing pane.

The diodes may optionally comprise a (temporary or permanent) protective package for protecting the chip during handling or to improve the compatibility between the materials of the chip and other materials.

Each diode of the first source (of the second source) may especially be chosen from at least one of the following light-emitting diodes:
 a side-emitting diode, i.e. emitting parallel to (the faces of) its electrical contacts, with an emitting face located to the side relative to the first (second) PCB carrier; and
 a diode the main emission direction of which is perpendicular or oblique relative to the emitting face of the chip.

The diodes preferably have a Gaussian (type) spectrum.

The emission pattern of a diode is conventionally Lambertian with an emission half angle of 60°.

Preferably, the distance between the chips (or the collimating means if present) and the first coupling edge face (the second coupling edge face, respectively) is smaller than or equal to 5 mm and even to 2 mm.

The light extracted by the first extracting means may be made to blink and also change colour by virtue of means for controlling the first light source, which is for example an assembly of diodes emitting red and green light in alternation, and preferably also white light (alternation of red, green and white light).

If it is a question of an access door opened with a ticket, a pass or means of identification, if the ticket, pass or means of identification is not recognised, at t0, the first source may pass from green to red and even blink for a given length of time (less than 10 s), for example 1 s to 5 s, and then become green again (the second source remaining red).

It may in particular be chosen to make the first lamination interlayer and preferably all the lamination interlayers of a thermoplastic sheet made of ethylene vinyl acetate (EVA) or even polyurethane (PU) or polyvinyl butyral (PVB). Such a sheet is preferably made of a multi- or single-component resin that is either heat-curable (epoxy, PU) or UV-curable (epoxy, acrylic resin).

The first lamination interlayer is for example submillimeter-sized and made of one or more sheets in the assembly. The first lamination interlayer (and preferably all the lamination interlayers) may be clear, extra clear and have a neutral colour.

The first lamination interlayer is preferably made from EVA or PVB. Preferably, each lamination interlayer has a haze (measured in the conventional way with a hazemeter) of at most 1.5% and even of at most 1%, as for example is the case for EVA or PVB interlayers. This decreases the amount of scattering between the extracting features, in the transparent zone(s). For EVA or PVB $n_3$ ($n'_3$) is typically about 1.49.

The first (and preferably the second) optical isolator is preferably a flat element (or an element following the curvature of the first glazing pane). It may preferably be continuous but may be made of a number of pieces of the same material or even different materials.

The first optical isolator (the second optical isolator for the second object, respectively) may be an element (film) added to a deposited layer (a deposit).

In one first embodiment, the first optical isolator according to the invention comprises (preferably consists of) a first fluoropolymer-based, and preferably fluoropolymer, film especially having a thickness $e_2$ of at least 600 nm, $e_2$ preferably being micron-sized and even at least 10 μm or 50 μm, and (above all for the second object) the second optical isolator according to the invention preferably comprises (preferably consists of) another fluoropolymer-based, and preferably fluoropolymer film especially of thickness $e'_2$ of at least 600 nm, $e'_2$ preferably being micron-sized and even at least 10 μm or 50 μm, said film being identical to the first fluoropolymer film.

Low-index fluoropolymer film is simple to implement, enables design flexibility (the film simply being cut) and can be used for assemblies of any (including large) size.

The first lamination interlayer, which is preferably made of EVA, provides the first film with enough mechanical strength that a satisfactory optical contact is obtained.

In the final product, it is preferable to distinguish between the film of low-index fluoropolymer (assembled via the first interlayer) and a fluoropolymer layer or deposit deposited by wet processing. A fluoropolymer layer requires the use of special solvents and getting it to adhere may be very problematic.

For the lamination, a conventional thermal cycle may be used and even more preferably that used for the laminated glazing unit employing plastic films (polyethylene terephthalate (PET) etc.).

Preferably, $n_2$ may be lower than or equal to 1.45 or even lower than or equal to 1.4.

The first optical isolator preferably consists of the first low-index film.

For the sake of simplicity, the first low-index film extends over all of the first lamination interlayer that itself extends over substantially all of the first glazing pane though it is possibly set back from the first edge face, for example being absent from the aforementioned anti-mixing zone.

Preferably, the first lamination interlayer (and even the first low-index film) is set back from the first edge face, leaving a peripheral zone (or band) free i.e. in contact with air. The carrier of the first light source (especially a PCB or a PCB carrier) may be arranged facing this peripheral zone.

The first fluoropolymer film (and possibly the second) may be based on or even made of one of the following materials:
 perfluoroalkoxy (PFA), especially of $n_2$ of about 1.3;
 polyvinylidene fluoride (PVDF), especially of $n_2$ of about 1.4;
 ethylene chlorotrifluoroethylene (ECTFE);
 ethylene tetrafluoroethylene (ETFE), more precisely poly (ethylene-co-tetrafluoroethylene), especially of $n_2$ of about 1.4;
 fluorinated ethylene propylene (FEP), especially of $n_2$ of about 1.3; and
 polytetrafluoroethylene (PTFE), especially of $n_2$ of about 1.3, but which is the most difficult to laminate.

ETFE is preferred because it is the easiest to laminate to the thermoplastic first lamination interlayer. It preferably has a haze of at most 2%. FEP may be preferred for its low refractive index or lower haze of at most 2% as it provides an acceptable lamination performance.

Polysiloxanes are other low-index materials, but their mechanical properties are unsatisfactory.

Fluoropolymer films are widely available above 50 μm.

To obtain a better assembly with the glass, the main surfaces of the first low-index film may be treated with an adhesion-promoting surface treatment, preferably a corona treatment.

If the second optical isolator is distinct from the first, an identical or similar low-index film is also preferably chosen.

In a preferred embodiment of the first object, a zone in which the first and second extracting areas are congruent may comprise, over the thickness of the glazing assembly, the following sequence:
first glazing pane/first extracting means made up of a scattering layer/first masking means made up of an opaque or reflective layer, preferably congruent with the first extracting means/first (preferably EVA) lamination interlayer/first optical isolator made up of a low-index film/second (preferably EVA) lamination interlayer/second masking means made up of an opaque or reflective layer, preferably congruent with the first masking means/second extracting means made up of a scattering layer, congruent with the first extracting means/second glazing pane,
the first and second light sources, preferably assemblies of diodes, even in particular being on the same side (the first and second edge faces even being aligned).

In a preferred embodiment of the second object, a zone in which the first and second extracting areas are facing may comprise, over the thickness of the glazing assembly, the following sequence:
first glazing pane/first extracting means made up of a scattering layer/first (preferably EVA) lamination interlayer/first optical isolator made up of a low-index film/central (preferably EVA) interlayer/first masking means made up of an opaque (unapertured face) or reflective layer, preferably a coating on the central interlayer/another central interlayer/second, optical isolator made up of a low-index film/second (preferably EVA) lamination interlayer/second extracting means made up of a scattering layer/second glazing pane,
the first and second light sources, preferably assemblies of diodes, even preferably being on the same side (the first and second edge faces even being aligned).

In another optical-isolator embodiment according to the invention, the first optical isolator comprises (preferably consists of) a first porous silica layer of thickness e2 of at least 400 nm, located:
for the first object: on one main face of a third transparent mineral glass glazing pane, said face being oriented to the internal-face side;
for the second object: on the internal face.

Furthermore, the second optical isolator may preferably comprise (more preferably consist of) a second porous silica layer of thickness e'2 (of at least 400 nm).

For the first object, the first optical isolator may comprise, on a main face of a third transparent mineral glass glazing pane, said face being oriented to the internal-face side, a first porous silica layer of thickness e2 of at least 400 nm, which layer is preferably coated with a first transparent and mineral protective coating that is preferably a silica layer of thickness e4 larger than 50 nm and preferably larger than 100 nm having a refractive index n4 of at least 1.4 at 550 nm. Furthermore, the glazing assembly may also comprise, on another main face of the third glazing substrate, said face being oriented to the bonding-face side, a second porous silica layer of thickness e'2 of at least 400 nm, forming the second optical isolator, which layer is preferably coated with a second transparent and mineral protective coating that is preferably a silica layer of thickness e'4 larger than 50 nm and preferably larger than 100 nm having a refractive index n'4 of at least 1.4 at 550 nm.

n2 (in all the visible spectrum) may be at most 1.35, preferably at most 1.25 and even lower than 1.2. The same goes for n'2.

It is possible to use only the first porous sol-gel layer (preferably) with its protective coating, but in light of the—millimeter-sized—thickness of the central pane 1", the path length of the guided rays will be increased and this may decrease the extraction efficiency (and even more rays will possibly be absorbed by the opaque first masking means).

Document WO 2008/059170 proposes to use a porous low-index layer as an optical isolator in a diode-comprising illuminating laminated glazing unit. This layer optically isolates the first glazing pane from the tinted outermost second glazing pane. The manufacturing conditions described may be reused, adjusting for e2 (e'2).

For an optical isolation taking account of skin depth, preferably:
when n2 (n'2) is lower than or equal to 1.3, e2 (e'2) is at least 600 nm;
when n2 (n'2) is lower than or equal to 1.25, e2 (e'2) is at least 500 nm; and
when n2 (n'2) is lower than or equal to 1.2, e2 (e'2) is at least 400 nm.

To be certain, e2 (e'2) is chosen to be at least 600 nm and even at least 700 nm or even at least 800 nm.

The porous silica layer may be a compact stack of silica nanoparticles, for example obtained by the sol-gel process, or preferably a silica layer comprising a silica matrix (also referred to as a silica array) containing pores and preferably obtained by the sol-gel process. More particularly, a porous layer comprising an (essentially) continuous solid phase, thus forming dense pore walls, is preferred to a solid phase mainly taking the form of (nano)particles or crystallites.

There are various pore-forming agents that may be used to manufacture the porous sol-gel layer. Thus, document EP 1 329 433 discloses a porous silica layer produced from a tetraethoxysilane (TEOS) sol hydrolysed in an acid medium with a pore-forming agent based on polyethylene glycol tert phenyl ether (referred to as Triton) at a concentration between 5 and 50 g/l. The combustion of this pore-forming agent at 500° C. releases the pores. This non-localised pore-forming agent is of indeterminate form and spreads uncontrollably through the structure.

Other pore-forming agents are known, such as micelles of cationic surfactant molecules in solution, and optionally in hydrolysed form, or micelles of anionic or nonionic surfactants, or of amphiphilic molecules, for example block copolymers. Such agents generate pores in the form of narrow channels or relatively round pores of small size between 2 and 5 nm.

Preferably, the porous silica layer is obtained with a particular pore-forming agent, such as polymer beads, that for its part makes it possible to obtain better control of the size of the pores, especially allowing large pore sizes to be obtained, better control of the organisation of the pores, especially allowing a uniform distribution to be obtained, as well as better control of the number of pores in the layer and better reproducibility. The polymer beads may have a polymer core and a mineral shell.

The smallest characteristic dimension of the pores may even more preferably be larger than or equal to 30 nm and is preferably smaller than 120 nm and more preferably than 100 nm. Furthermore, also preferably, the largest characteristic dimension of the pores may even more preferably be larger than or equal to 30 nm and is preferably smaller than 120 nm and more preferably than 100 nm.

The aspect ratio, the largest dimension divided by the smallest dimension, may be smaller than 2 and even than 1.5.

In one preferred embodiment, the porous silica layer is a matrix of silica having closed pores (preferably bounded by walls made of the silica) in its volume, and in particular an open porosity on its surface, the closed pores, which especially have a substantially oval or substantially spherical shape, each having a smallest dimension of at least 30 nm and a largest dimension of at most 120 nm and preferably between 75 nm and 100 nm.

This porous layer containing closed pores in its volume is mechanically stable, it does not collapse even for high pore concentrations. The pores may easily be separated from one another, even individualised.

The pores may be elongate, especially shaped like a grain of rice. Even more preferably, the pores may have a substantially spherical or oval shape. Preferably, most of the closed pores, even at least 80% thereof, have a given substantially identical, especially elongate, substantially spherical or oval shape.

Most (even between 80% or even 95% or even all) of the closed pores may preferably have a smallest characteristic dimension, and preferably also a largest dimension, of between 75 and 100 nm.

In the porous layer, the pores may be different sizes, even though this is not preferred.

The porosity may furthermore be monodisperse in size, the pore size then being set at a minimum value of 30 nm, preferably 40 nm and even more preferably 50 nm, but preferably not exceeding 120 nm.

The fraction of pores per unit volume may preferably be higher than 50% and even than 65% but is preferably lower than 85%.

However, it will be noted that the maximum fraction per unit volume is 74%, the maximum theoretical value obtained for a stack of spheres of identical size, whatever it may be.

The Applicant has observed that when the first porous silica layer is applied (directly) to the first lamination interlayer its function as an optical isolator is affected. It is probable that the pores of the porous layer, in particular the open pores on its surface, are polluted in the course of manufacture and that the pollutants remain trapped in the pores even after a heat treatment (lamination heat treatment).

Thus, advantageously, the first porous silica layer is coated with a first transparent and mineral protective coating that is preferably a silica layer of thickness e4 larger than 50 nm and preferably larger than 100 nm and even 180 nm, having a refractive index n4 of at least 1.4 at 550 nm (and more preferably at $\lambda 1, \lambda 2, \lambda 3, \lambda 4$ and even in all the visible).

The transparency of the protective coating in particular allows it to be seen through.

During trials, the Applicant observed that with a thickness smaller than 50 nm the barrier formed to pollutants of the porous silica layer was unsatisfactory.

The dense silica layer comprises an (essentially) continuous solid phase rather than a solid phase mainly taking the form of (nano)particles or crystallites.

A dense silica layer (especially one not intentionally made porous) conventionally has a refractive index at 550 nm of about 1.45 if deposited by physical vapour deposition, and between 1.42 and 1.46 if obtained by the sol-gel process.

The glazing pane with the sol-gel layer (and the protective coating) may have been given a heat treatment at a temperature of 450° C. or more, preferably of 600° C. or more, and is especially even a pane of tempered or curved glass.

The porous silica (and the protective coating) may be mineral or even a mineral/organic hybrid. The silica may be doped. The dopant elements may preferably be chosen from Al, Zr, B, Sn, Zn. The dopant is introduced to replace Si atoms with a molar percentage possibly and preferably reaching 10% and even more preferably as high as 5%.

The first (second) porous silica layer may be a sol-gel layer and the first (second) protective coating a silica sol-gel layer.

The manufacture of a porous silica layer, acting as an optical isolator between a guiding glass pane and a tinted glass pane of a luminous laminated glazing unit, is described in patent application WO 2008/059170.

In a preferred embodiment of the first object, a zone in which the first and second extracting areas are facing may comprise, over the thickness of the glazing assembly, the following sequence:

first glazing pane/first extracting means made up of a scattering layer/first masking means made up of an opaque or reflective layer, preferably congruent with the first extracting means/first (preferably PVB) lamination interlayer/(first protective coating (silica layer))/first optical isolator made up of a porous silica layer/central (especially thin) glass pane/second optical isolator made up of a porous silica layer/(second protective coating (silica layer))/second (preferably PVB) lamination interlayer/second masking means made up of an opaque or reflective layer, preferably congruent with the first masking means/second extracting means made up of a scattering layer, congruent with the first extracting means/second glazing pane, the first and second light sources, preferably assemblies of diodes, even preferably being on the same side (the first and second edge faces even being aligned).

In a preferred embodiment of the second object, a zone in which the first and second extracting areas are facing may comprise, over the thickness of the glazing assembly, the following sequence:

first scattering extracting means (deluster or layer)/first glazing pane/first optical isolator made up of a porous silica layer/(first protective coating (silica layer))/first (preferably EVA) lamination interlayer/first masking means made up of an opaque or reflective layer, preferably a coating covering and on the first interlayer/(second protective coating (silica layer))/second optical isolator made up of a porous silica layer/second glazing pane/second scattering extracting means (deluster or layer).

The external (exterior, respectively) face is preferably free (of coatings, coverings) except optionally the first extracting means (second extracting means, respectively).

According to the invention the expression "glazing pane" is understood to mean a monolithic glass sheet.

Preferably, the first glazing pane, made of tempered mineral glass, is from 4 to 6.5 mm in thickness and the second glazing pane, made of tempered mineral glass, is from 4 to 6.5 mm in thickness, these two thicknesses in particular being identical. When the first (second, respectively) extracting means and even the opaque first (second, respectively) masking means are made of enamel, the bake to form the enamel may be followed by the (only) tempering operation.

The second glazing pane may also be made of a (preferably rigid or semi-rigid) organic glass such as polymethyl methacrylate (PMMA)—preferably with a PU lamination interlayer—or polycarbonate (PC)—preferably with a PVB lamination interlayer.

The first (second) glazing pane may be any type of flat (or optionally curved) glass (the glass, when it is a question of coating curved surfaces, being bent by bending processes known to those skilled in the art). It is a question of monolithic glass panes, i.e. panes composed of a single sheet of mineral glass, which may be produced by the float process, allowing a perfectly flat and smooth sheet to be obtained, or by drawing or rolling processes.

By way of example of glazing materials, mention may be made of float glass, optionally chemically or thermally hardened or tempered, having a conventional soda-lime composition, an alumina borosilicate, sodium borosilicate or any other composition.

The glass of the first and second glazing panes may be clear or extra-clear, containing very small quantities of iron oxide(s). It may for example be a question of the glass panes sold in the "DIAMANT" range by SAINT-GOBAIN GLASS.

A glazing pane made of, especially extra-clear, soda-lime-silica glass may be chosen for the first and second glazing panes, possibly exhibiting:
- a transmission, of the luminous emission, higher than or equal to 91% even higher than or equal to 92% or even 93% or 94% at 550 nm or preferably in all the visible range;
- and/or a reflection, of the luminous emission, lower than or equal to 7%, even lower than or equal to 4% at 550 nm or preferably in all the visible range.

Each optically coupled edge face may be worked, especially straight and polished.

The glass may have been given a heat treatment at a temperature of 450° C. or more, preferably of 600° C. or more, and is especially even a pane of tempered or curved glass.

The thickness of the first glazing pane is preferably comprised between 2 and 19 mm, preferably between 4 and 10 mm and more particularly between 5 and 9 mm. The thickness of the second glazing pane is preferably comprised between 2 and 19 mm, preferably between 4 and 10 mm and more particularly between 5 and 9 mm. It may be preferable for the thicknesses of the two glass panes to be equal.

The thickness of the optional third glazing pane is preferably comprised between 2 and 19 mm and preferably between 2 and 4 mm. It may be preferable for the three glass panes to have equal (and even smaller than with two glass panes) thicknesses, for example about 4 mm/about 4 mm/about 4 mm.

The second (third) glazing pane may preferably be of identical size to the first.

For the first (second and even third, respectively) mineral glass glazing pane, n1 (n'1, n"1) is typically 1.50 to 1.53.

In static operation, the first and/or second extracting area is a given colour in the on-state (light turned on). In dynamic operation, the first and/or second extracting area is a given colour in the on-state (light turned on) but its intensity may vary or it may blink. Furthermore, in dynamic and switchable operation the colour in the on-state may change.

The invention is more particularly employed to provide a signal, and preferably in pedestrian and/or even vehicular access doors incorporating a first luminous glazing assembly such as described above and even a second glazing assembly such as described above (with identical or even different extracting areas to the first assembly), these first and second assemblies being spaced apart by a few mm and between two bearing units.

After installation, the first (and second) luminous glazing assembly forms an access door (for passage):
- between the exterior and interior of a building;
- between two zones of a building, in a gallery and/or room to which access is restricted or must be paid for;
- in a public transport (underground, train) station;
- between two exterior zones (exterior access to a tramway, or park especially a theme park, to an open-air cinema, to a toll area); and/or
- an internal or external access door of a land-based (train, etc.), water-based (boat) or air-based vehicle.

Preferably, each side is controlled by common control means and preferably switched at the same time.

The access door may be made up of one or two (or more) identical luminous glazing assemblies providing identical or complementary unidirectional illumination:
- the first glazing assembly or each glazing assembly takes the form of a sliding door, on rails; or
- the or each glazing assembly (leaf) is able to move about a axis of rotation.

Naturally, conditions may preferably have to be met (use of a means of identification or of a ticket) to open the door (make the glazing assembly move). The access door may comprise means for receiving a ticket, reading a ticket and actuating the one or more leaves in order to free the passage.

The term "door" has a general meaning and the door is not necessarily placed on the floor, via a horizontal strut for example. It may be spaced apart from the floor (no horizontal bottom and/or top strut) and fastened laterally to a bearing unit (system fastened or placed on the ground). The term "floor" is understood to mean solid ground or the floor of part of a vehicle (boat, train, etc.). The door may also be in a door frame securely fastened to adjacent masonry.

The bearing units may still comprise conventional luminous signs (green arrow, red cross, etc.) or these conventional signs may be omitted. The first and second extracting areas are more easily seen, in particular by people with reduced vision.

The invention is employed more widely to produce luminous signals and/or decorations (or even to provide functional illumination) of distinct colours at a given time on two separate sides of the glazing assembly, each signal or decoration being independently switchable, preferably automatically or manually by the user (ambient light, etc.). It is applicable to any glazing assembly between a first accessible space (with pedestrian or vehicular traffic) and a second accessible space (with pedestrian or traffic) for example a partition, a window or even a floor tile vehicular of a suspended floor, etc.

The mounting profile of the glazing assembly (or for fastening the first source and/or the second source) may be U- or E-shaped with the central arm of the E spaced apart from the laminated assembly by less than 1 mm or even extending into a groove between the first and second glazing panes.

Preferably if the first extracting area contains a plurality of extracting features (scattering features formed by a discontinuous, especially white, layer, etc.) the maximum distance between neighbouring features (discrete features, characters, decorations, etc.) is at most 1 cm and even at most 5 mm (and preferably at least 1 mm). Naturally, the first glazing pane may contain a plurality of first extracting areas, especially horizontal or vertical bands, preferably spaced apart by at least 2 cm, 5 cm, even at least 10 cm, preferably in order to leave a transparent zone (also no second extracting area with its mask) in the glazing area (outside a peripheral mounting, anti-mixing or hotspot zone).

Naturally, the second glazing pane may contain a plurality of second extracting areas, in horizontal or vertical bands, preferably spaced apart by at least 5 cm or 10 cm, preferably in order to leave a transparent zone (no second extracting area with its mask) in the glazing area (outside a peripheral mounting, anti-mixing or hotspot zone).

Preferably if the second extracting area contains a plurality of extracting features (scattering features formed by a discontinuous, especially white, layer, etc.) the maximum distance between neighbouring features (discrete features, characters, decorations, etc.) is at most 1 cm and even at most 0.5 mm.

A number of second extracting areas may be located in the zone covered by the first extracting area.

Preferably:
- the first (second, respectively) extracting area has a width of at least 3 cm, 5 cm or even 10 cm;
- the first (second, respectively) extracting area has an area of at least 25 cm$^2$ (5×5 cm$^2$) or even of at least 100 cm$^2$ (10×10 cm$^2$), and is of a size that can be seen from a distance of at least 1 m or even 2 m or 10 m;
- and/or the first (second, respectively) extracting area has an overall transparency (it is possible to see through the glazing assembly), containing features preferably having a pitch ranging from 2 mm to 4 mm;
- the first and second extracting areas are congruent, and their extracting feature(s) are preferably congruent;
- the first (second, respectively) extracting area may occupy substantially all the glazing area or be arranged in zones separated by a transparent zone.

Figure 2:
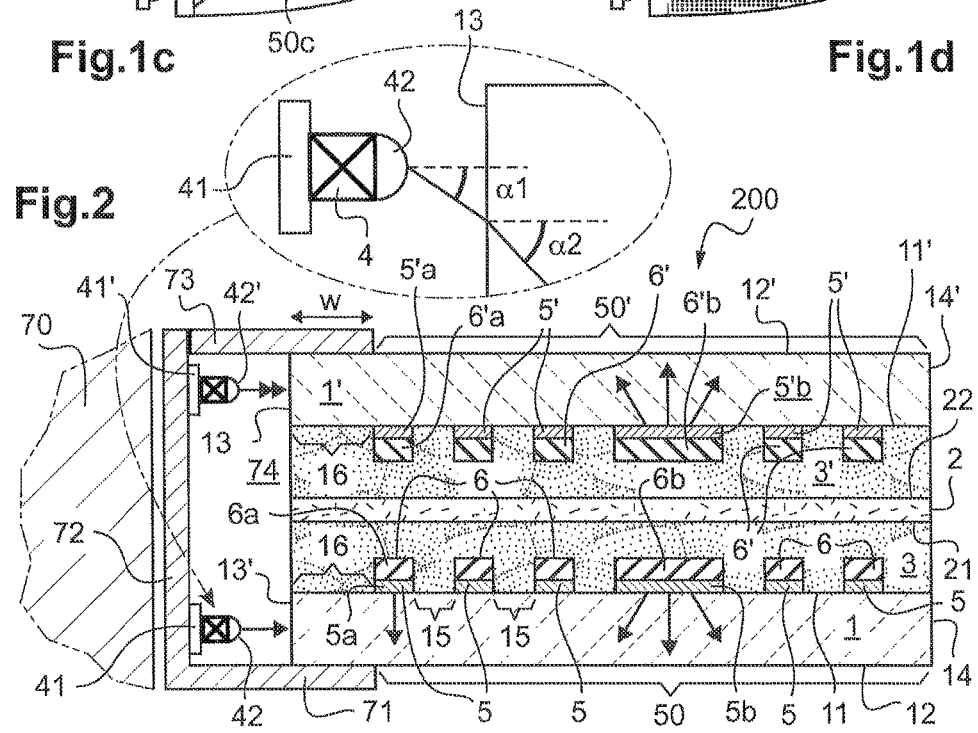
Figure 2A:
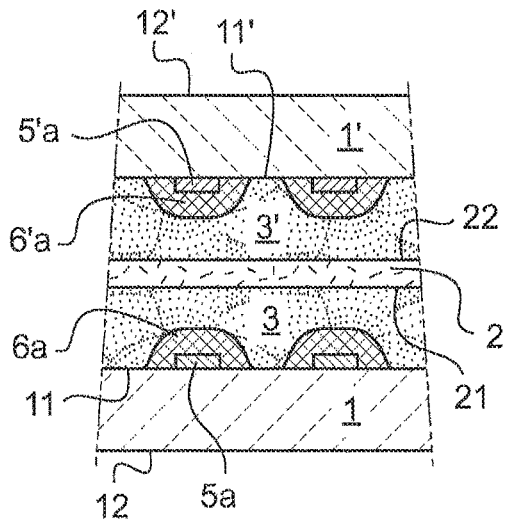
Figure 6A:
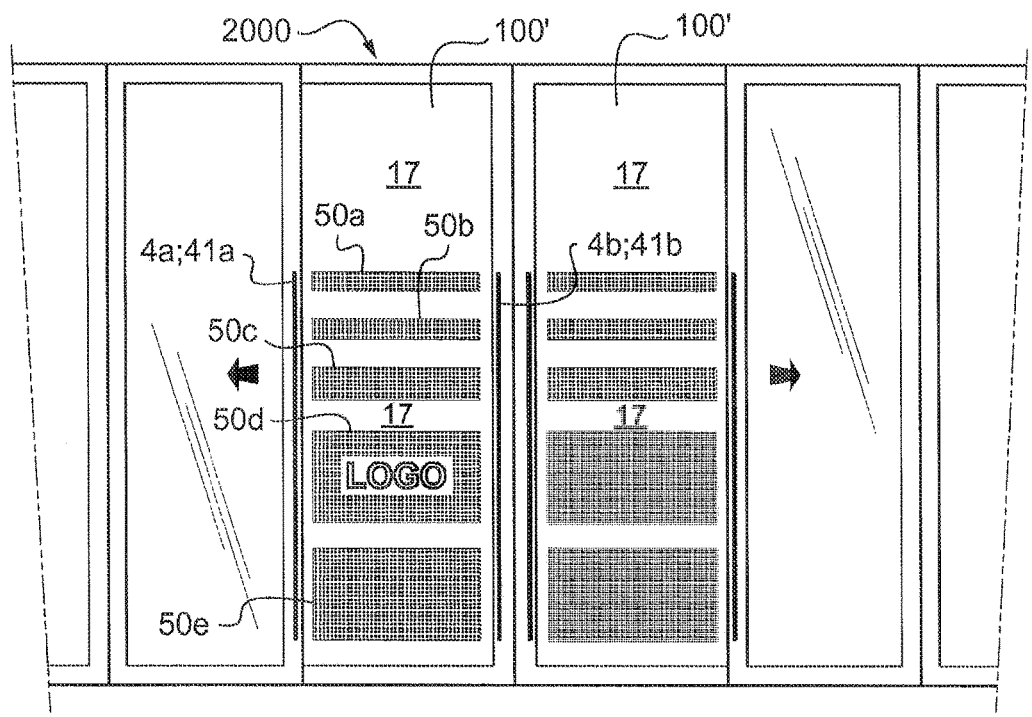
Figure 6B:
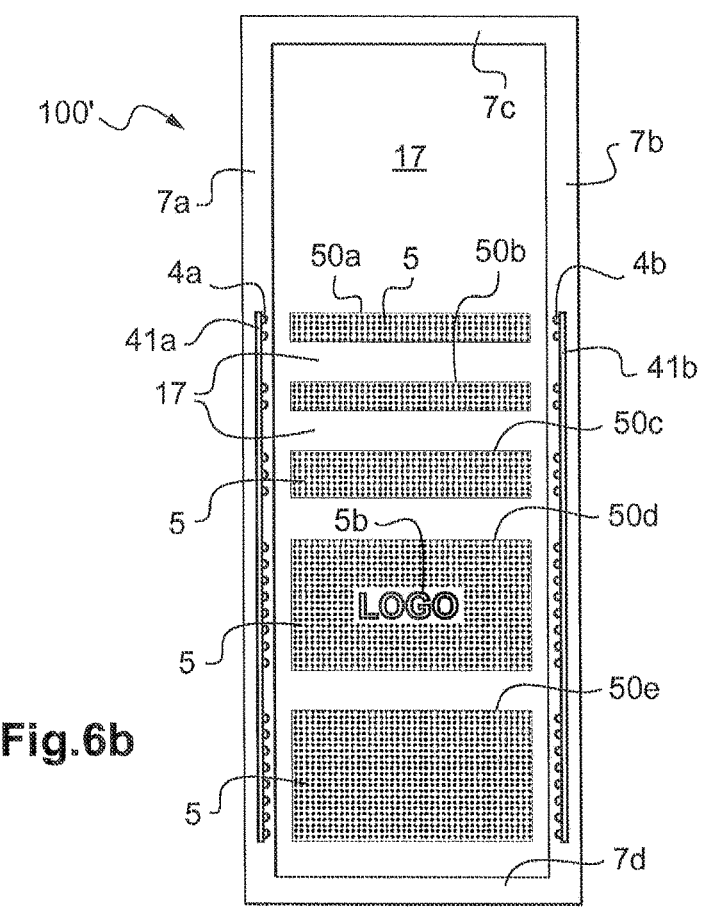
Figure 8:
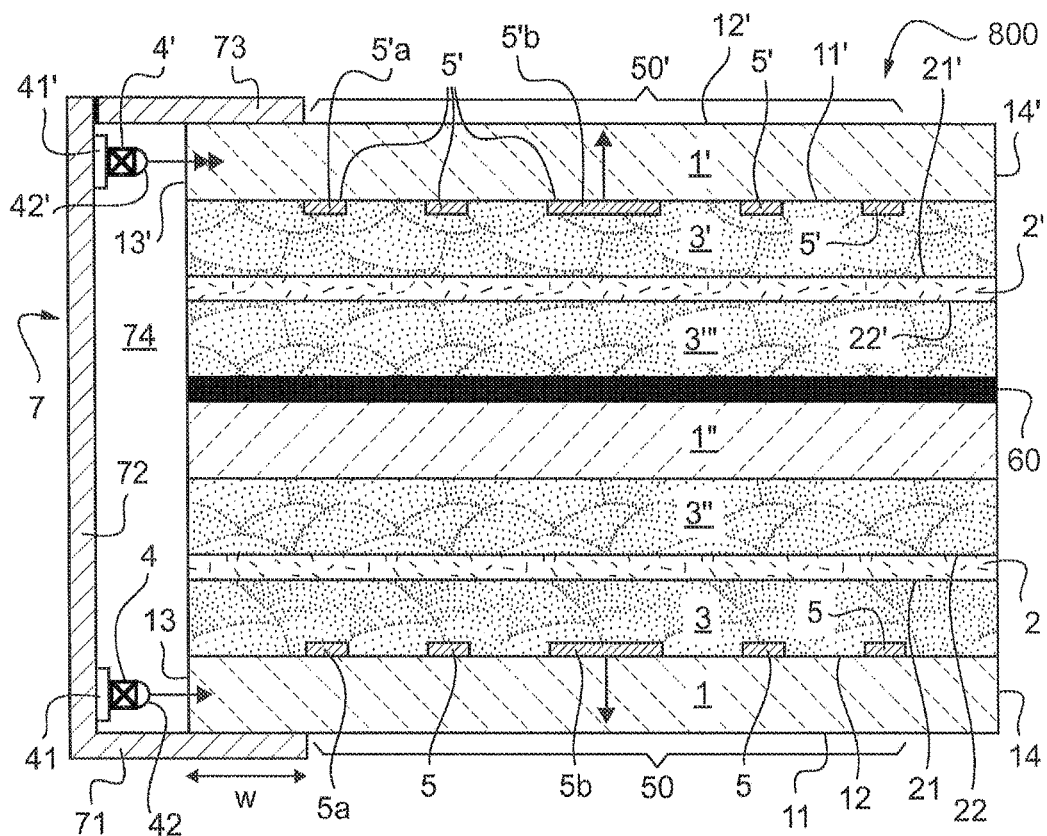
Figure 8A:
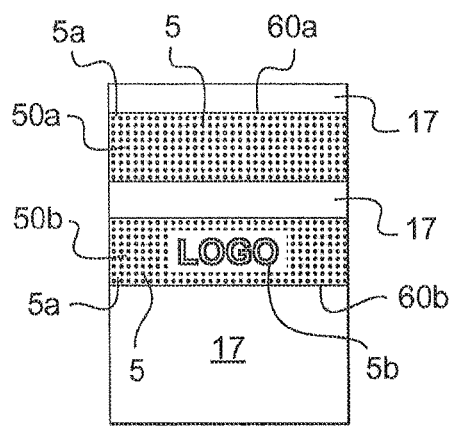
Figure 8B:
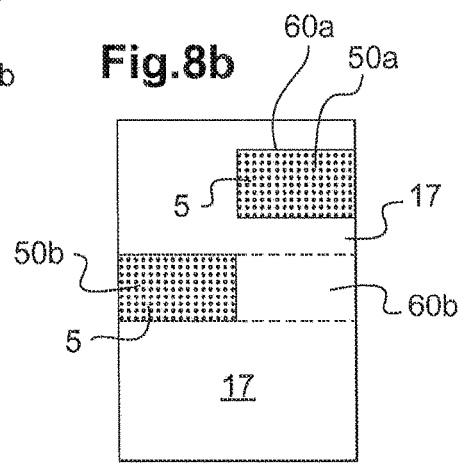

Details and advantageous features of the invention will now become clear from the following nonlimiting examples, and by way of the figures:

FIG. 1 shows access gates comprising two one-way signals in an underground station;

FIGS. 1a, 1b, 1c, and 1d show other examples of luminous zones on the leaves and the arrangement of the first and second light sources;

FIGS. 2 to 5, 7, 7a, 7', 8 and 9 are (sometimes partial) schematic cross-sectional views of luminous glazing assemblies according to a number of embodiments of the invention;

FIG. 2a shows, as a variant, the use of reflective means on the extracting means;

FIGS. 3a, 3b, 3c, 3d, 3e, and 3'e are mounting variants;

FIGS. 6a and 6b show a schematic front and partial view of a sliding entrance door with one or more luminous glazing assemblies according to the invention; and FIGS. 8a and 8b show front views, on the external-face side of the first glazing pane, of extracting areas according to variants of FIG. 8.

The figures are not to scale.

EXAMPLES

FIG. 1 shows a series of four access gates 1000 in an underground station between the ticket-machine-side concourse 1001 and the train-side space 1002 (represented by a rail track) each providing two independent (one-way vision on the concourse/train side) and dynamic (via conventional means (not described) for controlling the light sources) luminous signals. The means for reading a ticket or a pass are not shown and are conventional just like the means that cause the leaves to open.

Three access gates comprise, between two, for example parallelepidedal and metal, bearing units 70, two rectangular-type leaves 100 (length arranged vertically, width preferably less than 450 mm) spaced apart by a few cm, the lateral edge faces here having a radius of curvature with distance from the bearing unit. The lateral edge faces (outside a margin) and the edge face opposite the bearing unit are free, straight, polished or scattering. The fourth (the rightmost) gate has a single leaf connected to a bearing unit (optionally against a wall, glazed stairway, etc.).

Each leaf 100 comprises a first preferably tempered (flat or curved) glazing pane (of any possible general shape) having a first edge face and main faces called the internal face and external face, which pane is laminated to a second (flat or curved) glazing pane (of any possible general shape and identical to the first glazing pane) having a second edge face and main faces called the bonding face and exterior face, this second glazing pane being of identical size to and even congruent with the first glazing pane (same shape, same size, coincidence of the faces and edge faces). The first and second edge faces (in the bearing unit) are on the same side and aligned or offset by less than 1 mm.

At the instant t0, the first and third gates each comprise, on the right-hand concourse-side bearing unit, a green signalling arrow s1 oriented towards its leaves 100, each gate having, in their glazing area (visible zone), a green luminous zone on the concourse side, in a band 50, which is horizontal here, partially covering the first glazing pane left transparent elsewhere, which appears (at a distance) to be substantially uniform, and, in this band 50, an overall transparency is preserved by using a first array of discrete scattering features covering the glazing area, subcentimeter-width discs spaced apart by a subcentimeter-sized pitch, which discs are masked by a first array of opaque (or reflective) discrete masking features on the internal face and in congruence with (preferably substantially in congruence with) and preferably directly on the first array of scattering features arranged on the internal face. If the ticket or pass is invalid, the green areas may become red and even blink for a given brief time (less than 10 s), for example 1 s to 5 s, before becoming green again.

The second gate 100 (starting from the left) comprises, on the right-hand concourse-side bearing unit 1001, a red signalling arrow s2 and has, in its glazing area, a red luminous zone on the concourse-side, in a band 50, which is horizontal here, partially covering the second glazing pane left transparent elsewhere, which appeared (at a distance) to be substantially uniform, and, in this band 50, an overall transparency is preserved by using a (second) array of discrete scattering features covering the glazing area, for example subcentimeter-width discs spaced apart by a sub-centimeter-sized pitch, which discs are masked by a (second) array of opaque (or reflective) discrete masking features on the bonding face and in congruence with (preferably substantially in congruence with) and preferably directly on the (second) array of scattering features arranged on the bonding face.

On the other side (not shown), at the instant t0, the first and third gates each comprise, on the left-hand train-side bearing unit 1002, a red signalling arrow, and each has, in its glazing area, a red luminous zone on the train-side, in a horizontal band partially covering the second glazing pane—left transparent elsewhere—and congruent with the band on the first-glazing-pane side, which appears (at a distance) to be substantially uniform and preserves an overall transparency by use of a second array of discrete scattering features covering the glazing area, subcentimeter-width discs spaced apart by a pitch in congruence with the first array of scattering features and masked by a second array of opaque or reflective discrete masking features on the bonding face and in congruence with the second array of scattering features, preferably (directly) on the second array of scattering features arranged on the bonding face.

On the other side, at the instant t0, the second gate comprises, on the left-hand train-side bearing unit, a green signalling arrow oriented towards its leaves that each have, in their train-side glazing area, a green luminous zone on the train-side, which appears (at a distance) to be substantially uniform and preserves an overall transparency by use of a first array of discrete scattering features covering the glazing area, such as subcentimeter-width discs spaced apart by a subcentimeter-sized pitch.

Each preferably white scattering feature allows red or green light to be extracted on the external-face or exterior-face side, this light originating from a guided emission emitted by the first and second light sources (two assemblies of diodes per leaf or extracting optical fibres) which are concealed in the bearing units 70, the first light source being optically coupled to the first edge face and the second light source being optically coupled to the second edge face.

The following FIGS. 1*a*, 1*b*, 1*c* and 1*d* show other examples of luminous zones on the leaves and the arrangement of the first and second light sources.

Figure 1A:
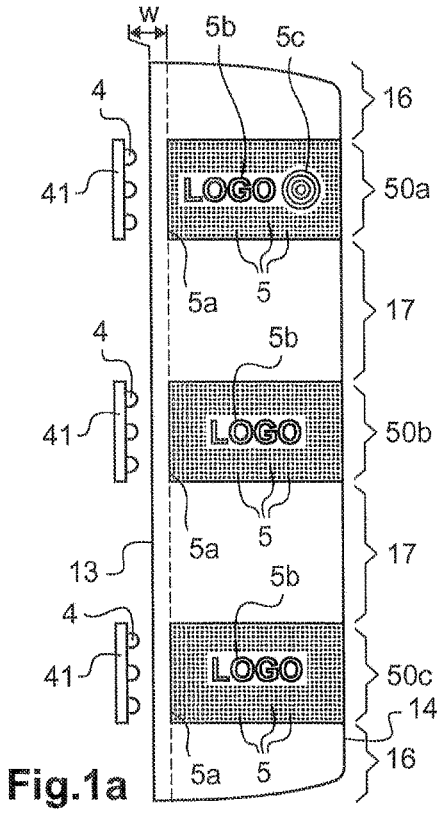

FIG. 1*a* shows a front view of a train-side leaf on the right-hand side and a concourse-side leaf on the left-hand side.

On the concourse-side, first luminous zones made up of three horizontal and rectangular bands are shown, namely a top band 50*a*, a central band 50*b* and a bottom band 50*c*, spaced apart by square or rectangular transparent bands 17, for example of 10 cm in height (here width). On the train-side, second luminous zones made up of three horizontal and rectangular bands 50'*a*, 50'*b*, 50'*c* congruent (same size and same shape) with the first luminous zones are shown, spaced apart by transparent bands 17', for example of 10 cm in height (here width).

The first top vertical band 50*a* comprises, on the internal face:
- a first array of discrete scattering features 5, features of width $I_1$ of at most 5 mm, which features are spaced apart by a pitch $p_1$ of at most 5 mm, and a first array of discrete opaque features (not shown), features of width $I'_1$ of at most 5 mm, which features are spaced apart by a pitch $p'_1$ of at most 5 mm and are congruent with the first array of scattering features and (directly) above, with a first feature 5*a* distant by W from the first edge face 12 (W of about 3 cm for example) as for the two other bands;
- a first scattering assembly of characters 5*b* such as a logo, each of width $I_3$ of at most 5 cm, said characters being spaced apart by a pitch $p_3$ of at most 1 cm, said assembly being encircled by the first array of discrete scattering features 5, and a first opaque assembly of characters (not shown) such as a logo, each of width $I'_3$ of at most 5 cm and spaced apart by a pitch $p_3$ of at most 1 cm, which characters are congruent with the first scattering assembly of characters and (directly) above; and
- a first decorative scattering feature 5*c* (two concentric circles) of centimeter-sized width (and even outside diameter here) $I_2$ of at most 5 cm, encircled by the first array of discrete scattering features, and a first opaque feature (concentric circles) of centimeter-sized width $I'_2$ of at most 5 cm, congruent with the first decorative scattering feature and (directly) above.

The second top band 50'*a* is congruent with the first top band 50 and comprises, on the bonding face:
- a second array of discrete scattering features, features of width $m_1$ of at most 5 mm, which features are spaced apart by a pitch $r'_1$ of at most 5 mm, said array being congruent with the first array of scattering features, and a second array of discrete opaque features, features of width $m'_1$ of at most 5 mm, which features are spaced apart by a pitch $r_1$ of at most 5 mm and are congruent with the second array of scattering features and (directly) above (and congruent with the first array of the opaque features);
- a second decorative scattering feature of centimeter-sized width $m_2$ of at most 5 cm (concentric circles), said feature being encircled by the second array of discrete scattering features and congruent with the first decorative scattering feature, and a second decorative opaque feature of centimeter-sized width $m'_2$ of at most 5 cm, congruent with the second scattering feature and (directly) above (and congruent with the first decorative opaque feature); and
- a second scattering assembly of characters such as a logo, each of width $m_3$ of at most 5 cm, said characters being spaced apart by a pitch $r_3$ of at most 1 cm, said assembly being encircled by the second array of discrete scattering features and congruent with the first scattering assembly of characters (the logo therefore being inverted), and a second opaque assembly of characters such as a logo, each of width $m'_3$ of at most 5 cm and spaced apart by a pitch $r'_3$ of at most 1 cm, which assembly is congruent with the second scattering assembly and (directly) above (and congruent with the first opaque assembly).

The first central band 50*b* comprises, on the internal face:
- a first array of discrete scattering features 5', features of width $I_1$ of at most 5 mm, which features are spaced apart by a pitch $p_1$ of at most 5 mm, and a first array of discrete opaque features, features of width $I_1$ of at most 5 mm, which features are spaced apart by a pitch $p_1$ of at most 5 mm and are congruent with the first array of scattering features and (directly) above; and
- a first scattering assembly of characters 5'*b* such as a logo, each of width $I_3$ of at most 5 cm, which characters are spaced apart by a pitch $p_3$ of at most 1 cm, said assembly being encircled by the first array of discrete scattering features, and a first opaque assembly of characters such as a logo, each of width $I_3$ of at most 5 cm and spaced apart by a pitch $p_3$ of at most 1 cm, which characters are congruent with the first scattering assembly and (directly) above.

The second central band 50'*b* is congruent with the first central band. It comprises on the bonding face:
- a second array of discrete scattering features 5', features of width $m_1$ of at most 5 mm and spaced apart by a pitch $r'_1$ of at most 5 mm, congruent with the first array of scattering features, and a second array of discrete opaque features, features of width $m'_1$ of at most 5 mm and spaced apart by a pitch $r_1$ of at most 5 mm, which features are congruent with the second array of scattering features and (directly) above (and congruent with the first array of opaque features); and
- a second scattering assembly of characters 5'*b* such as a logo, each of width $m_3$ of at most 5 cm and spaced apart by a pitch $r_3$ of at most 1 cm, said assembly being encircled by the second array of discrete scattering features, said assembly being congruent with the opaque firstly of characters (the logo therefore being inverted) and a second opaque assembly of characters such as a logo, each of width $m'_3$ of at most 5 cm and spaced apart by a pitch $r'_3$ of at most 1 cm, which assembly is congruent with the second scattering assembly and (directly) above (and congruent with the first opaque assembly).

The first bottom band 50c comprises, on the internal face:

a first array of discrete scattering features 5, features of width $I_1$ of at most 5 mm, which features are spaced apart by a pitch $p_1$ of at most 5 mm, and, on the internal face, a first array of discrete opaque features, features of width $I_1$ of at most 5 mm, which features are spaced apart by a pitch $p_1$ of at most 5 mm and are congruent with the first array of scattering features; and a second scattering assembly of characters 5b such as a logo, each of width $m_3$ of at most 5 cm and spaced apart by a pitch $r_3$ of at most 1 cm, said assembly being encircled by the second array of discrete scattering features and congruent with the first scattering assembly of characters (the logo therefore being inverted), and a second opaque assembly of characters such as a logo, each of width $m'_3$ of at most 5 cm and spaced apart by a pitch $r'_3$ of at most 1 cm, which assembly is congruent with the second scattering assembly and (directly) above (and congruent with the first opaque assembly).

The second bottom band 50'c is congruent with the first bottom band and comprises, on the bonding face, a second array of discrete scattering features, features of width $I'_1$ of at most 1 cm, which features are spaced apart by a pitch $p'_1$ of at most 1 cm, certain features being congruent with features of the first array of discrete scattering features and others, in the zone covered by the logo (here shown see-through by dashed lines) so as to mask it, with a second array of discrete opaque features, features of width $I_1$ of at most 5 mm, which features are spaced apart by a pitch $p_1$ of at most 5 mm and are congruent with the second array of scattering features and (directly) above.

The discrete features are for example geometric shapes such as discs (or squares or rectangles, etc.).

For a horizontal band with a length of 256 mm and a width ("height") of 144 mm, the discrete features are discs of 1 mm diameter spaced apart by 4 mm. Each character of the "logo" feature is spaced 7 mm apart from (encircled by) the discs. The logo feature is 100 mm in length and between 25 and 35 mm in width depending on the characters. The large circle of the decorative feature has an inside diameter of 25 mm and is spaced 7 mm apart from (encircled by) the discs. The luminous band has an overall transparency (it is possible to see through the glazing assembly).

By replacing the opaque features with reflective features, their width may be increased and they may project onto the glazing panes preferably by at most 2 mm and even by less than 1 mm.

For each one-side viewable luminous band, a row of diodes 4, certain at t0 or t' emitting in the red and others at t' or t0 in the green (or the white or another colour, blue etc.), taking the form of a strip, here individual, or common to the three bands. The PCB carrier 41 is individual for each glazing pane or is wider and is common and coupled to the first edge face of the first glazing pane and to the second edge face of the second glazing pane.

It is preferable not to guide light in the transparent zones devoid of scattering features—the diodes are omitted or not supplied with power.

A single PCB may be common to the three (top, central and bottom) bands of the first glazing pane (and/or second glazing pane).

One luminous zone may comprise a thin feature, such as an arrow for example or even be closed or apertured (geometric outline, etc.).

The luminous zones may be of any shape and extent, for the signal and/or decoration.

Figures 1C, 1D:
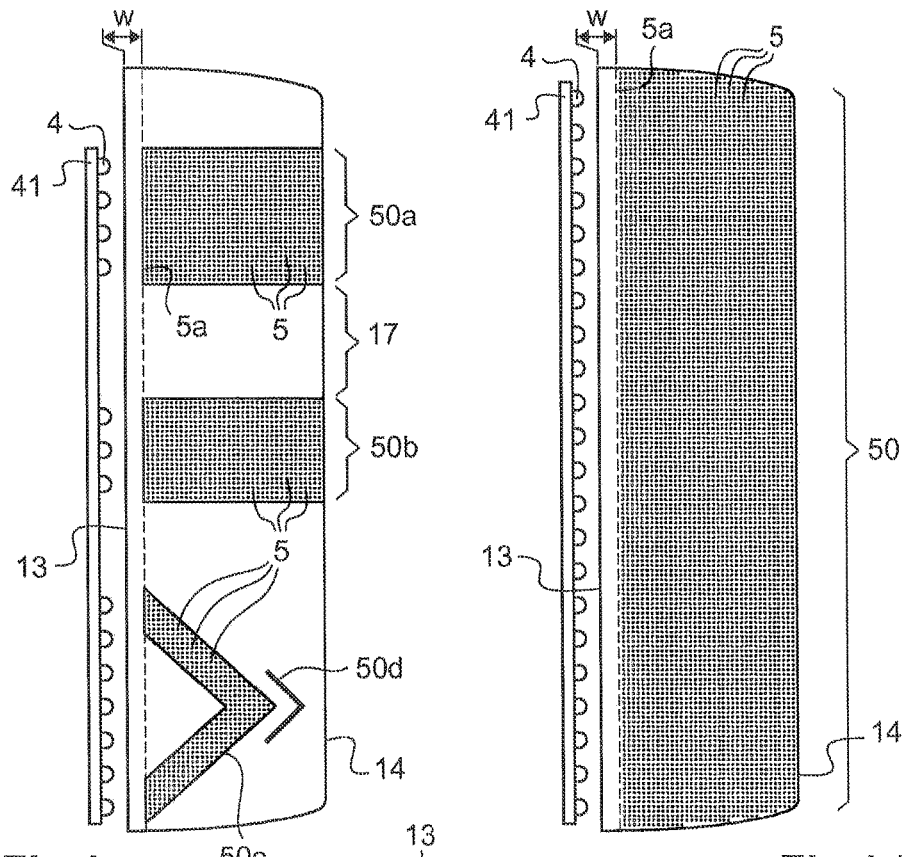

FIG. 1c shows another example of two-signal (or two-decoration) single-sided luminous zones comprising a top band, a central band and, at the bottom, two signalling graphics or "arrows" between transparent bands 17.

The top band 50a (concourse-side and train-side (not shown)) differs from that in FIG. 1a in that the logo and the decorative feature are absent. The central band 50b (concourse-side and train-side (not shown)) differs from that in FIG. 1c in that the logo is absent.

In the bottom part, on the internal face (bonding face, respectively, in congruence) there is:

a first luminous band 50c having the shape of a V rotated 90° (point directed away from the light sources and from the coupling edge face 13 of the first glazing pane) said band being formed by an assembly of first scattering features 5 coated with an assembly of congruent first opaque features of centimeter-sized width, 6 cm for example; and a second luminous band 50d having the shape of a V rotated 90°, said band being thinner and smaller in extent, made up of an unapetured scattering feature of at most 3 cm in width.

These two "arrows" may be green at t0 like the other luminous bands and red or not turned on at t' like the other luminous bands.

For each glazing pane, a single PCB 41 is used for all the green and red diodes 4.

FIG. 1d shows another example of a double-sided luminous signal (or decoration), the top band, central brand and bottom band being replaced by a covering band 50.

As mentioned above, and described in detail below for FIGS. 1a to 1d, the scattering features covered with opaque features start at a distance W from the associated optical-coupling edge face 13, 13' because in this zone (dashed borderline) a (metal, rigid plastic, wood, etc.) mounting profile is added for fastening the glazing unit, said profile for example having a U-shaped cross section and bearing or diodes of the PCB and also allowing hotspots to be masked. The opposite edge faces 14, 14' are free.

As detailed below, provision may furthermore be made, on the internal face, for a first peripheral anti-mixing band, of width D0, that prevents mixing of red and green colours, and provision may furthermore be made, on the bonding face, for a second peripheral anti-mixing band of width D'0.

The first (second) glazing pane with the assembly have on the internal-face (bonding-face) side facing the first (second) masking means:

an absorption (in the red and the green and even in all the visible) of at least 80% and even at least 90%; and a transmission factor (in the red and the green and even in all the visible) of at least 1% and even 0.5% and/or an optical density of at least 3.

FIG. 2 shows in greater detail a partial cross-sectional view of a glazing assembly 200 comprising two one-way luminous zones according to a second embodiment, comprising:

a first glazing pane 1, here rectangular (length for example along the vertical, and width for example of 250 mm) that is flat, or as a variant curved (tempered), made of tempered clear or extra-clear soda-lime-silica glass (for example about 6 mm in thickness and tempered, especially the glass called Planilux from the Applicant) of refractive index n1 of about 1.5 at 550 nm and with a $T_L$ of at least 90%, comprising a first main face 11 called the internal face, a second main face 12 called the external face, and a first edge face 13 that is vertical in the mounted position and its opposite edge face 14 (here the edge is formed by four edge faces, the first edge face being longitudinal);

a first light source 4, here an assembly of red and green light-emitting diodes 4 aligned on a printed circuit board called the first PCB carrier 41, said source being optically coupled to the first edge face 13, the first glazing pane 1 guiding the light emitted by the diodes that are here preferably spaced apart from the first edge face 13 by at most 1 mm, said source preferably being centred on the first edge face and of width smaller than the thickness of the first glazing pane 1, for example each diode has a width W0 of 4 mm;

a first extracting area 50 (preferably tailored to obtain an overall transparency) bounded by (the outlines) of first light-extracting means 5, 5a, 5b associated with the first glazing pane here (directly) on the internal face 12, which means are a first discontinuous white scattering layer having a lightness L* of at least 50, which layer is here a white scattering enamel containing white mineral pigments and fused glass frit, taking the form of first scattering features of varying size (width and/or length), including an array of discrete features 5a, 5 tailored to obtain an overall transparency and one or more decorative features 5b (here encircled by the features 5 of the array, and/or as a variant an assembly of characters (logo, etc.)); and opaque first masking means 6, 6a, 6b that are a first opaque layer of black, grey or coloured (red, green or another colour) enamel containing mineral pigments and fused glass frit, taking the form of first opaque features 6 of varying size, congruent with and (directly) on the first scattering features, and therefore of an array of discrete opaque features 6, 6a, the one or more features 6b on the decorative feature(s) (and/or as a variant an assembly of opaque characters on an assembly of scattering characters (logo, etc.)).

The first scattering feature 5a is distant by W from the first edge face 13. The widest feature 5b is a decorative feature, for example a 3 cm-wide geometric shape. The discrete features 5 are for example geometric shapes such as discs.

For a 256 mm-long (along the horizontal) first extracting area 50, the discrete features are for example 1 mm-diameter discs spaced apart by 4 mm. The decorative feature 5b is spaced 7 mm apart from (encircled by) the discs 5.

In a first example manufacturing procedure, a first liquid scattering enamel composition comprising a glass frit, a white mineral pigment and an organic medium is applied discontinuously by screen printing to the internal face 11 (or as a variant to the external face) to form the field of the first scattering features 5, 5a, 5b and dried, and a second liquid composition free from glass frit and containing a black mineral pigment (or as a variant a grey or coloured mineral pigment) and an organic medium is applied covering all of the internal face 12 between and on the field of the features 5, 5a, 5b of scattering composition. The assembly is dried and baked and the baked second composition is easily removed from between the scattering features.

More precisely, the first enamel composition contains a glass frit and $TiO_2$ pigments (sold under the reference 194100 by FERRO) and an organic medium (sold under the reference 801022 by Prince Minerals) in an amount allowing a viscosity of 200 poise (measured under the aforementioned conditions) to be obtained.

The average thickness (when wet) of the deposited first layer is equal to 35 μm.

On the glass (external-face) side the white colour is defined by L=63.08, a=−1.92, b=0.69 (after baking). On the mask (internal-face) side the white colour is defined by L=82.35, a=−1.24, b=−0.46 (after baking). The optical density of the white scattering enamel is 0.9 (glass side) after baking.

The screening-printing screen used for the first layer consists of a woven of 80 μm-diameter polyester threads comprising 43 threads/cm, which especially allows the plurality of discrete features taking the form of 1 mm-diameter discs spaced apart by 4 mm, and a 2 cm-wide decorative feature, such as a disc or a symbol, etc. to be formed.

The screen-printing screen used for the second layer consists of a woven of 48 μm-diameter polyester threads comprising 90 threads/cm for a whole-face deposition.

The second liquid composition contains a black pigment (sold under the reference TDF8874 by Ferro) and an organic medium (sold under the reference 801022 by Prince Minerals) in an amount allowing a viscosity of about 90 poise (measured using a Haake VT550 viscosimeter; rotation speed: 23.2 rpm) to be obtained.

The average thickness (when wet) of this layer of pigments deposited on the first layer is equal to 16 μm.

On the mask (internal-face) side the black colour is defined by: L=25.73, a=0.55; b=−1.63.

Next, the first glazing pane thus coated is introduced into a drying device equipped with infrared lamps operating at a temperature of about 145 to 155° C. in order to remove the organic medium and consolidate the layers.

The coated first glazing pane is then heated to a temperature of 655° C. in an oven in order to melt the glass frit and form the enamel that sets the pigment particles.

Unset pigments are removed by brushing and washing with water.

The thickness (when wet) of the first composition is larger than that of the second composition in order to preserve as best as possible the white colour on the glass (exterior-face) side.

On the coated first glazing pane thus obtained, the lightness L* of the assembly is measured level with the apparently black features (through the glass on the external-face side or the opposite side) and white features (through the glass on the external-face side or the opposite side).

On the glass (external-face) side the colour of a double white+black feature is defined by: L=61.88, a=−2.17; b=0.12. The TL is 0.15%.

On the mask (internal-face) side the colour, opacity and transmission data are collated in the following Table 1a:

TABLE 1a

| White enamel/<br>black enamel | Mask<br>side |
|---|---|
| L* | 25.73 |
| a | 0.55 |
| b | −1.53 |
| optical density | 2.8 |
| T (green, $\lambda$ = 525 nm) | 0.12 |
| T (red, $\lambda$ = 625 nm) | 0.12 |
| TL | 0.15 |

In a second example manufacturing procedure, the black pigment is replaced by a green-absorbing red-based ("browny red") pigment.

More precisely, the second liquid composition contains a browny red pigment, namely iron oxide (sold under the reference VV33/19/4 by Prince Minerals) and an organic medium (sold under the reference 243 by Prince Minerals) in an amount allowing a viscosity of about 90 poise (measured using a Haake VT550 viscosimeter; rotation speed: 23.2 rpm) to be obtained.

The average thickness (when wet) of the layer of pigments deposited on the glass is equal to 15 μm (45 μm for the first white composition).

On the mask (internal-face) side the colour, opacity and transmission data are collated in the following Table 2a:

TABLE 2a

| Enamel<br>(mask side) | Red |
|---|---|
| L* | 27.6 |
| a | 51.5 |
| b | 40.6 |
| Optical density | 2.07 |
| T ($\lambda$ = 525 nm) | 0.6 |
| T ($\lambda$ = 625 nm) | 25 |

On the second glazing pane, a second masking feature coloured to absorb red light, for example with a blue pigment especially such as cobalt blue or other known pigments, is placed congruent with the first red masking feature.

As a variant, the white scattering enamel for example has the following composition:
between 20 and 60% by weight $SiO_2$;
10 to 45% by weight of especially micron-sized refractory pigments, including $TiO_2$; and
no more than 20% by weight alumina and/or zinc oxide.

Examples of enamel compositions include the enamel called Ferro 194011 sold by FERRO, the enamel of reference AF5000 sold by JM and the enamel of reference VV30-244-1 sold by Pemco.

The internal face 11 and the first opaque features 6, 6a, 6b are (directly) covered by:
a first lamination interlayer 3 made of a transparent, even clear, submillimeter-sized 0.38 mm sheet of thermoplastic, here EVA, having (alone) a haze of at most 1.5%, and even 1% and a refractive index n3 such that, in absolute value, n3−n1 is lower than 0.05 in the visible spectrum (here n3 equals about 1.49);
a 50 μm-thick low-index fluoropolymer, preferably ETFE or FEP, film 2 forming the first (and here only) optical isolator, having first and second main faces 21, 22 treated by a corona treatment and a haze between 1.5 and 2%, such as the product called Norton ETFE from Saint Gobain Performance Plastics, which has a haze between 1.5 and 2% and a refractive index n2 equal to 1.4, or the product called Norton FEP from Saint Gobain Performance Plastics, which has a haze between 1.5 and 2% and a refractive index n2 equal to about 1.34, this film making adhesive contact with the first lamination interlayer 3 via its face 21;
a second lamination interlayer 3' made of a transparent, clear thermoplastic, preferably EVA, identical (nature, thickness, a sheet) to the first lamination interlayer and making adhesive contact with the face 22 of the low-index film 2, and of refractive index n'3; and
a second mineral glass glazing pane 1' that is identical to, congruent and in coincidence with the first glazing pane, having a first main bonding face 11' on the same side as the second lamination interlayer 3', an opposite face called the exterior face 12', a second edge face 13' and its opposite edge face 14', of refractive index n'1 of about 1.5 at 550 nm, of $T_L$ of at least 90% and with an n'3 such that, in absolute value, n'3−n'1 is lower than 0.05 in the visible spectrum (here n'3 is equal to about 1.49).

The glazing assembly 200 furthermore comprises:
a second light source 4', here an assembly of red and green light-emitting diodes aligned on a printed circuit board called the second PCB carrier 41', said source being optically coupled to the second edge face 13', the second glazing pane 1' guiding the light emitted by these diodes 4' that are preferably distant (spaced apart here) from the second edge face by at most 1 mm, said source preferably being centred on the second edge face and of width smaller than the thickness of the second glazing pane 1', 1', for example each diode has a width W'0 of 4 mm;
in congruence with the first extracting area 50 (same size, same shape or outlines), a second extracting area 50' bounded (by its outlines) by second light-extracting means 5', 5'a, 5'b associated with the second glazing pane, here (directly) on the bonding face 12', that are a second white discontinuous scattering layer having a lightness L* of at least 50, preferably a scattering white enamel with white mineral pigments and fused glass frit, here of (substantially) identical nature and even thickness to the first scattering layer 5, taking the form of second scattering features of varying size, chosen from an array of discrete features 5', 5'a tailored to obtain an an overall transparency and/or an assembly of characters/and/or decorative feature(s) 5'b, here second scattering features identical and in congruence with the first scattering features 5, 5a, 5b; and
opaque second masking means 6', 6'a, 6'b, that are a second opaque layer made of black enamel (as a variant coloured red or another colour), taking the form of second opaque features of varying size in congruence with the second scattering features and (directly) above (the first and second opaque features 6, 6' and scattering features 5, 5', which are therefore all in congruence).

If the first opaque layer made of enamel is red, based on red or another colour absorbing green (and/or is of sufficient thickness to absorb it) then the second opaque enamel layer is a colour that at least absorbs red for example blue, yellow or even green.

The second glazing pane thus coated with a double scattering white enamel/black (or coloured) opaque enamel layer is manufactured in the same way as that described for the first glazing pane.

Between the features 5, 5' (transparent zone 15) the glazing assembly is transparent (no opaque and/or scattering coating), with a TL of at least 85%. Between the first (second, respectively) edge face and the first feature 5 (5', respectively) there is a zone 16 that here is also transparent (no opaque and/or scattering coating).

Table III below gives examples of TLs and hazes for the transparent zone (external-face side) as a function of the about 0.38 mm-thick EVA chosen.

TABLE III

| EVA | Haze (%) | TL (%) |
|---|---|---|
| HDPE from CNC | 2.58 | 89.3 |
| EVASafe039 from Bridgestone | 2 | 89.7 |

Haze is measured with a haze meter.

Each interlayer is preferably a single sheet to decrease haze.

Alternatively, with two RB41 PVB (sold by Solutia) sheets having a haze of less than 1.5%, in the transparent zone (external-face side) the TL is 87% and the haze about 2.5%.

The first light source 4 is therefore controlled dynamically to emit at the instant t0, via a first series of diodes 4, a first main emission at a first wavelength called $\lambda 1$ and at the instant t'≠t0, via a second series of diodes 4, a second main emission at a second wavelength called $\lambda 2$ distinct from $\lambda 1$.

The second light source 4' is therefore controlled dynamically to emit at the instant t0, via a third series of diodes 4', a third main emission at a third wavelength called $\lambda 3$, distinct from $\lambda 1$, and at the instant t'≠t0, via a fourth series of diodes 4', a fourth main emission at a fourth wavelength called $\lambda 4$ distinct from $\lambda 1$.

At t0:
the first source emits in the green with $\lambda 1$ in a range extending from 515 nm to 535 nm and of spectral width at half-maximum of less than 50 nm (and the light extracted C1 is green defined by a first main emission extracted at $\lambda 1'$ substantially equal to $\lambda 1$, distinct by at most 10 nm or 5 nm and with a spectral width at half-maximum of less than 30 nm); and the second source emits in the red with $\lambda 3$ in a range extending from 615 nm to 635 nm and of spectral width at half-maximum of less than 30 nm (and the light extracted C3 is red defined by a third main emission extracted at $\lambda 3'$ substantially equal to $\lambda 3$, distinct by at most 10 nm or 5 nm and with a spectral width at half-maximum of less than 30 nm), or even in the white.

At t':
the first source emits in the red with $\lambda 2$ in a range extending from 615 nm to 635 nm and of spectral width at half-maximum of less than 30 nm (and the light extracted C2 is red defined by a second main emission extracted at $\lambda 1'$ substantially equal to $\lambda 1$, distinct by at most 10 nm or 5 nm and with a spectral width at half-maximum of less than 30 nm); and the second source emits in the green with $\lambda 4$ in a range extending from 515 nm to 535 nm and of spectral width at half-maximum of less than 50 nm (and the light extracted C4 is green defined by a fourth main emission extracted at $\lambda 4'$ substantially equal to $\lambda 4$, distinct by at most 10 nm or 5 nm and with a spectral width at half-maximum of less than 30 nm).

Alternatively the first source continues to emit in the red with $\lambda 4$ in a range extending from 615 nm to 635 nm and of spectral width at half-maximum of less than 30 nm (and the light extracted C4 is red defined by a fourth main emission extracted at $\lambda 4'$ substantially equal to $\lambda 1$, for example distinct by at most 10 nm or 5 nm and preferably with a spectral width at half-maximum of less than 30 nm).

In another configuration, for example, at t3 each source 4, 4' emits in the green or in the white. It is also possible for one of the sources to be turned off (therefore the following configurations: red and off-state; green and off-state; white and off-state).

To prevent the mixing of the green and red colours in the second extracting area, each diode 4 of the first source 4 comprises collimating optics 42 that ensure a narrow emission pattern. Each diode 4 of the first light source 4 is spaced apart from the first edge face 13 by at most 1 mm (or less) of air and at least 80% (preferably at least 90% and even at least 95%) of the light flux emitted by each diode is contained in an emission cone between $-\alpha 1$ and $\alpha 1$ where $\alpha 1 = \text{Arsin}(n1 \cdot \sin(\alpha 2))$, and where $\alpha 2 = \pi/2 - \text{Arsin}(n2/n1)$ corresponds to the angle of refraction in the first glazing pane, as shown by the detail view.

To prevent the mixing of the green and red colours in the first extracting area, each diode of the second source 4 comprises collimating optics 42' that ensure a narrow emission pattern. Each diode 4' of the second light source 4' is spaced apart from the second edge face 13' by at most 1 mm (or less) of air and at least 80% (preferably at least 90% and even at least 95%) of the light flux emitted by each diode is contained in an emission cone between $-\alpha'1$ and $\alpha'1$ where $\alpha'1 = \text{Arsin}(n1 \cdot \sin(\alpha'2))$, and where $\alpha'2 = \pi/2 - \text{Arsin}(n'2/n'1)$ corresponds to the angle of refraction in the second glazing pane.

For n2=1.5 (index of ETFE) and n1=1.5 in the visible spectrum $\alpha 2$ is 21° and $\alpha 1$ 33°. For n2=1.35 (index of FEP) and n1=1.5 in the visible spectrum $\alpha 2$ is 26° and $\alpha 1$ 41°.

As diodes, 4 mm-wide ALMD diodes from Avago may be chosen, 100% of the light flux emitted by each diode being contained in an emission cone between −30 and 30°. In particular, the red AlInGaP-based diodes referenced ALMD-EG3D-VX002, which have a dominant wavelength at 626 nm and a spectral width between 618 nm and 630 nm, may be used.

In particular, the green InGaN-based diodes referenced ALMD-CM3D-XZ002, which have a dominant wavelength at 525 nm and a spectral width between 519 nm and 539 nm, may be used.

Each PCB carrier is a rectangular strip that does not project beyond the edge face of the glazing assembly and comprises red and green LEDs in alternation. The maximum spacing between diodes of the same colour is chosen to be 20 mm at most.

The diodes of the first source (of the second source, respectively) each have a given main emission direction that is substantially parallel to the first edge face (second edge face, respectively) for example to within 5°.

The luminance normal to a feature 5a on the external-face or exterior-face side with green or red light is about 100 cd/m$^2$ (+/−10 cd/m$^2$). The normal luminance is uniform (to +/−10 cd/m$^2$).

The electrical circuit of each "green" diode emitting in the green is adjusted so that the flux F1 emitted by this "green" diode is lower than 0.8 and even than 0.5 times the flux F2 emitted by a "red" diode emitting in the red.

For example, for first and second PCB carriers of the same length, the following sequence may be repeated on each of the carriers: two red diodes/one green diode, etc.

Here the glazing assembly 200 is symmetrical on either side of the low-index film 3 but the first and second extracting areas 50, 50' with their masks could be offset and/or be of different size and shape if the first and second masking means each absorb green and red light (being black, grey or sufficiently thick, etc.).

However, congruence is desirable when the first masking means are coloured browny red, the second masking means then for example being blue in order to absorb green light.

Alternatively, the first masking means may be a red (or green or black) paint, or a paint of any colour providing it is sufficiently thick to be absorbent. Mention may be made by way of example of the paint Rouge Opéra of the range Planilaque Evolution (black of the range Planilaque Evolution) from the Applicant. The second masking means may be a green (or red or black) paint. Mention may be made by way of example of the paint Vert Mint of the range Planilaque Evolution from the Applicant. In this case, the first (second, respectively) extracting means may preferably be a white paint on the external face (exterior face, respectively). Mention may be made by way of example of the paint Extrablanc of the range Planilaque Evolution from the Applicant, TiO2 being the predominant pigment. The thickness is typically between 40 and 60 μm.

A paint formulation may be deposited using a curtain process. The solvent is xylene or as a variant water. After it has been dried, the lacquer for example contains the following ingredients:
- a binder taking the form of a polyurethane resin obtained by curing with a non-aromatic isocyanate, of hydroxylated acrylic resins obtained by polymerising an acrylic styrene; and
- mineral materials (pigments and fillers) in an amount of 55% by weight.

As shown in FIG. 2a, as another variant, the opaque first and second masking means are replaced by the reflective first and second means, for example a discontinuous silver layer, for example produced by silvering, that may project from either side of each scattering feature 5a, 5'a by at most 1 mm. Alternatively, these reflective first and second means 6, 6' and even optionally the first and second extracting means (scattering layer, deluster of the first and second glazing panes) are placed on the other side, on the external and exterior faces.

The first and second PCB carriers 41, 41' are located in the internal volume 74 of a preferably metal (aluminium, lacquered steel, or as a variant plastic (PVC, etc.)) or even wooden mounting profile 7 of U-shaped cross section, comprising:
- a web 72 facing the edge face of the glazing assembly 200 (including the first and second edge face 13, 13'; the edge faces of the low-index film and the first and second lamination interlayers 3, 3'), this metal web here bearing the first and second PCB carriers 41, 41' and for example serving to dissipate heat, the first and second PCB carriers for example being bonded to the web with a thermal adhesive (not shown); and
- on either side of the web 72 first and second flanges 71, 73 extending over the external face 12 and the exterior face 12', respectively, over a width W of 3 cm, without making optical contact therewith in order not to interfere with the guiding.

The face 12' is a free surface of the luminous glazing pane, is visible and may even be accessible (touchable). The glazing assembly could be assembled into an insulating glazing unit or vacuum glazing unit if required.

The first and second edge faces 13, 13' are straight and polished. The opposite edge faces 14, 14' are straight, polished or even scattering.

Other diodes may be added to the opposite edge face (not shown here) especially in the case of a glazing pane with a wide first extracting area and/or with a plurality of separate centimeter-sized features.

A polymer seal may be placed on this opposite edge face for example to increase comfort if the leaves close too quickly on the pedestrian.

As a variant, for example for a divider or window, the first and second optical isolators and the first and second lamination interlayers are removed and the first and second glazing panes are spaced apart by air (ideal optical isolator) and joined (sealed) on the periphery, preferably with spacers, for example as a double glazing unit (insulating or vacuum glazing unit).

Figure 3A:
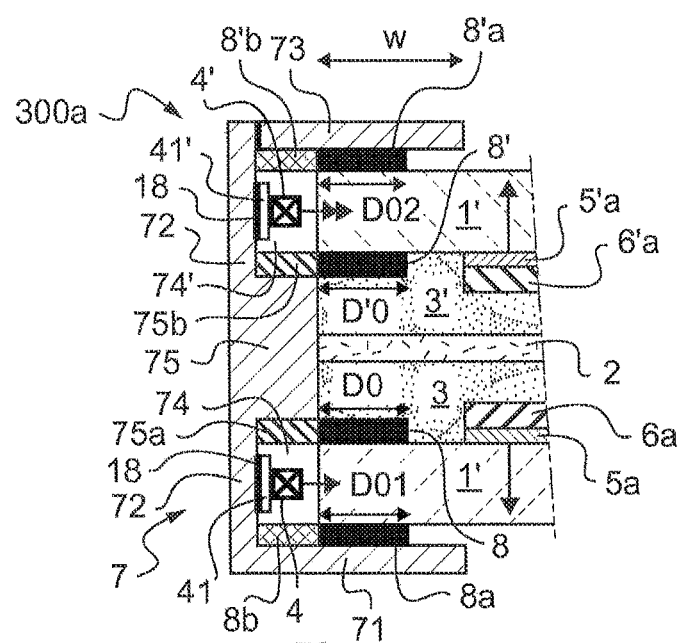

FIG. 3a shows a partial cross-sectional view of a luminous glazing assembly 300a in a third embodiment that is a variant of the second.

Only differences relative to the second embodiment are described. The luminous glazing assembly 300a differs as follows from the glazing assembly 200.

Conventional diodes 4, 4' are chosen, for example without collimating optics—and even without (pre)encapsulation—having a large-angle emission pattern, for example a Lambertian emission pattern (for example with an angle at half-maximum of 120°).

As diodes, the 3 mm W0 width NSSM124T diodes sold by NICHIA may be chosen, arranged centred on the first edge face. As a precaution, it may also be chosen to retain the diodes of the example in FIG. 2.

A first so-called anti-mixing band 8, made of a black enamel or black paint, covers the internal face 11 over a width D0 in order to intersect the large-angle rays travelling toward the second glazing pane 1'. The first band 8 is offset from the first masking means 6a and the first extracting area 50 which are further away from the first edge face 13. The anti-mixing band and first masking means may be produced at the same time with the same composition.

D0 is at least equal to 0.8 Dmin where $Dmin = d1/\tan(\pi/2 - \arcsin(n2/n1))$ and smaller than 2 cm and even 1 cm, d1 being the distance between the furthest edge of each diode of the first source and the internal face 11, or formed by a feature of the opaque first masking means. For d1 equal to 5 mm, $n2=1.4$ and $n1=1.5$ Dmin is therefore 13 mm.

Another identical first anti-mixing band 8a of width D01 equal to D0, may preferably be added to the external face 12 to intersect large-angle rays travelling towards the second glazing pane 1' after having been reflected from the flange 71. A black adhesive tape that in addition is single-sided or double-sided is for example chosen (under an optional adhesive 18, replacing a mounting adhesive, etc.). The flange 71 projects beyond the other first anti-mixing band 8a.

A second so-called anti-mixing band 8', made of a black enamel or black paint, covers the bonding face 11' over the width D0 in order to intersect the large-angle rays travelling toward the first glazing pane 1. The second band 8' is offset from the second masking means 6'a and the second extracting area 50 which are further away from the second edge face 13'. If it is chosen to use a paint (lacquer), the second anti-mixing band may be produced at the same time as the second masking means.

D'0 is at least equal to 0.8 D'min where D'min=d'1/tan$(\pi/2-\arcsin(n2/n'1))$ and smaller than 2 cm, d'1 being the distance between the furthest edge of each diode 41' of the second source 4' and the bonding face 11', or formed by a feature of the opaque second masking means. For d'1 equal to 5 mm, n'2=1.4 and n'1=1.5 D'min is therefore 13 mm.

Here the first and second bands are chosen to be identical. These anti-mixing bands are above all useful if n2 (n'2) is at least 1.2.

Another identical second anti-mixing band 8'a of width D02 equal to D'0, is preferably added to the exterior face 12' to intersect large-angle rays travelling towards the first glazing pane 1 after having been reflected from the flange 73. A black adhesive tape that in addition is single-sided or double-sided is for example chosen (under an optional adhesive 18, replacing a mounting adhesive, etc.). The flange 73 projects beyond the other second anti-mixing band 8'a.

Moreover, it is desirable to prevent any colour mixing due to lateral leakage of light from the first diodes 4 in the internal volume 74 into the second glazing pane (rays not coupled to the first glazing pane) in particular refraction at the first interlayer or even at the second edge face, and/or due to lateral leakage of light from the second diodes 4' in the internal volume 74' into the first glazing pane (rays not coupled to the second glazing pane) in particular refraction at the second interlayer or even at the first edge face 13.

Thus, the carrier 7 is a profile having an E-shaped cross section rather than a U-shaped cross section, the central arm 75 of the opaque (or reflective) E acting as a partition and absorbing (or reflecting) light from the first light source and from the second light source, said arm for example being placed against or spaced apart by less than 1 mm from the (aligned) edge face of the glazing assembly (of the laminated glazing unit). The profile or at least this central arm 75 is of a thickness smaller than or equal to this thickness between the internal face and the bonding face, for example less than 0.8 mm and even 0.5 mm in thickness.

The profile 7 is either monolithic or the opaque (absorbent) central arm 75 is added (fastened) to the web 72.

All (or at least the interior) of the profile 7 may be opaque (having been submerged in a bath for example).

The first lateral area with the opaque coating 75a preferably does not project towards or over the first edge face 13.

The second area with the opaque coating 75b preferably does not project towards or over the second edge face 13'.

Preferably, an opaque coating of less than 1 mm and even less than 0.5 mm is chosen.

It is for example a black paint or a black adhesive, such as:
- single-sided: the product NORFIX T333 (polyethylene foam and acrylic adhesive) from Norton, thickness of 0.5 mm;
- double-sided: the product D5395B from Nitto, thickness of 0.05 mm (black polyester and acrylic adhesive) or D9625, thickness of 0.100 mm (black polyethylene and acrylic adhesive);
- single-sided: the product 61313B from Nitto, thickness of 0.05 mm (black polyester and acrylic adhesive); or
- double-sided: the product 521-12 μm from Lohmann, thickness of 12 μm.

There is no adhesive or any other fastening means between the central arm and the central edge face.

As a variant, the opaque (absorbent) central arm 75 is a separate part (with the aforementioned opaque coatings) that is added (fastened) to the web 72 by an adhesive 18, via a notch, etc. As a precaution, on the same side as the internal space 74, an opaque coating 8b is formed facing the opaque lateral area 75a on the flange 71, for example by extending a black double-sided or single-sided adhesive tape 8a.

As a precaution, on the same side as the internal space 74', an opaque coating 8'b is formed facing the opaque lateral area 75b on the flange 73, for example by extending a black double-sided or single-sided adhesive tape 8'a.

Alternatively, when the central arm 75 (like the web 72 and the flange 71 and even the flange 73) is reflective and made of a metal, for example of aluminium, it may play the role of partition. A reflective metal profile 7, for example made of aluminium, without an (opaque) coating facing the internal spaces 74, 74', may also suffice.

Figure 3B:
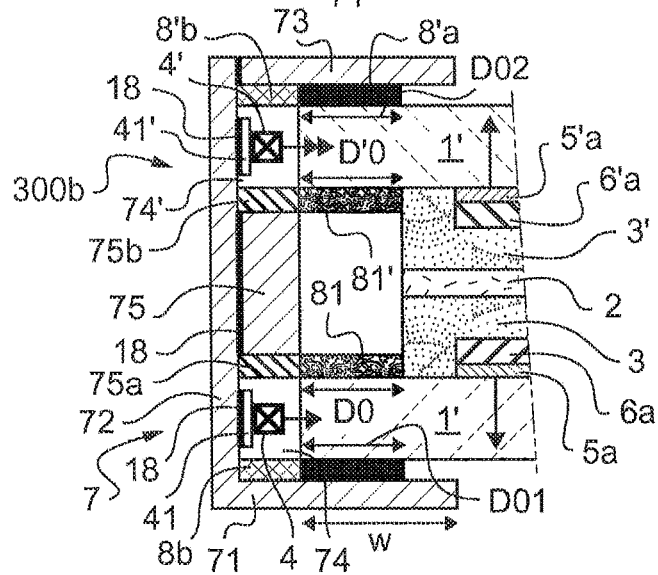

FIG. 3b shows a partial cross-sectional view of a luminous glazing assembly 300b in a first variant of the third embodiment.

Only differences relative to the third embodiment are described. The luminous glazing assembly 300b differs as follows from the glazing assembly 300a.

The first and second bands 81, 81' are each a single-sided or double-sided opaque adhesive band (adhesive tape) of thickness smaller than that of the interlayers 3, 3' (0.76 mm even 0.38 mm)—for example bands such as those described for the central arm 75 of the preceding example. These adhesive bands 81, 81' have a free surface because the lamination interlayers 3, 3' and the first optical isolator 2 are set back from the first and second edge faces 13, 13' and start at D0 (D'0).

The profile 7 has a U-shaped cross section. A part 75 comprising the opaque coatings 75a, 75b is adhesively bonded to the web 72 and is spaced apart by less than 1 mm from the groove between the glazing panes 1, 1'. It may penetrate into the groove.

Alternatively, when the central arm 75 (like the web 72 and the flange 71 and even the flange 73) is reflective and made of a metal, for example of aluminium, it may play the role of partition. A reflective metal profile 7, for example made of aluminium, without an (opaque) coating facing the internal spaces 74, 74', may also suffice.

Figure 3C:
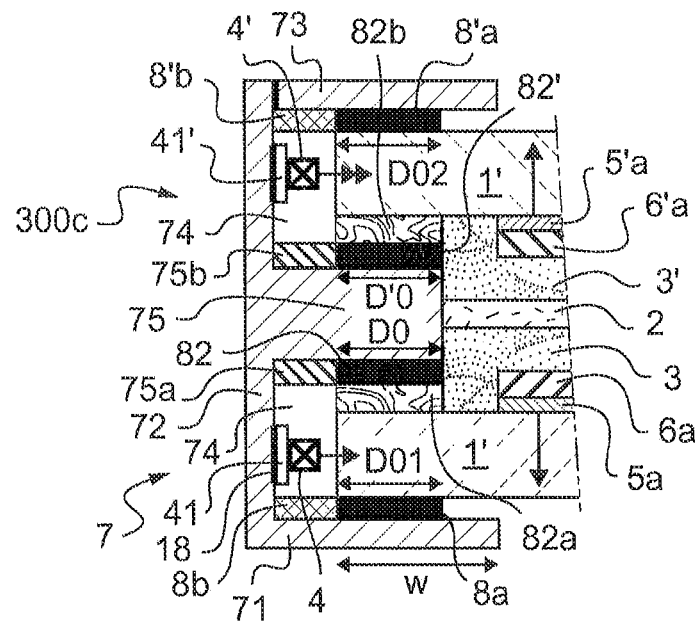

FIG. 3c shows a partial cross-sectional view of a luminous glazing assembly 300c in a second variant of the third embodiment.

Only differences relative to the first variant are described. The luminous glazing assembly 300c differs as follows from the glazing assembly 300b.

The first and second bands 82, 82' are each an opaque, for example black, coating (ink etc.) on the main faces of the central arm 75, which penetrates between the glazing planes 1, 1' as far as the edge faces of the interlayers 3, 3' and of the optical isolator 2.

These opaque coatings 82, 82' have external surfaces that are adhesively bonded to the internal and bonding faces 11, 11' by an optical adhesive or a transparent double-sided adhesive 82a, 82b, such as a polyester carrier coated on both sides with an acrylic adhesive, such as the product denoted D9605 from NITTO.

To form the opaque lateral surfaces 75a, 75b, the opaque coating 82, 82', chosen to be a black single-sided adhesive tape, may be extended onto a central arm 75 of the profile of E-shaped cross section.

Alternatively, when the central arm 75 (like the web 72 and the flange 71 and even the flange 73) is reflective and made of a metal, for example of aluminium, it may play the role of partition. A reflective metal profile 7, for example made of aluminium, without an (opaque) coating facing the internal spaces 74, 74', may also suffice.

Figure 3D:
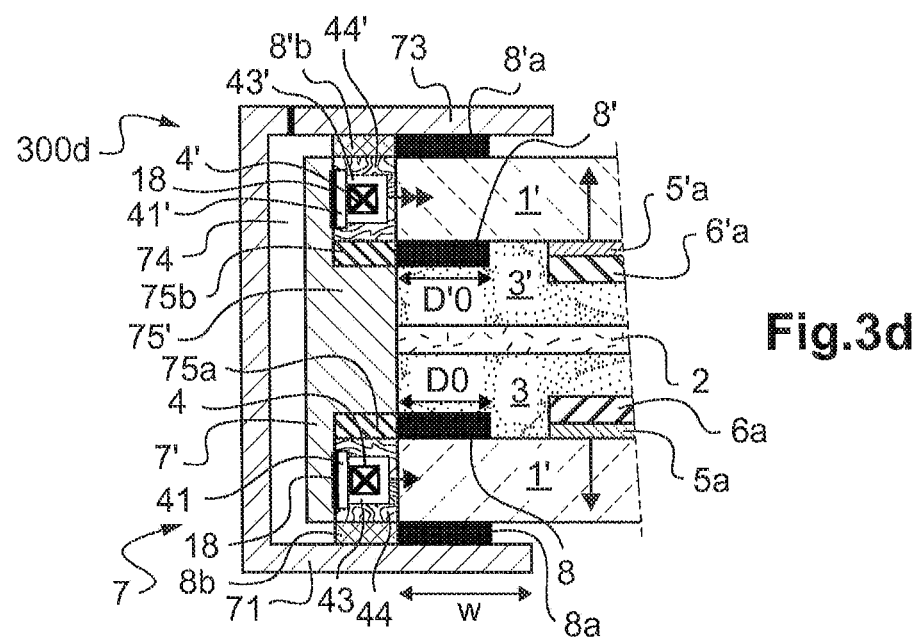

FIG. 3d shows a partial cross-sectional view of a luminous glazing assembly 300d in another variant of the third embodiment.

Only differences relative to the third embodiment are described. The luminous glazing assembly 300d differs as follows from the glazing assembly 300a.

The first and second PCB carriers 41, 41' are on a common metal profile 7', for example a strip of T-shaped cross section, and therefore with a projection 75 comprising the opaque coatings 75a, 75b for partitioning the light sources 4, 4' and absorbing misdirected rays, the width of said strip being smaller than or equal to the thickness of the edge face of the glazing assembly.

This profile 7' is not fastened to the mounting profile 7 of the glazing assembly, which for example is borne by one bearing unit.

Each of the diodes of the first source 4 (second source 4', respectively) comprises a primary encapsulation 43, 43' and is adhesively bonded to the first edge face 13 (the second edge face 14', respectively) by a transparent double-sided adhesive 44, 44', such as a polyester carrier coated on both sides with an acrylic adhesive, such as the product denoted D9605 from NITTO, that for example does not project beyond the edge face of the glazing assembly towards the exterior.

Alternatively, when the central arm 7' is reflective and made of a metal, for example of aluminium, it may play the role of partition. A reflective metal profile 7, for example made of aluminium, without an (opaque) coating facing the diodes, may also suffice.

It is also possible to remove the common profile and use one profile (strip of rectangular or even U- or L-shaped cross section) thus adhesively bonded for each source 4, 4'. Two U- or L-shaped profiles may be spaced apart or adhesively bonded or fastened together without removing the partition. There may also be two profiles thus adhesively bonded on the edge faces on the opposite side of the glazing assembly.

FIG. 3e shows a partial cross-sectional view of a luminous glazing assembly 300e in a variant of the third embodiment.

Only differences relative to the third embodiment are described. The luminous glazing assembly 300e differs as follows from the glazing assembly 300a.

The first anti-mixing band of width D0 is no longer a simple opaque coating but is replaced by a first opaque feature 6a (black or coloured enamel) underlying a first scattering feature 5a (white enamel). Extraction starts from the first edge face 13. This lamination-side anti-mixing band embodiment is the easiest to manufacture. The second anti-mixing band of width D'0 is no longer a simple coating but is replaced by a second opaque feature 6'a (black or coloured enamel) underlying a second scattering feature 5'a (white enamel).

The first and second PCB carriers 41, 41' are on a common metal profile 7 having a web 72 facing the edge face of the glazing assembly, and two flanges 71, 73 on either side. The profile 7 is therefore U-shaped, and a part 75 comprising the opaque coatings 75a, 75b is fastened (adhesively bonded, etc.) to the web 72. The first extracting feature 5a, 5'a is masked by the flanges 71, 73. Alternatively, the part 75 is a reflective metal part, for instance an aluminium part (not comprising opaque coatings) or else an opaque part.

Each of the diodes of the first source (second source, respectively) comprises a primary encapsulation 43, 43' and is adhesively bonded to the first edge face 13 (second edge face 14', respectively) by an optical adhesive 44, 44' or a transparent double-sided adhesive.

The profile 7 may thus be E-shaped (it preferably does not project beyond the exterior and external faces).

FIG. 3'e shows a partial cross-sectional view of a luminous glazing assembly 300'e in a variant of the preceding embodiment.

The luminous glazing assembly 300'e differs as follows from the preceding glazing assembly 300e.

The first and second PCB carriers 41, 41' are formed by a common PCB carrier 410, such as a rectangular strip, having a width smaller than or equal to the thickness of the edge face of the glazing assembly. The common PCB carrier is adhesively bonded by a thermal adhesive 18 to the metal web 72 of the U-shaped profile 7.

A part comprising the opaque coatings 75a, 75b is fastened to the common PCB carrier 410 by an adhesive 18 (or a notch). Alternatively, the part 75 is a reflective metal part, for instance an aluminium part (not comprising opaque coatings) or else an opaque part.

The diodes, which are still top-emitting diodes, are spaced apart from the first and second edge faces 13, 13'. The adhesive 44, 44' is omitted.

As a variant, the opaque bands 8 and 8' (enamel layers here) are not removed (the opaque bands 8a and 8'a preferably being added films such as the opaque double- or single-sided adhesives mentioned above).

FIG. 4 shows a partial cross-sectional view of a luminous glazing assembly 400 in a fourth embodiment.

Only differences relative to the third embodiment 300a are described. The luminous glazing assembly 400 differs as follows from the glazing assembly 300a.

A low-index film is no longer used. A third glass pane 1", which for example is identical to the first and second glazing panes 1, 1', is inserted. The thickness of each pane may be decreased to about 4 mm, d1 (d1') then being equal to 4 mm.

This third glass pane 1" is coated:
on its face 11", on the same side as the internal face 11, with a first low-index layer that is a layer of porous silica preferably obtained by the sol-gel process, which layer is 600 nm and preferably 800 nm in thickness, said layer if necessary being surmounted with a first transparent protective coating 2a that is made up of a (dense) silica layer obtained by the sol-gel process, this protective layer being 300 nm or even larger in thickness and having a refractive index n4 of at least 1.4 at 550 nm; and
on its face 12", on the same side as the bonding face 11', with a second low-index layer that is a layer of porous silica preferably obtained by the sol-gel process, which layer is 600 nm and preferably 800 nm in thickness, said layer preferably being identical to the first low-index layer and, if necessary, surmounted with a second transparent protective coating 2'a that is made up of a (dense) silica layer obtained by the sol-gel process, this protective layer being 300 nm or even larger in thickness and preferably identical to the first protective coating 2a.

The mounting profile 7 is U-shaped (or as a variant remains E-shaped with opaque lateral surfaces for partitioning and absorbing light). The web 72 bears a part 75 having opaque lateral surfaces 75a, 75b adhesively bonded with the adhesive 18 for example. Alternatively, the part 75 is a reflective metal part, for instance an aluminium part (not comprising opaque coatings) or else an opaque part.

Preferably another first anti-mixing band 8*a* is added to the external face 12 and another second anti-mixing band 8'*a* is added to the exterior face 12', these bands for example being thin single-sided or double-sided black adhesive tapes such as described above.

Opaque coatings 8*b*, 8'*b* are even added to the internal-side walls 74, 74' of the first and second flanges 71, 73.

n2 (n'2) varies depending on the fraction of pores per unit volume and may easily range from 1.4 to 1.15. The fraction of pores per unit volume is preferably higher than 50% and even than 65% but is preferably lower than 85% in order to obtain a high layer withstand.

Each porous silica layer 2, 2' is a matrix of silica having closed pores (preferably bounded by walls made of the silica) in its volume.

If n2 drops below 1.2 (if n'2 drops below 1.2) the first (second) anti-mixing band 8, 8' and any other anti-mixing band may be removed.

The porosity may furthermore be monodisperse in size, the pore size then being calibrated. 80% or even more of the pores are closed and spherical (or oval) in shape, having a diameter between 75 nm and 100 nm.

It is possible, as a variant, to use the glass pane 1" with only the first porous sol-gel silica layer (preferably) with its protective coating 2*a*—the opposite face then making contact with the second lamination interlayer—but in light of the millimeter-sized thickness of the central third pane 1", the path length of the guided rays will be increased and this may decrease the extraction efficiency (and even more rays will possibly be absorbed by the opaque first masking means 6).

An example procedure for manufacturing the porous silica layer is described in WO 2008/059170. Preferably, the high-temperature bake takes place after the wet deposition of the dense silica layer on the dried porous silica layer.

FIG. 5 shows a partial cross-sectional view of a luminous glazing assembly 500 in a fifth embodiment.

Only differences relative to the fourth embodiment 400 are described. The luminous glazing assembly 500 differs as follows from the glazing assembly 400.

The profile 7 is E-shaped and preferably made of metal and for example has a thickness of at most 5 mm (this thickness being smaller than or equal to the bonding face-internal face distance), the profile 7 having a central arm 75 partitioning the sources 4 and 4' and intermediate between the internal 11 and bonding 11' faces. The interlayers 3, 3', the low-index layers 2, 2' and their protective coatings 2*a*, 2*b* and the central glass pane 1" are set back from the edge face of the glazing assembly (including the first and second edge faces 13, 13') by D0 (D'0 equal to D0). On this central arm 75 the first PCB carrier 41 is arranged on one side and the second PCB carrier 41' on the other side.

The diodes 4, 4' are side-emitting diodes. Each emitting face of the first source 4 (of the second source 4', respectively) is perpendicular to the first (second, respectively) PCB carrier 41.

The width of the emitting face is for example 1 mm and d1 is about 2.5 mm (for 4 mm-thick glass, the diodes being centred).

Another first anti-mixing band 8*a* is added to the external face 12 and another second anti-mixing band 8'*a* is added to the exterior face 12'.

The PCB carriers 41, 41' may participate in the anti-mixing partitioning of the lights. Thus, the first PCB carrier 41 is opaque (or has an opaque coating on the side 74) and forms the first opaque partition, and the second PCB carrier 41' is opaque (or has an opaque coating on the side 74') and forms the second opaque partition.

Preferably, the first PCB carrier 41 (its edge face) does not protrude over the first edge face 13 and the second PCB carrier 41' (its edge face) does not protrude over the second edge face 13'.

Each PCB carrier 41, 41' is adhesively bonded to the surface of the central arm 75 with an adhesive (not shown) for example a thermal adhesive that may be opaque.

Alternatively, there is no setback. The PCB carriers 41, 41' (and the central arm 75 bearing them) are then against the central edge face.

Alternatively, the PCB carriers 41, 41' are fastened to the flanges 71, 73 of the mounting profile 7.

FIGS. 6*a* and 6*b* show a partial front view of a series of one-way luminous two signal and/or decoration glazed doors 2000 comprising two luminous glazing assemblies 100' according to a sixth embodiment. FIG. 6*b* is an enlarged front view of one of them. Only differences relative to the second embodiment 200 are described. The luminous glazing assembly 600 differs as follows from the glazing assembly 200.

Each glazing assembly 100' comprises five first extracting areas 50*a* to 50*e* taking the form of rectangular horizontal bands the width (height) of which increases in the floor direction. The fourth first extracting area (starting from the top) comprises an assembly of characters taking the form of a logo the opaque or reflective mask of which is congruent (not shown), this logo being encircled by first discrete scattering features 5 analogous to those described above, the opaque or reflective mask of which is also congruent (not shown). The other first extracting areas only contain first discrete scattering features 5 (see FIG. 6*a*) analogous to those described above. The second extracting areas (not shown) with their opaque or reflective second masking means are congruent with the first extracting areas. There are transparent zones 17 between the extracting bands 50*a* to 50*e* and in the top and bottom parts.

Each glazing assembly 100' comprises a mounting frame 7*a*, 7*b*, 7*c*, 7*d*, which for example is (monolithic or made up of a number of parts) made of metal or plastic (PVC, etc.) or even of wood and for example has a U-shaped cross section. As many assemblies of diodes 4*a* of at least two distinct colours, for example red or green and even blue or white or amber, as there are extracting areas, are placed, for the first glazing pane, on a first common (or individual) PCB carrier 41*a* in the internal volume of the vertical mounting profile 7*a* on the first-edge-face side. The same is done for the second glazing pane, Each extracting band is more than 450 mm in length, therefore, as many additional assemblies of diodes 4*b* of at least two distinct colours, for example red or green and even blue or white or amber, as there are extracting areas are preferably placed, for the first glazing pane, on another common (or individual) PCB carrier 41*b* in the internal volume of the vertical mounting profile 7*b* on the edge face on the side opposite the first edge face. The additional assemblies are identical to the assemblies on the first-edge-face side. The same is done for the second glazing pane.

Each glazing assembly 100' is mounted on rails and slides to free the passage. A ticket or a means of identification, etc. may be needed to open the door.

FIG. 7 shows a partial cross-sectional view of a luminous glazing assembly 700 in a seventh embodiment.

Only differences relative to the third embodiment 300*a* are described. The luminous glazing assembly 700 differs as follows from the glazing assembly 300*a*.

The second light source 4' is on the opposite side of the glazing assembly to the first light source 4. The second edge face 13' is therefore on the opposite side of the glazing assembly to the first edge face 13. Likewise, the second anti-mixing band 8' (for example a black double-sided adhesive tape) is on the opposite side of the glazing assembly to the first anti-mixing band 8 (for example a black double-sided adhesive tape). The first and second glazing panes are still of identical size but are offset laterally.

A profile 7' for fastening the PCB 41 holding the diodes 4 to the first glazing pane has a U-shaped (or L-shaped) cross section and is attached to the first glazing pane (in the projecting zone 12a of the internal face 11a due to the offset of the glazing panes). Another profile 7'' for fastening the PCB 41' holding the diodes 4' to the second glazing pane has a U-shaped (or L-shaped) cross section and is attached to the second glazing pane (in the projecting zone 11'a of the bonding face 11 due to the offset of the glazing panes).

The anti-mixing bands 8 and 8' are located in the projecting zones 11a, 11'a, Preferably another first anti-mixing band 8a is still present on the external face 12, and another second anti-mixing band 8'a is still present on the exterior face 12'. They are located in the projecting zones 11a, 11'a.

If the fastening profile 7 is not opaque, opaque coatings may be provided on the flanges 71', 73' in the internal volume 74. If the fastening profile 7' is not opaque, opaque coatings may be provided on the flanges 71'', 73'' in the internal volume 74'.

A mounting profile (not shown) of the glazing assembly, for example enclosing the fastening profiles 7, 7', may be attached over the entire thickness of the glazing assembly, on each side, to form a frame.

As a variant, shown in FIG. 7a (partial view), the mounting profile 7 is made of metal and has a U-shaped cross section with a web 72 that bears the first PCB carrier, adhesively bonded with a thermal adhesive 18, and flanges 71, 72 on the external and exterior faces 12, 12'. The opaque first band 8 is for example a single-sided adhesive and it has a free surface.

The same is true on the second-edge-face side.

FIG. 7' shows a partial cross-sectional view of a luminous glazing assembly 700 in a variant of the seventh embodiment.

Only differences relative to the seventh embodiment 700 are described. The luminous glazing assembly 700' differs as follows from the glazing assembly 700.

The fastening profile 7' does not increase the thickness of the glazing assembly because it is located facing the projecting zone 11'a of the second glazing pane 1'. It may even be fastened via its flange 73 to this projecting zone (outside of the second extracting area 50'). The other profile 7'' also does not increase the thickness of the glazing assembly because it is located facing the projecting zone 12a of the first glazing pane 1'. It may even be fastened via its flange 73' to this projecting zone (outside of the first extracting area 50).

The anti-mixing bands are omitted. The diodes comprise a lens 42, 42' in order to obtain a narrow emission pattern, or alternatively a low-index layer (with a protective coating) with an n2 less than 1.2 is used as an optical isolator.

FIG. 8 shows a partial cross-sectional view of a luminous glazing assembly 800 comprising two one-way luminous zones (decorations and/or signals) according to one embodiment, comprising:

a first glazing pane 1, here rectangular (length along the vertical of 1 m for example, and width for example of 250 mm) that is flat, or as a variant curved (tempered), made of tempered clear or extra-clear soda-lime-silica glass (for example about 6 mm in thickness and tempered, especially the glass called Planilux from the Applicant) of refractive index n1 of about 1.5 at 550 nm and with a $T_L$ of at least 90%, comprising a first main face 11 called the internal face, a second main face 12 called the external face, and a first edge face 13 that is vertical in the mounted position and its opposite edge face 14 (here the edge is formed by four edge faces, the first edge face being longitudinal);

a first light source 4, here an assembly of red and green light-emitting diodes 4 aligned on a printed circuit board called the first PCB carrier 41, said source being optically coupled to the first edge face 13, the first glazing pane 1 guiding the light emitted by the diodes that are here preferably spaced apart from the first edge face 13 by at most 1 mm, said source preferably being centred on the first edge face and of width smaller than the thickness of the first glazing pane 1, for example each diode has a width W0 of 4 mm; and a first extracting area 50 bounded by (the outlines) of first light-extracting means 5, 5a, 5b associated with the first glazing pane here directly on the internal face 12, which means are a first discontinuous white scattering layer having a lightness L* of at least 50, which layer is here a white scattering enamel containing white mineral pigments and fused glass frit, taking the form of first scattering features of varying size, including an array of discrete features 5a, 5 and one or more decorative features 5b and/or as a variant an assembly of characters (logo, etc.).

The first scattering feature 5a is distant by W from the first edge face 13. The widest feature 5b is a decorative feature, for example a 3 cm-wide geometric shape that is. The discrete features are for example geometric shapes such as discs.

For a 256 mm-long (along the horizontal) first extracting area, the discrete features are for example 1 mm-diameter discs spaced apart by 4 mm. The decorative feature is spaced 7 mm apart from (encircled by) the discs.

In a first example manufacturing procedure, a first liquid scattering enamel composition comprising a glass frit, a white mineral pigment and an organic medium is applied discontinuously by screen-printing to the internal face 11 (or as a variant to the external face) to form the field of the first scattering features 5, 5a, 5b and dried, More precisely, the first enamel composition contains a glass frit and $TiO_2$ pigments (sold under the reference 194100 by FERRO) and an organic medium (sold under the reference 801022 by Prince Minerals) in an amount allowing a viscosity of 200 poise (measured under the aforementioned conditions) to be obtained.

The average thickness (when wet) of the deposited first layer is equal to 35 µm.

On the glass (external-face) side the white colour is defined by L=63.08, a=−1.92, b=0.69 (after baking).

On the mask (internal-face) side the white colour is defined by L=82.35, a=−1.24, b=−0.46 (after baking).

The optical density of the white scattering enamel is 0.9 (glass side) after baking.

The screening-printing screen used for the first layer consists of a woven of 80 µm-diameter polyester threads comprising 43 threads/cm, which especially allows a plurality of discrete features taking the form of 1 mm-diameter discs spaced apart by 4 mm, and a 2 cm-wide decorative feature, such as a disc or symbol, to be formed.

After the deposition, the first glazing pane thus coated is introduced into a drying device equipped with infrared lamps operating at a temperature of about 145 to 155° C. in order to remove the organic medium and consolidate the layer. The coated first glazing pane is then heated to a temperature of 655° C. in an oven in order to melt the glass frit and form the enamel.

As a variant, the enamel 5 for example has the following composition:
between 20 and 60% by weight $SiO_2$;
10 to 45% by weight of especially micron-sized refractory pigments, including $TiO_2$; and
no more than 20% by weight alumina and/or zinc oxide.

Examples of enamel compositions include the enamel called Ferro 194011 sold by FERRO, the enamel of reference AF5000 sold by JM and the enamel of reference VV30-244-1 sold by Pemco.

As another variant, a white paint may be chosen. Mention may be made by way of example of the paint Extrablanc of the range Planilaque Evolution from the Applicant, TiO2 being the predominant pigment. The thickness is typically between 40 and 60 μm.

A paint formulation may be deposited using a curtain process. The solvent is xylene or as a variant water. After it has been dried, the lacquer for example contains the following ingredients:
a binder taking the form of a polyurethane resin obtained by curing with an non-aromatic isocyanate, of hydroxylated acrylic resins obtained by polymerising an acrylic styrene; and
mineral materials (pigments and fillers) in an amount of 55% by weight.

The internal face 11 and the first scattering features 5, 5a, 5b are (directly) covered by:
a first lamination interlayer 3 made of a transparent, even clear, submillimeter-sized 0.38 mm sheet of thermoplastic, here EVA, having (alone) a haze of at most 1.5%, and even 1% and a refractive index n3 such that, in absolute value, n3–n1 is lower than 0.05 (here n3 equals about 1.49 in the visible spectrum);
a 50 μm-thick low-index fluoropolymer, preferably ETFE or FEP, film 2 having first and second main faces treated by a corona treatment and a haze between 1.5 and 2%, such as the product called Norton ETFE from Saint Gobain Performance Plastics, which has a haze between 1.5 and 2% and a refractive index n2 equal to 1.4, or the product called Norton FEP from Saint Gobain Performance Plastics, which has a haze between 1.5 and 2% and a refractive index n2 equal to about 1.34, this film making adhesive contact with the first lamination interlayer 3;
a central lamination interlayer 3" made of a thermoplastic, preferably EVA, identical (nature, thickness, a sheet) to the first lamination interlayer 3 but optionally tinted, making adhesive contact with the low-index film 2;
a transparent central carrier 1" that is here a mineral glass glazing pane (or a film of a plastic such as PET) that is identical to (though possibly thinner than) the first glazing pane but optionally tinted, all of one face of this carrier being coated with opaque first masking means 60 that are an opaque first coating here made of black, grey or coloured (red, green or another sufficiently absorbent colour) enamel, this enamel containing mineral pigments and a fused glass frit, the opaque layer here being located on the same side as the bonding face 11' though as a variant it may be located on the same side as the internal face 11;
another central lamination interlayer 3'" made of a thermoplastic, preferably EVA, identical (nature, thickness, a sheet) to the first lamination interlayer 3 but optionally tinted, making adhesive contact with the opaque coating 30;
a 50 μm-thick low-index fluoropolymer, preferably ETFE or FEP, film 2 having first and second main faces treated by a corona treatment and a haze between 1.5 and 2% and preferably identical to the first optical isolator 2, such as the product called Norton ETFE from Saint Gobain Performance Plastics, which has a haze between 1.5 and 2% and a refractive index n2 equal to 1.4, or the product called Norton FEP from Saint Gobain Performance Plastics, which has a haze between 1.5 and 2% and a refractive index n2 equal to about 1.34, this film making adhesive contact with the other lamination interlayer 3'";
a second lamination interlayer 3" made of a preferably transparent, clear thermoplastic, preferably EVA, identical (nature, thickness, a sheet) to the first lamination interlayer and making adhesive contact with the second low-index film 2', and of refractive index n'3; and
a second mineral glass glazing pane 1' that is identical to, congruent with (or as a variant offset from) the first glazing pane, having a first main bonding face 11' on the same side as the second lamination interlayer 3', an opposite face called the exterior face 12', a second edge face 13' and its opposite edge face 14', of refractive index n'1 of about 1.5 at 550 nm, of $T_L$ of at least 90% and with a n'3 such that, in absolute value, n'3–n'1 is lower than 0.05 in the visible spectrum (here n'3 is equal to about 1.49).

The glazing assembly 800 furthermore comprises:
a second light source 4', here an assembly of red and green light-emitting diodes aligned on a printed circuit board called the second PCB carrier 41', said source being optically coupled to the second edge face 13', the second glazing pane 1' guiding the light emitted by these diodes 4' that are here preferably spaced apart by at most 1 mm from the second edge face, said source preferably being centred on the second edge face and of width smaller than the thickness of the second glazing pane 1', 1', for example diodes with a width W'0 of 4 mm;
for example, here, in congruence with the first extracting area 50 (same size, same shape or outlines), a second extracting area 50' bounded (by its outlines) by second light-extracting means 5', 5'a, 5'b associated with the second glazing pane, here directly on the bonding face 12', that are a second white discontinuous scattering layer having a lightness L* of at least 50, preferably a scattering white enamel with white mineral pigments and fused glass frit, here of (substantially) identical nature and even thickness to the first scattering layer 5, taking the form of second scattering features of varying size, chosen from an array of discrete features 5', 5'a and/or an assembly of characters/and/or decorative feature(s) 5'b, for example congruent with the first scattering features 5, 5a, 5b;

As a variant, if the opaque masking coating (enamel, paint, ink, etc.) is red or based on red or another colour absorbent in the green (or is of sufficient thickness to absorb green light) then a second opaque masking coating of a colour at least absorbent in the red, for example blue, yellow or even green, is added, for example to the internal-face 11 side face of the central glass pane 1".

The second glazing pane 1 coated with a scattering white enamel layer 5 is manufactured in the same way as that described for the first glazing pane.

The first extracting area 50 (and the second extracting area 50', here congruent) may extend over the entire length and substantially cover the first glazing pane (except its margins), just like the opaque coating 60.

As shown by way of a variant in FIG. 8a, a plurality of band-shaped first extracting areas 50a, 50b, for example two horizontal bands, may be used—one made up of discrete features 5, 5a and the other of discrete features encircling a logo 5b—said bands being spaced apart by a transparent zone 17 and from the lateral edge faces by a transparent zone 17.

There are thus two spaced-apart opaque-coating zones 60a, 60b, each covering an extracting band.

As shown by way of a variant in FIG. 8b, a plurality of band-shaped first extracting areas 50a, 50b, for example two horizontal bands, may be used—one, made up of discrete features 5 and less wide than the first glazing pane, for example being located off-centre to the right, and the other, made up of discrete features 5 and less wide than the first glazing pane, for example being located off-centre to the left—said bands being spaced apart by a transparent zone 17 and from the lateral edge faces by a transparent zone 17.

There are thus two spaced-apart opaque-coating zones 60a, 60b, the first covering the first extracting band and the second covering the second extracting band and extending over the width of the glazing pane, for example in order to prevent an indent or step in the laminated assembly.

The first light source 4 is therefore controlled dynamically to emit at the instant t0, via a first series of diodes 4, a first main emission at a first wavelength called $\lambda 1$ and at the instant t'≠t0, via a second series of diodes 4, a second main emission at a second wavelength called $\lambda 2$ distinct from $\lambda 1$.

The second light source 4' is therefore controlled dynamically to emit at the instant t0, via a third series of diodes 4', a third main emission at a third wavelength called $\lambda 3$, and at the instant t'≠t0, via a fourth series of diodes 4', a fourth main emission at a fourth wavelength called $\lambda 4$ distinct from $\lambda 1$.

At t0:
the first source emits in the green with $\lambda 1$ in a range extending from 515 nm to 535 nm and of spectral width at half-maximum of less than 50 nm (and the light extracted C1 is green defined by a first main emission extracted at $\lambda 1'$ substantially equal to $\lambda 1$, distinct by at most 10 nm or 5 nm and with a spectral width at half-maximum of less than 30 nm); and the second source emits in the red with $\lambda 3$ in a range extending from 615 nm to 635 nm and of spectral width at half-maximum of less than 30 nm (and the light extracted C3 is red defined by a third main emission extracted at $\lambda 3'$ substantially equal to $\lambda 3$, distinct by at most 10 nm or 5 nm and with a spectral width at half-maximum of less than 30 nm), or even in the white.

At t':
the first source emits in the red with $\lambda 2$ in a range extending from 615 nm to 635 nm and of spectral width at half-maximum of less than 30 nm (and the light extracted C2 is red defined by a second main emission extracted at $\lambda 1'$ substantially equal to $\lambda 1$, distinct by at most 10 nm or 5 nm and with a spectral width at half-maximum of less than 30 nm); and the second source emits in the green with $\lambda 4$ in a range extending from 515 nm to 535 nm and of spectral width at half-maximum of less than 50 nm (and the light extracted C4 is green defined by a fourth main emission extracted at $\lambda 4'$ substantially equal to $\lambda 4$, distinct by at most 10 nm or 5 nm and with a spectral width at half-maximum of less than 30 nm).

Alternatively the first source continues to emit in the red with $\lambda 4$ in a range extending from 615 nm to 635 nm and of spectral width at half-maximum of less than 30 nm (and the light extracted C4 is red defined by a fourth main emission extracted at $\lambda 4'$ substantially equal to $\lambda 1$, for example distinct by at most 10 nm or 5 nm and preferably with a spectral width at half-maximum of less than 30 nm).

In another configuration, for example, at t3 each source 4, 4' emits in the green or in the white. It is also possible for one of the sources to be turned off (therefore the following configurations: red and off-state; green and off-state; white and off-state).

To prevent the mixing of the green and red colours, above all if the opaque coating 60 is absent (for example set back) from the periphery of the first and second edge faces, each diode 4 of the first source 4 optionally comprises collimating optics 42 that ensure a narrow emission pattern. Each diode 4 of the first light source 4 is spaced apart from the first edge face by air (even by at most 2 mm) and at least 80% (preferably at least 90% and even at least 95%) of the light flux emitted by each diode is contained in an emission cone between between $-\alpha 1$ and $\alpha 1$ where $\alpha 1 = \text{Arsin}(n1*\sin(\alpha 2))$ and where $\alpha 2 = \pi/2 - \text{Arsin}(n2/n1)$ corresponds to the angle of refraction in the first glazing pane, as shown by the detail view.

For n2=1.5 (index of ETFE) and n1=1.5 in the visible spectrum $\alpha 2$ is 21° and $\alpha 1$ 33°. For n2=1.35 (index of FEP) and n1=1.5 in the visible spectrum $\alpha 2$ is 26° and $\alpha 1$ 41°.

To prevent the mixing of the green and red colours, above all if the opaque coating 60 is absent (set back) from the periphery of the first and second edge faces, each diode of the second source 4' optionally comprises collimating optics 42' that ensure a narrow emission pattern. Each diode of the second light source 4' is spaced apart from the second edge face by at most about 1 mm of air and at least 80% (preferably at least 90% and even at least 95%) of the light flux emitted by each diode is contained in an emission cone between $-\alpha'1$ and $\alpha'1$ where $\alpha'1 = \text{Arsin}(n1*\sin(\alpha'2))$ and where $\alpha'2 = \pi/2 - \text{Arsin}(n2/n'1)$ corresponds to the angle of refraction in the second glazing pane.

As diodes, 4 mm-wide ALMD diodes from Avago may be chosen, 100% of the light flux emitted by each diode being contained in an emission cone between −30 and 30°. In particular, the red AlInGaP-based diodes referenced ALMD-EG3D-VX002, which have a dominant wavelength at 626 nm and a spectral width between 618 nm and 630 nm, may be used.

In particular, the green InGaN-based diodes referenced ALMD-CM3D-XZ002, which have a dominant wavelength at 525 nm and a spectral width between 519 nm and 539 nm, may be used.

Each PCB carrier is a rectangular strip that does not project beyond the edge face of the glazing assembly and comprises red and green LEDs in alternation. The maximum spacing between diodes of the same colour is chosen to be 20 mm at most.

The diodes of the first source (of the second source, respectively) each have a given main emission direction that is substantially parallel to the first edge face (second edge face, respectively) for example to within 5°. Their emission pattern is Gaussian.

As a variant, conventional diodes are chosen and these diodes are partitioned for example by an E-shaped mounting profile (or an E-shaped fastening profile or two L-shaped profiles).

The luminance normal to a feature 5*a* on the external-face or exterior-face side with green or red light is about 100 cd/m² (+/−10 cd/m²). The normal luminance is uniform (to +/−10 cd/m²).

The electrical circuit of each "green" diode emitting in the green is adjusted so that the flux F1 emitted by this "green" diode is lower than 0.8 times the flux F2 emitted by a "red" diode emitting in the red.

In this case, the first (second, respectively) extracting means may preferably be a white paint and even on the external face (exterior face, respectively). Mention may be made by way of example of the paint Extrablanc of the range Planilaque Evolution from the Applicant, TiO2 being the predominant pigment. The thickness is typically between 40 and 60 μm.

A paint formulation may be deposited using a curtain process. The solvent is xylene or as a variant water. After it has been dried, the lacquer for example contains the following ingredients:
- a binder taking the form of a polyurethane resin obtained by curing with an non-aromatic isocyanate, of hydroxylated acrylic resins obtained by polymerising an acrylic styrene; and
- mineral materials (pigments and fillers) in an amount of 55% by weight.

The first and second PCB carriers 41, 41' are located in the internal volume 74 of a preferably metal (aluminium,—lacquered—steel, or as a variant plastic (PVC, etc.)) or even wooden mounting profile 7 of U-shaped cross section, comprising:
- a web 72 facing the edge face of the glazing assembly 200 (including the first and second edge face 13, 13'; the edge faces of the low-index film and the first and second lamination interlayers 3, 3'), this metal web here bearing the first and second PCB carriers 41, 41' and for example serving to dissipate heat; and
- on either side of the web 72 first and second flanges 71, 73 extending over the external face 12 and the exterior face 12', respectively, over a width W of 3 cm, without making optical contact therewith in order not to interfere with the guiding.

The face 12' is a free surface of the luminous glazing pane, is visible may even be accessible (touchable). The glazing assembly could be assembled into an insulating glazing unit or vacuum glazing unit if required.

The first and second edge faces 13, 13' are straight and polished. The opposite edge faces 14, 14' are straight, polished or even scattering.

Other diodes may be added to the opposite edge face (not shown here) especially in the case of a glazing pane with a wide first extracting area and/or with a plurality of separate centimeter-sized features.

A polymer seal may be placed on this opposite edge face for example to increase comfort if the leaves close too quickly on the pedestrian.

FIG. 9 shows a partial cross-sectional view of a luminous glazing assembly 900 comprising two one-way luminous zones in one variant of the last embodiment.

Only differences relative to the last embodiment 800 are described. The luminous glazing assembly 900 differs as follows from the glazing assembly 800.

The first and second lamination interlayers, the central glass pane and the other central lamination interlayer are omitted.

The first optical isolator is no longer a fluoropolymer film but a first layer of porous sol-gel silica 2, which is 600 nm or preferably 800 nm in thickness, preferably with its first protective coating made up of a dense sol-gel silica layer 2*a*, which is 300 nm or even larger in thickness, with a refractive index n4 of at least 1.4 at 550 nm. The first porous sol-gel silica layer 2 is on the internal face 11 and the first light-extracting means 5 are on the external face 12 and for example take the form of a deluster (forming decorative features, an unapertured feature, an apertured feature, etc.) in a first, for example central, extracting area 50.

The second optical isolator 2' is no longer a fluoropolymer film but a second layer of porous sol-gel silica 2', which is 600 nm or preferably 800 nm in thickness, preferably with its second protective coating made up of a dense sol-gel silica layer 2'*a*, which is 300 nm or even larger in thickness, with a refractive index n'4 of at least 1.4 at 550 nm. The second porous sol-gel silica layer 2' is on the bonding face and the second light-extracting means 5' are on the exterior face 12' and for example take the form of a deluster (forming decorative features, an unapertured feature, an apertured feature, etc.) in a second, for example central, extracting area 50', congruent with the first extracting area 50.

n2 (n'2) varies depending on the fraction of pores per unit volume and may easily range from 1.4 to 1.15. The fraction of pores per unit volume is preferably higher than 50% and even than 65% but is preferably lower than 85% in order to obtain a high layer withstand.

Each porous silica layer 2, 2' is a matrix of silica having closed pores (preferably bounded by walls made of the silica) in its volume.

The porosity may furthermore be monodisperse in size, the pore size then being calibrated. 80% or even more of the pores are closed and spherical (or oval) in shape, having a diameter between 75 nm and 100 nm.

An example procedure for manufacturing the porous silica layer is described in WO 2008/059170. Preferably, the high-temperature bake takes place after the wet deposition of the dense silica layer on the dried porous silica layer.

The opaque coating 60 is here printed on the preferably PVB central lamination interlayer, which may be tinted (if it is desired not to have one or more transparent colourless zones limiting the extent of 60).

Naturally, the glazing assembly such as described in the various embodiments above may also operate in a static mode, i.e. provide only the combination C1 and C3 (or C1 and off-state, or C3 and off-state). In this case, the first light source may even contain only first diodes at λ1 and the second light source only third diodes at λ3. The glazing assembly may also be used as a luminous divider (in a room, between offices) as a floor tile or even as a window.

The invention claimed is:

1. A luminous glazing assembly comprising:
    a first glazing pane of refractive index n1, having a main internal face and a main external face, and a first edge face;
    a first light source optically coupled to the first glazing pane via the first edge face, the first glazing pane to guide light emitted by the first light source, which first light source is controlled, statically or dynamically, in order to emit at an instant t0 a first main emission at a first wavelength λ1;
    a first light-extracting system to extract the light, the first light-extracting system associated with the first glazing pane, comprising one or more first extracting features bounding a first extracting area, the light extracted being visible on a side of the main external face, the first light-extracting system being such that the light extracted at said instant t0 is of a first colour;

a first masking arrangement to mask the extracted light from a side of the main internal face, the first masking arrangement being arranged on the main internal-face side and partially covering the main internal face and being chosen from at least one of:

opaque elements in congruence with the first light-extracting system, further away than the first light-extracting system from the main internal face, and reflective elements facing the first extracting system;

making optical contact with the first glazing pane, a second glazing pane, of refractive index n'1, having a main bonding face and a main exterior face, the main bonding face facing the main internal face of the first glazing pane, and a second edge face;

a second light source optically coupled to the second glazing pane via the second edge face, the second glazing pane to guide light emitted by the second light source, which second light source is controlled, statically or dynamically, in order to emit at said t0 a third main emission at a wavelength λ3 distinct from λ1;

a second light-extracting system to extract light emitted by the second light source, the second light-extracting system associated with the second glazing pane, comprising one or more second extracting features bounding a second extracting area, the light extracted being visible on a side of the main exterior face, the second light-extracting system being such that the light thus extracted at t0 is of a third colour distinct from the first colour;

a second masking arrangement to mask the extracted light from a side of main bonding face, the second masking arrangement being arranged on the main bonding-face side and partially covering the main bonding face, and being chosen from at least one of:

opaque elements in congruence with the second light-extracting system, further away than the second light-extracting system from the main bonding face, and reflective elements facing the second light-extracting system;

between the first masking arrangement and the second light-extracting system, a transparent first optical isolator of refractive index n2 such that, at the wavelengths of the first light source, n1−n2 is at least 0.08, and which faces the main internal face: between the first edge face and the first extracting area and/or between the one or more first extracting features, the first optical isolator is laminated to the first glazing pane by a first lamination interlayer made of a first transparent polymer that has a refractive index n3 such that, in absolute value, n3−n1 is lower than 0.05 at the wavelengths of the first light source; and between the first masking arrangement and the second light-extracting system, a transparent second optical isolator merged with the first optical isolator or separate and closer to the second light-extracting system, of refractive index n'2 such that, at the wavelengths of the second light source, n'1−n'2 is at least 0.08, and which faces the main bonding face: between the second edge face and the second extracting area and/or between the one or more second extracting features, and wherein the second optical isolator is laminated to the second glazing pane by a second lamination interlayer made of a second transparent polymer that has a refractive index n'3 such that, in absolute value, n'3−n'1 is lower than 0.05 at the wavelengths of the second light source.

2. The luminous glazing assembly according to claim 1, wherein the first light-extracting system is on the main internal face, the first masking arrangement comprising an opaque or a reflective layer in congruence with and on the first light-extracting system, and wherein the second light-extracting system is on the main bonding face and the second masking arrangement comprises an opaque or reflective layer in congruence with and on the second light-extracting system.

3. The luminous glazing assembly according to claim 1, wherein the first light-extracting system comprises a scattering enamel layer on the main internal face, the first masking arrangement comprises an opaque enamel layer in congruence with and on the scattering enamel layer, the second light-extracting system comprises a scattering enamel layer on the main bonding face and the second masking arrangement comprises an opaque enamel layer in congruence with and on the scattering enamel layer.

4. The luminous glazing assembly according to claim 1, wherein the first optical isolator comprises a first porous silica layer of thickness e2 of at least 400 nm on one main face of a third transparent glazing pane that is made of mineral glass, said one main face being oriented to the internal-face side.

5. The luminous glazing assembly according to claim 1, wherein the first light source is switchable in order to emit at instant t'≠t0 a second main emission at a second wavelength λ2 distinct from λ1.

6. The luminous glazing assembly according to claim 5, wherein the light extracted at said instant t' is of a second colour distinct from the first colour.

7. The luminous glazing assembly according to claim 5, wherein the wavelength λ3 is substantially equal to λ2.

8. The luminous glazing assembly according to claim 5, wherein:

at instant t0 the first light source emits in the green with λ1 in a range extending from 515 to 535 nm and the second light source emits in the red with λ3 in a range extending between 615 nm and 635 nm; and at instant t' the first light source emits in the red with λ2 in a range extending between 615 nm and 635 nm and the second light source emits in the green with λ4 in a range extending from 515 to 535 nm.

9. The luminous glazing assembly according to claim 5, wherein at instant t0 the first light source comprises a first light-emitting diode that emits in the green with λ1 in a range extending from 515 to 535 nm, and at instant t' the first light source comprises a second light-emitting diode that emits in the red with λ2 in a range extending between 615 nm and 635 nm, an electrical circuit of the first diode being adjusted so that a flux F1 emitted by the first diode is lower than 0.8 times a flux F2 emitted by the second diode.

10. The luminous glazing assembly according to claim 6, wherein the second light source is controlled to emit at said instant t' a fourth main emission at a wavelength λ4 distinct from λ3.

11. The luminous glazing assembly according to claim 10, wherein the first light source comprises a first light-emitting diode providing said first main emission at λ1 and a second light-emitting diode providing said second main emission at λ2, and each of the first and second diodes is spaced apart from the first edge face and at least 80% of a light flux emitted by each of the first and second diodes is contained in an emission cone between $-\alpha 1$ and $\alpha 1$ where $\alpha 1 = \text{Arsin}(n1*\sin(\alpha 2))$, and where $\alpha 2 = (\pi/2) - \text{Arsin}(n2/n1)$ corresponds to the angle of refraction in the first glazing pane;

and wherein the second light source comprises a third light-emitting diode providing said third main emission of $\lambda 3$ and optionally a fourth light-emitting diode providing said fourth main emission of $\lambda 4$, and the third diode and, if relevant, the optional fourth diode is spaced apart from the second edge face and at least 80% of a light flux emitted by each of the third and optional fourth diodes is contained in an emission cone between $-\alpha' 1$ and $\alpha' 1$ where $\alpha' 1 = \text{Arsin}(n1*\sin(\alpha' 2))$, and where $\alpha' 2 = (\pi/2) - \text{Arsin}(n'2/n'1)$ corresponds to the angle of refraction in the second glazing pane.

12. The luminous glazing assembly according to claim 10, wherein the second light-extracting system is such that the light extracted at the instant t' is of a fourth colour distinct from the second colour.

13. The luminous glazing assembly according to claim 1, further comprising a transparent zone and wherein the first and second edge faces facing the transparent zone are devoid of light sources and/or wherein the first extracting area has an overall transparency.

14. The luminous glazing assembly according to claim 1, wherein the first extracting area comprises:

a first array of discrete scattering features having a width l1 of at most 1 cm and being spaced apart by a pitch p1 of at most 1 cm;

and/or a first scattering decorative feature of centimeter-sized width l2 of at most 5 cm;

and/or a first scattering assembly of characters, each having a width l3 of at most 5 cm and being spaced apart by a pitch p3 of at most 1 cm, and wherein the second extracting area faces and is congruent with the first extracting area and comprises:

a second array of discrete scattering features congruent with the first array, the second array of discrete scattering features having a width $l'_1$ of at most 1 cm and being spaced apart by a pitch $p'_1$ of at most 1 cm;

and/or a second scattering decorative feature of centimeter-sized width $l_2$ of at most 5 cm;

and/or a second scattering assembly of characters, each having a width $l'_3$ of at most 5 cm and being spaced apart by a pitch $p'_3$ of at most 1 cm.

15. The luminous glazing assembly according to claim 1, wherein the first optical isolator comprises a first low-index film made of a fluoropolymer-based material.

16. The luminous glazing assembly according to claim 15, wherein each main surface of the first low-index film is treated by an adhesion-promoting treatment.

17. The luminous glazing assembly according to claim 15, wherein the fluoropolymer is ETFE or an FEP.

18. The luminous glazing assembly according to claim 1, wherein the first optical isolator comprises a first porous silica layer of thickness e2 of at least 400 nm.

19. The luminous glazing assembly according to claim 18, wherein the first porous silica layer is coated with a first transparent and mineral protective coating that is a silica layer of thickness e4 larger than 50 nm.

20. The luminous glazing assembly according to claim 1, wherein the first and second glazing pane form a laminated glazing unit comprising a central edge face, between the first and second edge faces, and wherein:

the glazing assembly comprises a common partitioning arrangement, which is opaque or reflective, located between the first light source and the second light source when the latter are arranged on the same side of the glazing assembly, completely or partially preventing refraction of the light emitted by the first light source at the central edge face and completely or partially preventing refraction of the light emitted by the second light source at the central edge face;

or the first light source and the second light source are arranged on two separate sides of the glazing assembly and the glazing assembly comprises a first partitioning system, which is opaque or reflective, completely or partially preventing refraction of the light emitted by the first light source at the central edge face, and the glazing assembly comprises a second partitioning system, which is opaque or reflective completely or partially preventing refraction of the light emitted by the second light source at the central edge face.

21. The luminous glazing assembly according to claim 1, wherein the first light source is a first assembly of light-emitting diodes on a first PCB carrier and the diodes are coupled to the first edge face, and the second light source is a second assembly of light-emitting diodes on a second PCB carrier, and the diodes are coupled to the second edge face, which is aligned with the first edge face or aligned with or offset from the edge face opposite the first edge face, the first and second PCB carriers being spaced apart, contiguous or a common PCB carrier.

22. The luminous glazing assembly according to claim 21, wherein the first and second glazing pane form a laminated glazing unit, the first assembly of light-emitting diodes and the second assembly of light-emitting diodes are arranged on a same side of the laminated glazing unit and are top-emitting diodes, and the first and/or second PCB carrier or a common PCB carrier forming the first and second PCB carriers has a main face facing the first and second edge faces and the common PCB carrier bears a common partition, the common partition completely or partially preventing refraction of the light emitted by the first assembly of diodes at the edge face between the main internal face and main exterior face of the laminated glazing unit and completely or partially preventing refraction of the light emitted by the second assembly of diodes at the edge face between the main bonding face and the main external face of the laminated glazing unit, the common partition protruding, relative to the first and second assembly of light-emitting diodes, in the direction of the first and second edge faces.

23. The luminous glazing assembly according to claim 1, wherein the first light source is a first assembly of light-emitting diodes that is coupled to the first edge face by adhesive bonding to the first edge face with an optical adhesive or a transparent double-sided adhesive or spaced apart from the first edge face by at most 5 mm.

24. The luminous glazing assembly according to claim 1, wherein the first and second light sources are on opposite sides, wherein the second glazing pane projects beyond the first glazing pane forming a first projecting zone and the first glazing pane projects beyond the second glazing pane forming a second projecting zone, and wherein the first light source is on a first carrier that is attached to the first projecting zone and/or located in the first projecting zone and not projecting beyond the second edge face, and the second light source is on a second carrier which is attached to the second projecting zone and/or is located in the second projecting zone and not projecting beyond the first edge face.

25. An access door incorporating the luminous glazing assembly according to claim 1, between the exterior and a building, between two zones of a building or of a land-, water- or air-based vehicle, in a public transport station or between two exterior zones.

26. A device incorporating the luminous glazing assembly according to claim 1, wherein the device is a divider, a sheet or a window.

27. The luminous glazing assembly according to claim 1, wherein the opaque elements of the first masking arrangement are on the first light-extracting system.

28. The luminous glazing assembly according to claim 1, wherein the reflective elements of the first masking arrangement are on the first light-extracting system and further away from the first glazing pane than the first light-extracting system.

29. The luminous glazing assembly according to claim 1, wherein the opaque elements of the second masking arrangement are on the second light-extracting system.

30. The luminous glazing assembly according to claim 1, wherein the reflective elements of the second masking arrangement are on the second light-extracting system and are further away from the second glazing pane than the second light-extracting system.

31. The luminous glazing assembly according to Claim 1 further comprising, on a periphery of the first edge face, a metal profile extending over the main exterior and external faces by a distance W of between 1 cm and 3 cm, enclosing or bearing the first light source and optionally the second light source.

32. The luminous glazing assembly according to claim 1, wherein a first anti-mixing band makes, on a periphery of the main internal face, extending from the first edge face, optical contact with the main internal face, the first anti-mixing band having a width $D0$ at least equal to 0.8 Dmin, where $Dmin = d1/\tan((n\pi/2) - \arcsin(n2/n1))$, where $d1$ is a distance between the first light source and the main internal face, the first anti-mixing band being made of an opaque material and being offset from the first masking arrangement and the first extracting area, which are further away from the first edge face, or the first anti-mixing band is formed by a feature of the opaque first masking arrangement, and wherein, a second anti-mixing band makes, on a periphery of the main bonding face, extending from the second edge face, optical contact with the main bonding face, the second anti-mixing band of opaque material having a width $D'0$ at least equal to 0.8 D'min, where $D'min = d'1/\tan((\pi/2) - \arcsin(n'2/n'1))$, — where $d'1$ is a distance between the second light source and the main bonding face, the second anti-mixing band of opaque material being offset from the second masking arrangement and the second extracting area, which are further away from the second edge face, or the second band is formed by an opaque feature of the second masking arrangement.

33. A luminous glazing assembly comprising:
 a first glazing pane of refractive index $n1$, having a main internal face and a main external face, and a first edge face;
 a first light source optically coupled to the first glazing pane via the first edge face, the first glazing pane to guide light emitted by the first light source, which first light source is controlled, statically or dynamically, in order to emit at an instant $t0$ a first main emission at a first wavelength $\lambda 1$;
 a first light-extracting system to extract light emitted by the light source, the first light extraction system associated with the first glazing pane, comprising one or more first extracting features bounding a first extracting area, the light extracted being visible on a side of the main external face, the first light-extracting system being such that the light extracted at said instant $t0$ is of a first colour
 a first masking arrangement to mask the extracted light from the internal-face side, the first masking arrangement including opaque or reflective elements arranged on the internal-face side at least facing the first light-extracting system and covering the first extracting area and substantially the main internal face;
 between the first light-extracting system and the first masking arrangement, a first transparent optical isolator of refractive index $n2$ such that, at the wavelengths of the first light source $n1-n2$ is at least 0.08, and which faces the main internal face: between the first edge face and the first extracting area and/or between the one or more first extracting features;
 making optical contact with the first glazing pane, a second glazing pane, of refractive index $n'1$, having a main bonding face and a main exterior face, the main bonding face facing the main internal face, and a second edge face;
 a second light source optically coupled to the second glazing pane via the second edge face, the second glazing pane to guide the light emitted by the second light source, which second light source is controlled, statically or dynamically, in order to emit at said instant $t0$ a third main emission at a wavelength $\lambda 3$ distinct from $\lambda 1$;
 a second light-extracting system associated with the second glazing pane, comprising one or more second extracting features and bounding a second extracting area the light extracted from the second glazing pane being visible on a side of the main exterior face, the second light-extracting system being such that the light extracted at instant $t0$ is of a third colour distinct from the first coulour C1;
 a second masking arrangement to mask the extracted light from the bonding-face side, the second masking arrangement comprising opaque or reflective elements arranged on a side of the main bonding face at least facing the second light-extracting system and covering the second extracting area and substantially the bonding face; and
 between the second light-extracting system and the second masking arrangement, a second transparent optical isolator of refractive index $n'2$ such that, at the wavelengths of the second light source, $n'1-n'2$ is at least 0.08, and which faces the main bonding face: between the second edge face and the second extracting area and/or between the one or more second extracting features, and wherein the first optical isolator has a first main surface on the internal-face side and a second main surface on the bonding-face side, the first main surface being on the main internal face or the first optical isolator being laminated via the first main surface to the first glazing pane by a first lamination interlayer made of a first transparent polymer that has a refractive index $n3$ such that, in absolute value, $n3-n1$ is lower than 0.05 at the wavelengths of the first light source, the second optical isolator has a third main surface on the bonding-face side, the third main surface being on the main bonding face or the second optical isolator being laminated via said third main surface to the second glazing pane by a second lamination interlayer made of a second transparent polymer that has a refractive index $n'3$ such that, in absolute value, $n'3-n'1$ is lower than 0.05 at the wavelengths of the second light source, and wherein the glazing assembly comprises, between the first optical isolator and the second optical isolator, a central lamination interlayer made of a third polymer.

34. The luminous glazing assembly according to claim 33, wherein the first and second masking arrangements are merged when the second light-extracting system is in congruence with the first light-extracting system and/or when the first masking arrangement substantially covers the main internal face and the main bonding face.

35. The luminous glazing assembly according to claim 33 wherein the first masking arrangement comprises an opaque coating.

* * * * *